(12) United States Patent
Nishi et al.

(10) Patent No.: US 9,058,848 B2
(45) Date of Patent: Jun. 16, 2015

(54) DISC LIBRARY DEVICE

(71) Applicant: PANASONIC INTELLECTUAL PROPERTY MANAGEMENT CO., LTD., Osaka (JP)

(72) Inventors: Tatsuro Nishi, Osaka (JP); Norikatsu Yoshida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 13/904,454

(22) Filed: May 29, 2013

(65) Prior Publication Data

US 2013/0343855 A1    Dec. 26, 2013

(30) Foreign Application Priority Data

Jun. 22, 2012   (JP) ................. 2012-141151

(51) Int. Cl.
| | | |
|---|---|---|
| G11B 21/08 | (2006.01) | |
| G11B 7/085 | (2006.01) | |
| G11B 33/04 | (2006.01) | |
| G11B 23/03 | (2006.01) | |
| G11B 17/22 | (2006.01) | |

(52) U.S. Cl.
CPC ........ G11B 33/0444 (2013.01); G11B 23/0323 (2013.01); G11B 17/221 (2013.01); G11B 17/225 (2013.01)

(58) Field of Classification Search
USPC .................... 720/615, 616; 369/30.51–30.61, 369/30.76–30.87
See application file for complete search history.

(56) References Cited

U.S. PATENT DOCUMENTS

| | | | |
|---|---|---|---|
| 5,508,994 A | | 4/1996 | Nakamichi et al. |
| 5,594,710 A | * | 1/1997 | Nakamichi ................. 369/30.78 |
| 5,818,723 A | * | 10/1998 | Dimitri ........................ 700/214 |
| 6,111,847 A | * | 8/2000 | Assadian ................... 369/30.55 |
| 6,744,704 B1 | * | 6/2004 | Funaya et al. .............. 369/30.85 |
| RE40,598 E | * | 12/2008 | Russ .............................. 720/619 |
| 2002/0036976 A1 | | 3/2002 | Michimori et al. |
| 2005/0007896 A1 | * | 1/2005 | Haas ............................ 369/30.6 |
| 2012/0192211 A1 | * | 7/2012 | Niizawa et al. ............... 720/614 |

FOREIGN PATENT DOCUMENTS

| | | |
|---|---|---|
| JP | 60-214472 | 10/1985 |
| JP | 6-259866 | 9/1994 |
| JP | 2002-109813 | 4/2002 |
| JP | 2005-25888 | 1/2005 |
| JP | 2011-204311 | 10/2011 |
| WO | 2010/134522 | 11/2010 |

* cited by examiner

*Primary Examiner* — Adam B Dravininkas
(74) *Attorney, Agent, or Firm* — Wenderoth, Lind & Ponack, L.L.P.

(57) ABSTRACT

The disc device includes a picker which conveys, in a horizontal direction, a magazine tray in which a plurality of discs are stored, a lifter which pushes out the plurality of discs from the magazine tray, and a carrier which shifts in a vertical direction, which retains in a stacked manner the plurality of discs pushed out by the lifter, and which supplies the discs to a plurality of disc drives, respectively. The lifter is flexibly mounted such that the lifter shifts relative to the picker in the horizontal direction.

8 Claims, 57 Drawing Sheets

Fig.29
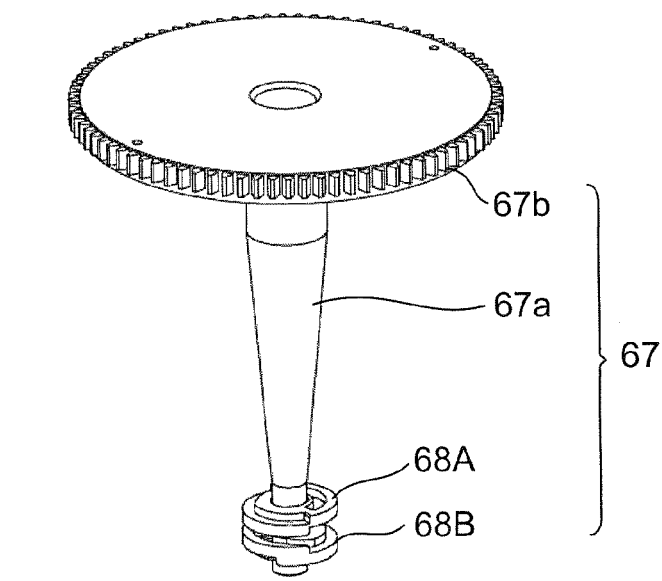
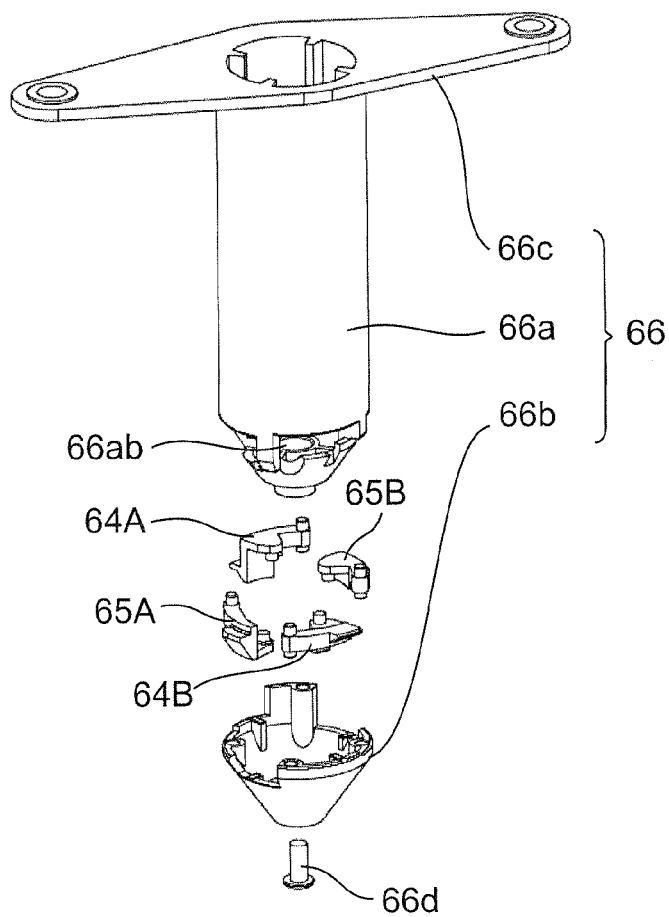

Fig.35
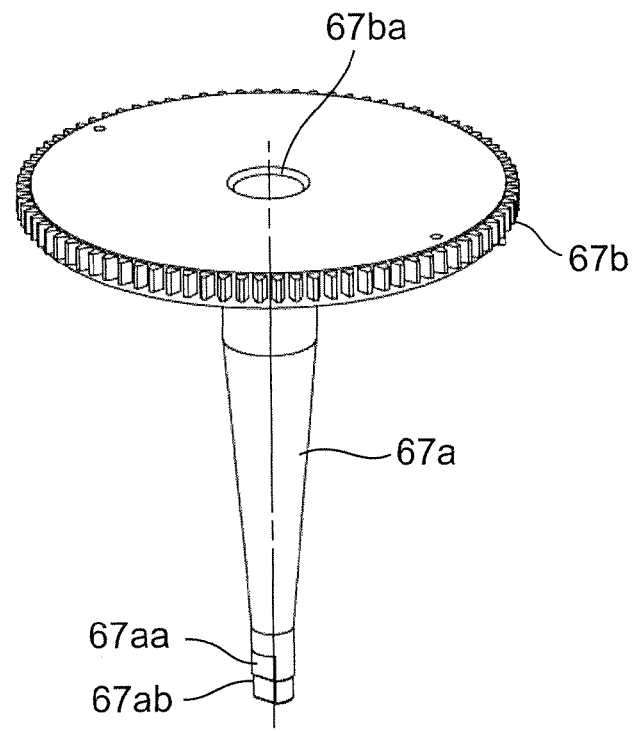
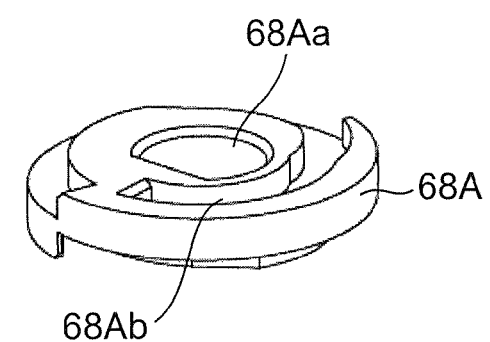
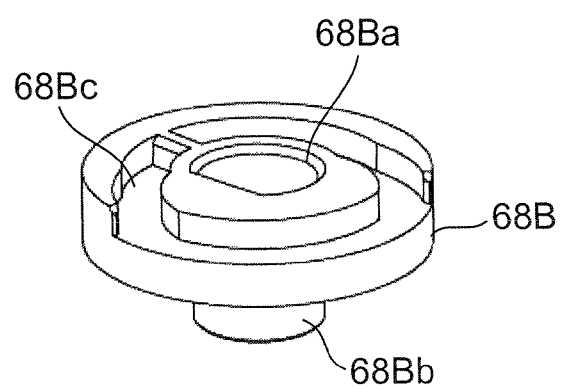

Fig.36
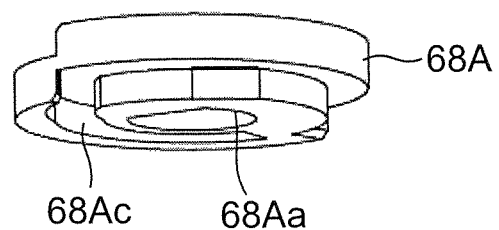
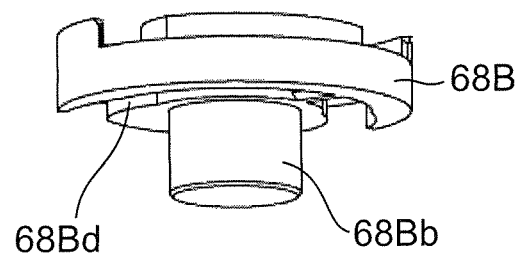

DISC LIBRARY DEVICE

BACKGROUND OF THE INVENTION

1. Field of the Invention

The technical field relates to a disc device that supplies a disc (a disc-like information recording medium such as a CD or a DVD) to each of a plurality of disc drives.

2. Description of the Related Art

Conventionally, as a disc device of this type, a device disclosed in Patent Document 1 (No. 2011-204311 A) is known, for example. The disc device disclosed in Patent Document 1 includes a magazine that stores a plurality of magazine trays that stores one disc, and a plurality of disc drives. The disc device disclosed in Patent Document 1 is structured such that: an arbitrary magazine tray is drawn out from the magazine; the disc stored in the drawn out magazine tray is suctioned and held by a suction pad; and the disc is placed on the tray of an arbitrary disc drive.

PATENT DOCUMENTS

Patent Document 1: JP 2011-204311 A

In recent years, with the progress of cloud computing, it is required to further increase data capacity in the disc device. In order to increase the data capacity, simply thinking, the number of magazines should be increased and the number of discs to be stored should be increased.

However, an increase in the number of pieces of magazines inevitably increases the distance between the disc drive and a magazine that is placed at the farthest position from the disc drive. This invites an increase in the disc conveying time. Further, since the disc device disclosed in Patent Document 1 is structured to supply the disc one by one from the magazine to the disc drives, considerable time is required for conveying the discs to the plurality of disc drives.

SUMMARY OF THE INVENTION

Accordingly, the applicant of the present disclosure has developed a disc device including a carrier that retains a plurality of discs in such a stacked state, that separates one disc from the retained plurality of discs above a tray ejected from an arbitrary disc drive, and that places the separated disc onto the tray.

With the disc device, since it is not necessary to cause a suction pad suctioning and holding each disc to reciprocate between the magazine and the disc drive as disclosed in Patent Document 1, an increase in the time required for supplying the discs to the plurality of disc drives can be avoided.

In this disc device, the plurality of discs are stored in a magazine tray in the stacked state. The magazine tray is conveyed by a picker to a position directly below the carrier. If the magazine tray is conveyed to the position directly below the carrier, the carrier is lowered, a lifter pushes out a plurality of discs from the magazine tray, and the plurality of discs are delivered to the carrier in their stacked state.

In this disc device, a conveying direction of the magazine trays conveyed by the picker is the horizontal direction, and a shifting direction of the carrier is the vertical direction. That is, the conveying direction of the magazine trays conveyed by the picker and the shifting direction of the carrier intersect with each other at right angles. The picker is heavy in weight and its stopping accuracy is low. Hence, it could be that the magazine tray is conveyed to a position deviated from the position directly below the carrier. In this case, the plurality of discs in the magazine tray cannot appropriately be delivered to the carrier by the lifter, and it could be that the discs cannot be supplied to the plurality of disc drives.

Accordingly, one non-limiting and exemplary embodiment provides a disc device that can appropriately deliver the plurality of discs in the magazine tray to the carrier.

In one general aspect, the techniques disclosed here feature:

According to the present disclosure, there is provided a disc device comprising:

a picker which conveys, in a horizontal direction, a magazine tray in which a plurality of discs are stored;

a lifter which pushes out the plurality of discs from the magazine tray; and a carrier which shifts in a vertical direction, which retains in a stacked manner the plurality of discs pushed out by the lifter, and which supplies the discs to a plurality of disc drives, respectively, wherein the lifter is flexibly mounted such that the lifter shifts relative to the picker in the horizontal direction, and the lifter shifts integrally with the magazine tray in the horizontal direction.

With the disc device of the present disclosure, the lifter is flexibly mounted so that the lifter shifts relative to the picker in the horizontal direction. Therefore, the lifter can shift integrally with the disc when the magazine tray is deviated from the position directly below the carrier and the carrier comes into contact with a disc in the magazine tray and pushes the disc in the horizontal direction. Thus, a position of the magazine tray can be adjusted such that the magazine tray is positioned directly below the carrier, and a plurality of discs in the magazine tray can appropriately be delivered to the carrier.

BRIEF DESCRIPTION OF THE DRAWINGS

FIG. 29 is an exploded perspective view of the disc chuck unit included in the carrier shown in FIG. 18 as seen diagonally from above.

FIG. 35 is an exploded perspective view of a camshaft unit included in the disc chuck unit shown in FIG. 29.

FIG. 36 is a perspective view of two cam plates included in the camshaft unit shown in FIG. 35 as seen diagonally from below.

DETAILED DESCRIPTION OF THE INVENTION

Figure 1:
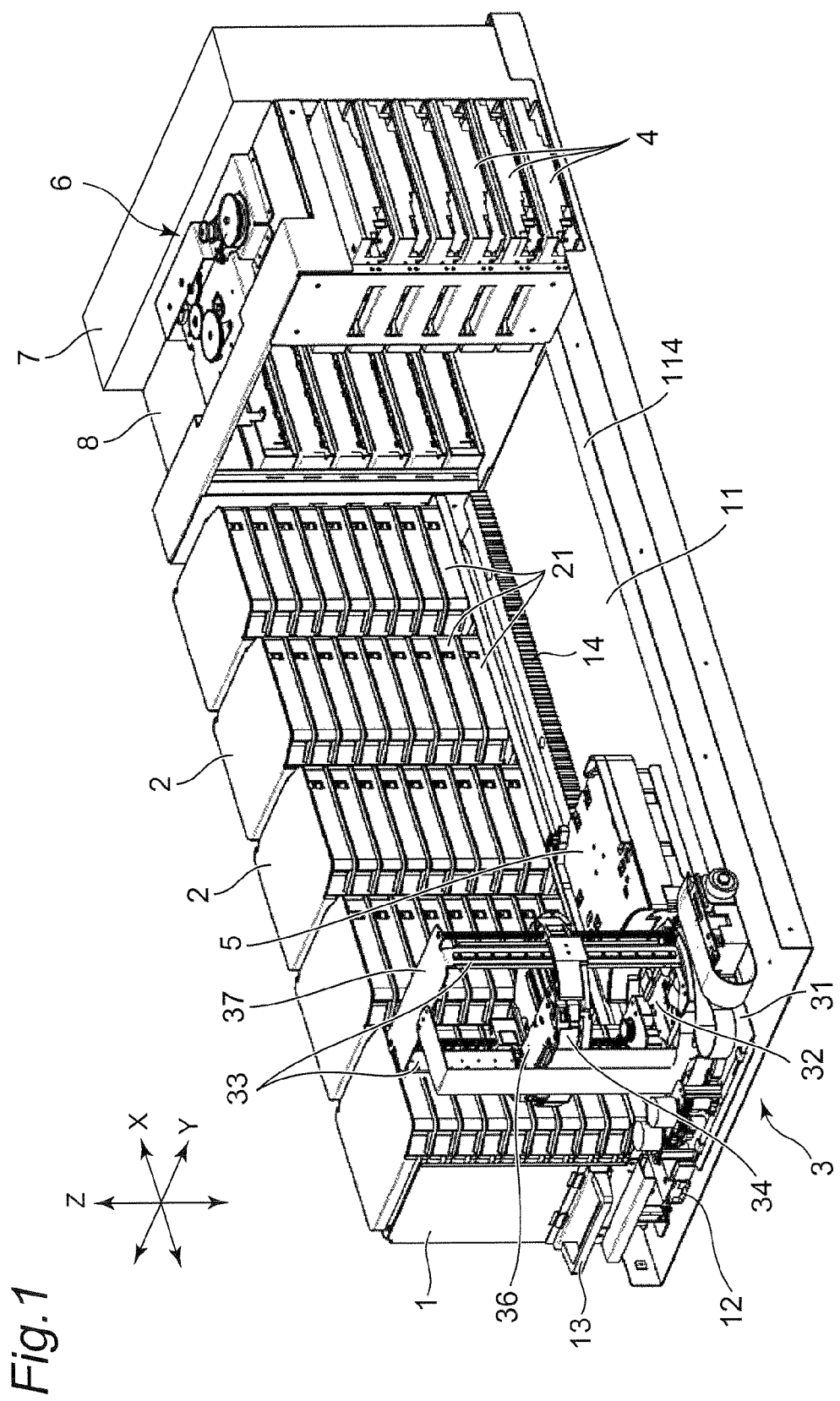
FIG. 1 is a perspective view showing the schematic structure of a disc device according to an embodiment of the present disclosure.

According to a first aspect of the present disclosure, there is provided a disc device comprising:

a picker which conveys, in a horizontal direction, a magazine tray in which a plurality of discs are stored;

a lifter which pushes out the plurality of discs from the magazine tray; and a carrier which shifts in a vertical direction, which retains in a stacked manner the plurality of discs pushed out by the lifter, and which supplies the discs to a plurality of disc drives, respectively, wherein the lifter is flexibly mounted such that the lifter shifts relative to the picker in the horizontal direction, and the lifter shifts integrally with the magazine tray in the horizontal direction.

According to a second aspect of the present disclosure, there is provided the disc device according to the first aspect, wherein the carrier includes a disc chuck unit which is inserted into center holes of the plurality of discs and which retains the plurality of discs, and a tip portion of the disc chuck unit comes into contact with a peripheral portion of the center hole of topmost disc of the discs to apply a pressing force to the topmost disc in the horizontal direction when the magazine tray conveyed by the picker is deviated from a position directly below the carrier.

According to a third aspect of the present disclosure, there is provided the disc device according to the second aspect, further comprising:

a positioning mechanism which previously positions the magazine tray such that the magazine tray is located substantially directly below the carrier before the tip portion of the disc chuck unit comes into contact with the peripheral portion.

According to a fourth aspect of the present disclosure, there is provided the disc device according to any one of the first to third aspects, wherein the lifter and the picker are mounted on each other by means of a stepped screw.

According to a fifth aspect of the present disclosure, there is provided the disc device according to the fourth aspect, wherein a tip portion of the stepped screw penetrates the lifter and is fixed to the picker, a head portion of the stepped screw comes into contact with an upper side surface of the lifter to restrict upward shifting of the lifter, and a clearance for permitting horizontal shifting of the lifter exists between a shaft portion of the stepped screw and the lifter.

In the following, with reference to the drawings, a description will be given of an embodiment of the present disclosure. It is to be noted that, identical reference characters are allotted to identical or corresponding parts throughout the drawings referred to in the following, and description thereof will not be repeated.

<<Embodiment>>

FIG. 1 is a perspective view showing the schematic structure of a disc device according to an embodiment of the present disclosure. It is to be noted that, in the present embodiment, the left side in FIG. 1 is referred to as the "device-front side", and the right side in FIG. 1 is referred to as the "device-rear side".

Firstly, with reference to FIG. 1, a description will be given of an overall structure of the disc device according to the present embodiment.

The disc device according to the present embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown. Further, the top panel and the partition plate of the magazine stocker 1 are not shown in FIG. 1.

Each magazine stocker 1 stores a plurality of magazines 2. Each magazine 2 includes magazine trays 21 storing a plurality of (e.g., 12 pieces of) discs. Between the two magazine stockers 1, 1, a picker 3 that draws out the magazine tray 21 from one magazine 2 selected from a plurality of magazines 2 and that holds the magazine tray 21 is provided.

The picker 3 is structured to convey the held magazine tray 21 to a position near a plurality of disc drives 4 arranged at the device-rear side. The picker 3 is integrally provided with a lifter 5 that pushes out a plurality of discs from the magazine tray 21.

The disc drives 4 are each an apparatus that performs recording or reproducing of information on or from a disc. Further, the disc drives 4 are each a tray-scheme disc drive that load discs using trays. The plurality of disc drives 4 are stacked in a device height direction Z, and arranged so as to be adjacent to the magazine stockers 1, 1 on the device-rear side. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is structured to: retain a plurality of discs pushed out by the lifter 5 in such a stacked state; separate one disc from the retained plurality of discs above a tray 4a (see FIG. 23) ejected from an arbitrary disc drive 4; and place the separated disc on the tray 4a.

Further to the device-rear side than the carrier 6 and the plurality of disc drives 4, an electric circuit and a power supply 7 are provided. The electric circuit and the power supply 7 are provided with a control unit that controls operations (motor and the like) of devices such as the picker 3, the disc drives 4, the carrier 6, and the like. The control unit is connected to, for example, a host computer that manages data. The host computer sends commands to the control unit to perform operations such as data reading from or writing on the specified magazine 2, based on instructions from the operator. The control unit controls the operation of the devices such as the picker 3, the disc drive 4, the carrier 6, and the like according to the commands.

Next, a description will be given of the structure of the aforementioned devices and components in more detail.

The magazine stockers 1 are provided along guide rails 12 that slidably guide the picker 3. The guide rails 12 are provided so as to extend in a device depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) formed to be grid-like as seen from the device width direction Y. In each of the space surrounded by the partition plate, the magazine 2 is stored.

Figure 2A:
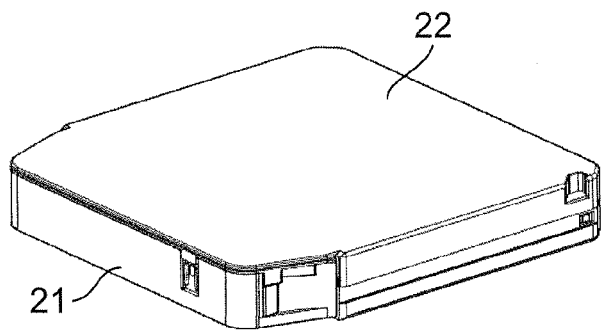
FIG. 2A is a perspective view of a magazine included in the disc device shown in FIG. 1.
Figure 2B:
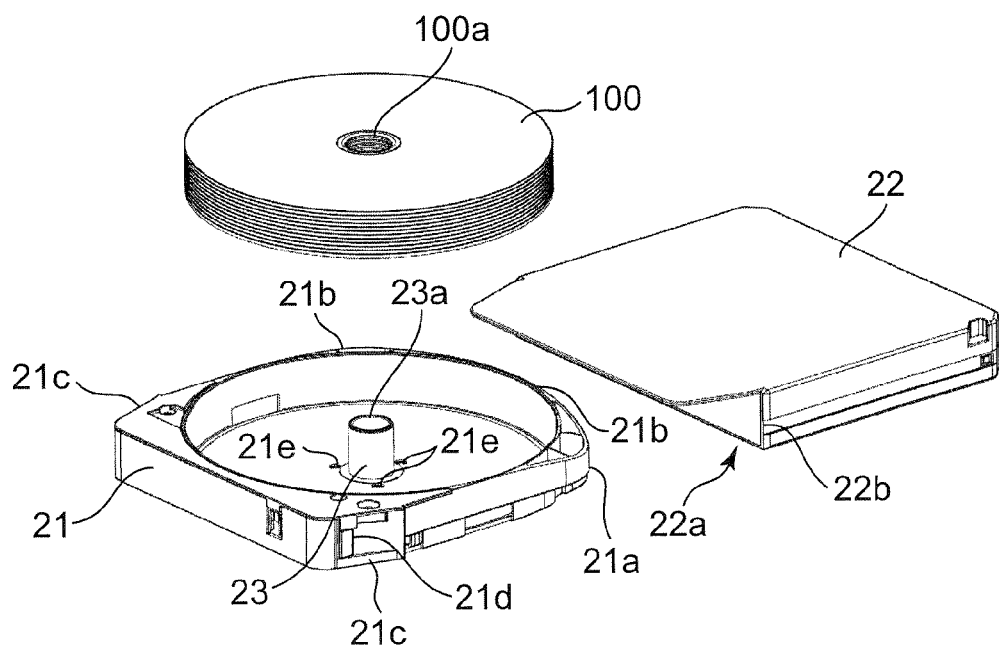
FIG. 2B is an exploded perspective view of the magazine shown in FIG. 2A.

As shown in FIG. 2A, the magazine 2 includes the magazine tray 21, and a case 22 that has a substantially rectangular parallelepiped shape and that stores the magazine tray 21. As shown in FIG. 2B, at the front face (one side face) of the case 22, an opening 22a into which the magazine tray 21 can be inserted and taken out is provided.

The magazine tray 21 is formed to have an outer shape being substantially rectangular in planar view. The magazine tray 21 stores a plurality of discs 100 as being stacked in close contact with one another. At the opposing corner portions that position on the back side of the magazine case 22 in a state where the magazine tray 21 is stored in the case 22, cut portions 21a, 21a are formed. Further, a side face 21b that positions on the back side of the magazine case 22 in the state where the magazine tray 21 is stored in the magazine case 22 is formed to be arc-like as a whole including the cut portions 21a, 21a.

At the opposing corner portions that position on the front face side of the case 22 in the state where the magazine tray 21 is stored in the case 22, cutout portions 21c, 21c are formed. On the inner side of the cutout portions 21c, 21c in the width direction of the magazine tray 21, engaging recess portions 21d, 21d with which a pair of hooks 35, 35, whose description will follow, engage are formed.

The magazine tray 21 is provided with a core rod, which is inserted into a center hole 100a provided at each of the plurality of discs 100 to restrict shifting of the discs 100 in the plane direction. This core rod 38 prevents the discs 100 from being damaged by such shifting of the discs 100 in the plane direction. The core rod 23 is provided with an engaging portion 23a for engaging with a spindle head 67b of a disc chuck unit 62, whose description will follow.

Near the core rod 23, at least one hole 21e into which up-and-down pins 52a of the lifter 5, whose description will follow, are provided. In the present embodiment, three holes 21e are provided at an interval of 120 degrees. Further, the three holes 21e are provided at the position opposing to the non-recording-and-reproducing region of the inner circumferential portion of each disc 100 when the disc 100 is inserted into the core rod 23.

Figure 3:
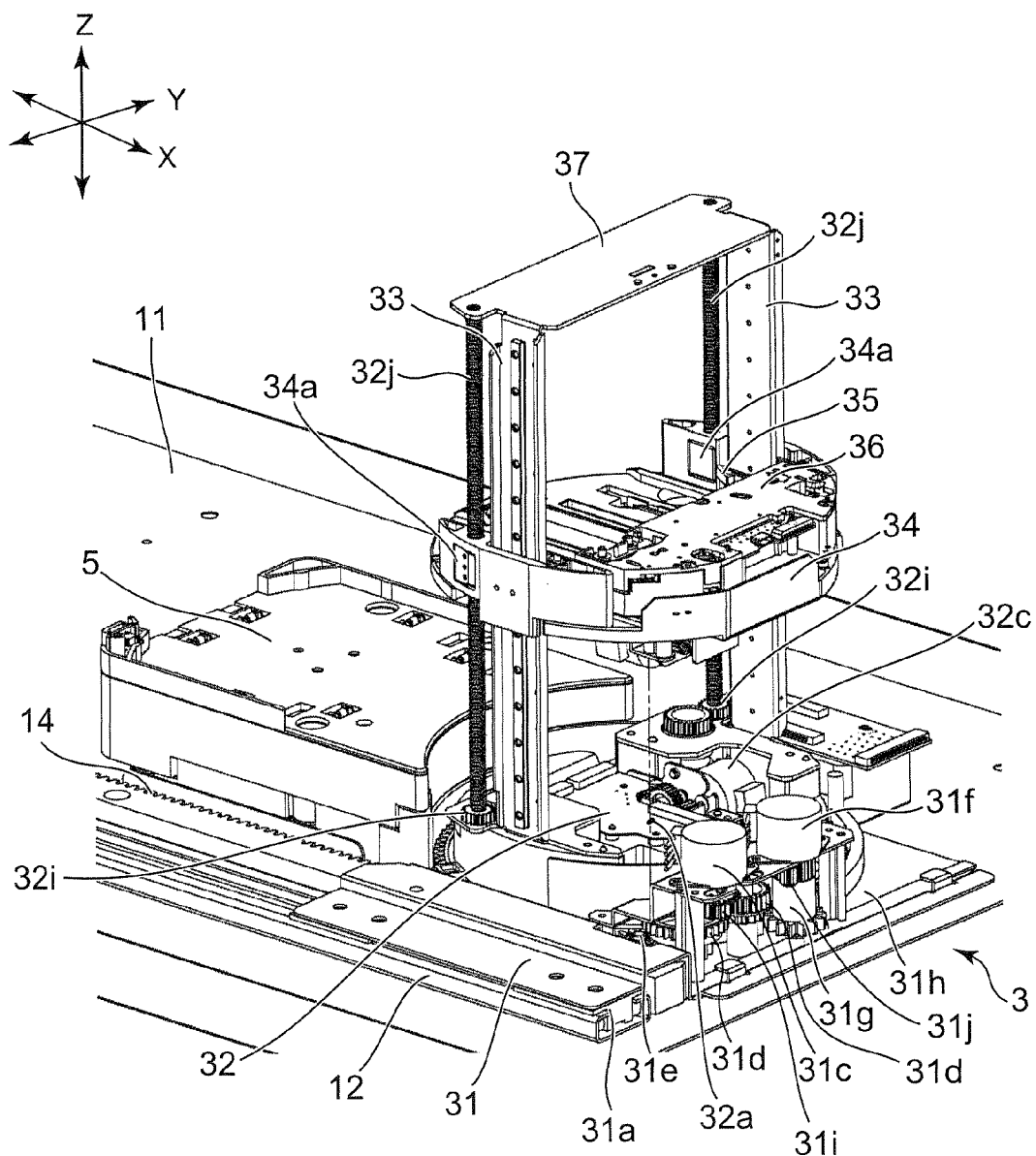
FIG. 3 is a perspective view of a picker included in the disc device shown in FIG. 1.
Figure 4:
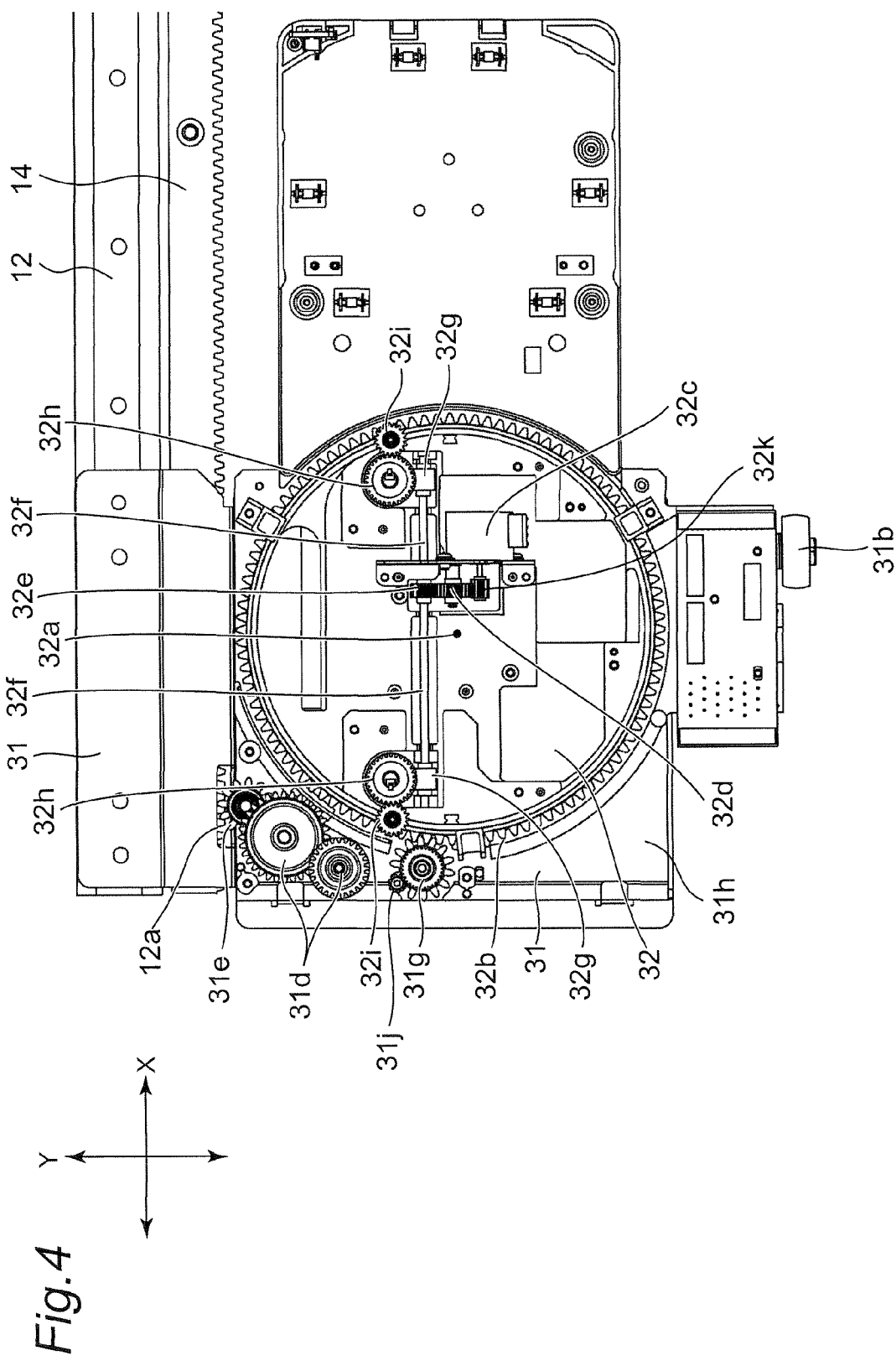
FIG. 4 is a plan view showing the structure of a drive system of an up-and-down table included in the picker shown in FIG. 3.

The picker 3 includes a run base 31. As shown in FIG. 3, a movable platform 31a slidably shifting along the guide rail 12 is attached on one magazine stocker 1 side of the run base 31. Further, as shown in FIG. 4, a roller 31b is attached on other magazine stocker 1 side of the run base 31.

As shown in FIG. 3, the run base 31 is provided with a picker motor 31c that produces drive force for causing the picker 3 to shift in the device depth direction X. A reduction gear 31d meshes with a motor gear 31i, into which the drive shaft of the picker motor 31c is press fitted. The reduction gear 31d meshes with a pinion gear 31e. The pinion gear 31e meshes with a rack 14 provided adjacent to the guide rail 12 to extend in the device depth direction X.

When the picker motor 31c is driven, the drive force of the picker motor 31c is transferred to the pinion gear 31e via the motor gear 31i and the reduction gear 31d, to rotate the pinion gear 31e. Here, the rack 14 is fixed to the bottom chassis 11. On the other hand, the run base 31 is not fixed to the bottom chassis 11. Accordingly, when the pinion gear 31e rotates, the pinion gear 31e shifts along the rack 14, whereby the picker 3 shifts in the device depth direction X.

As the picker motor 31c, for example, a stepping motor is employed. Applying a prescribed pulse to the picker motor 31c, the picker 3 can be shifted to be located at the front of a prescribed magazine 2.

A picker base 31h made of resin is attached to the run base 31 made of a sheet metal. The picker base 31h is provided with a rotary table 32 so as to be rotatable substantially about a rotation axis 32a extending in the device height direction Z. Further, the picker base 31h is provided with a rotary table motor 31f that produces the drive force for causing the rotary table 32 to rotate. As shown in FIG. 4, a reduction gear 31g meshes with the motor gear 31j, into which the drive shaft of the rotary table motor 31f is press fitted. The reduction gear 31g meshes with a rotary table gear 32b provided at the outer circumferential portion of the rotary table 32. When the rotary table motor 31f is driven, the drive force of the rotary table motor 31f is transferred to the rotary table gear 32b via the motor gear 31j and the reduction gear 31g, whereby the rotary table 32 rotates.

The rotary table 32 is provided with a pair of up-and-down rails 33, 33 extending along the device height direction Z and opposing to each other. Between the pair of up-and-down rails 33, 33, an up-and-down table 34 is provided. Further, the rotary table 32 is provided with an up-and-down table motor 32c that produces the drive force for causing the up-and-down table 34 to rise and lower.

As shown in FIG. 4, a relay gear 32d meshes with a motor gear 32k, into which the drive shaft of the up-and-down table motor 32c is press fitted. The relay gear 32d meshes with a coupling shaft gear 32e. A coupling shaft 32f penetrates through the center portion of the coupling shaft gear 32e. Worms 32g, 32g are fixed to the opposite ends of the coupling shaft 32f. The worms 32g mesh with relay gears 32h. The relay gears 32h mesh with lead screw gears 32i. The lead screw gears 32i are fixed to lead screws 32j. The lead screws 32j are provided so as to extend in the device height direction Z along the up-and-down rails 33. As shown in FIG. 3, nuts 34a provided to the up-and-down table 34 are screwed with the lead screws 32j.

When the up-and-down table motor 32c is driven, the drive force of the up-and-down table motor 32c is transferred to the lead screws 32j via the motor gear 32k, the relay gear 32d, the coupling shaft gear 32e, the coupling shaft 32f, the worms 32g, the relay gears 32h, and the lead screw gears 32i, whereby the lead screws 32j rotate. Thus, the up-and-down table 34 rises and lowers in the device height direction Z along the pair of up-and-down rails 33 and 33.

Figure 8:
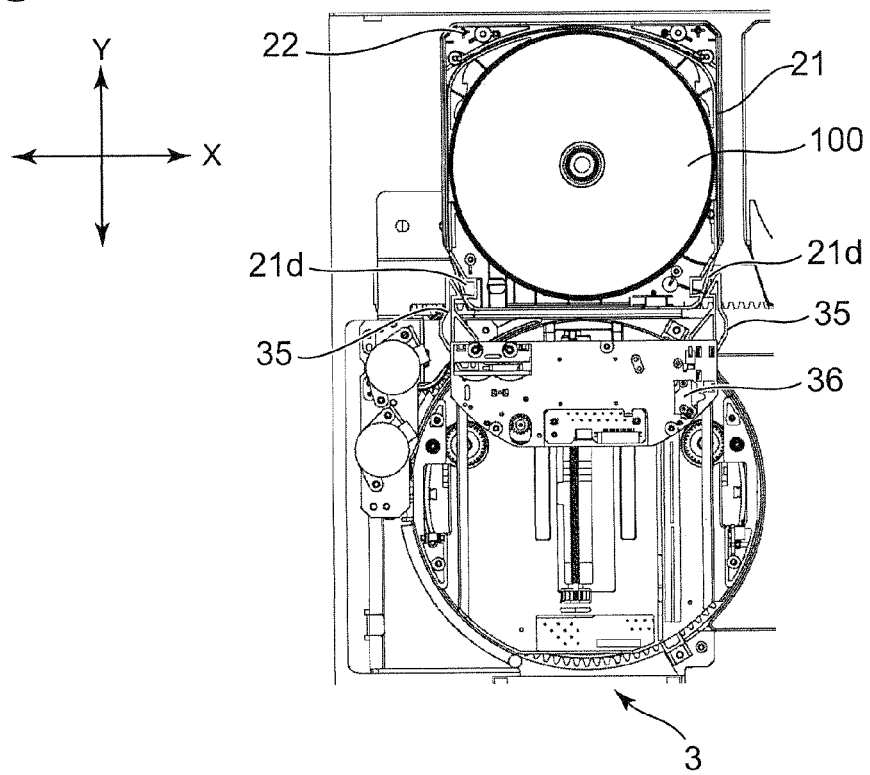
FIG. 8 is a plan view showing the manner of the picker shown in FIG. 3 drawing out the magazine tray from the magazine.

As shown in FIG. 8, the up-and-down table 34 is provided with a pair of hooks 35, 35 that can engage with engaging recess portions 21d of the magazine tray 21, and a chuck 36 functioning to open and close the pair of hooks 35, 35 and to cause the pair of hooks 35, 35 to shift forward and backward.

Figure 5:
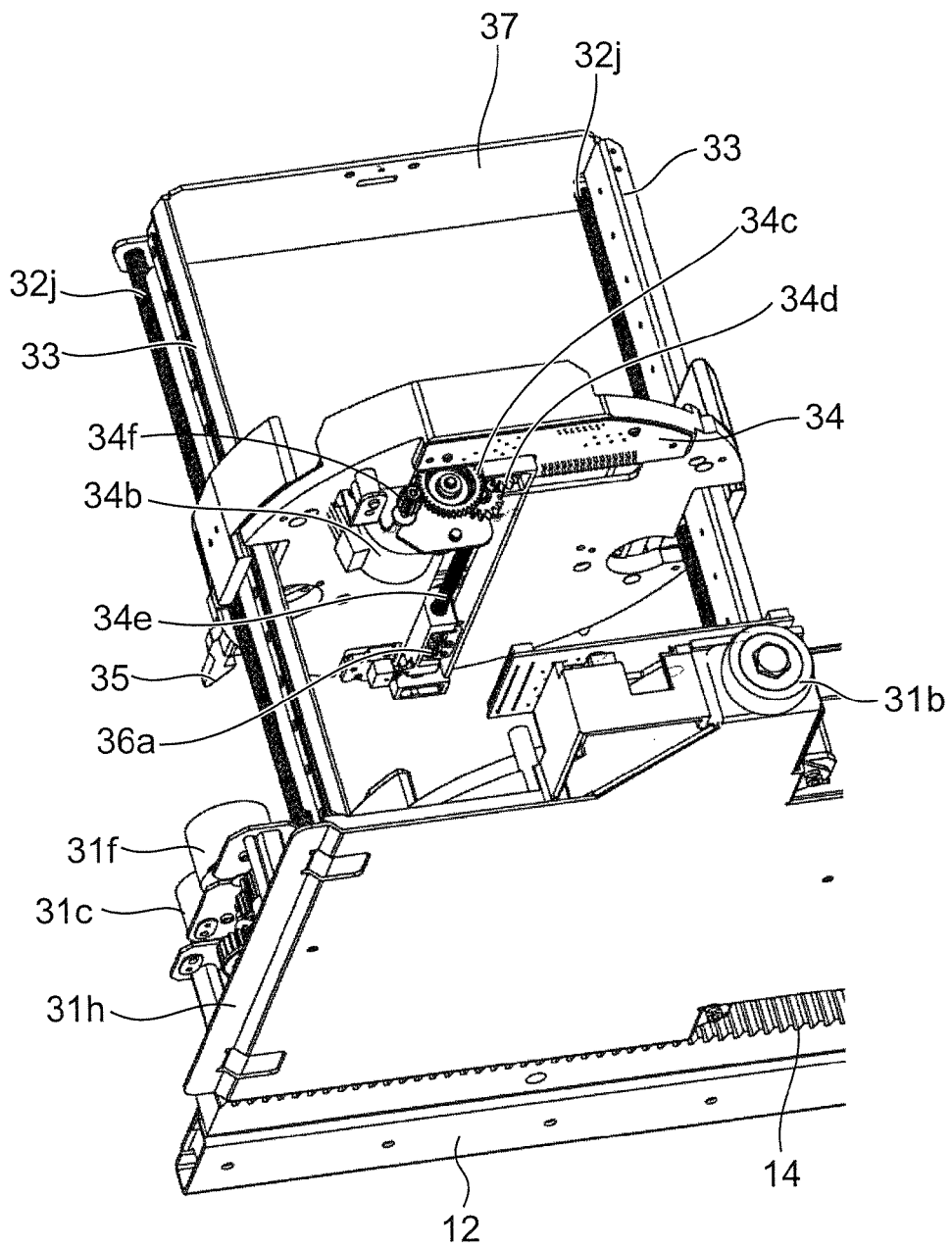
FIG. 5 is a perspective view of the picker shown in FIG. 3 as seen diagonally from below.

Further, as shown in FIG. 5, the up-and-down table 34 is provided with a chuck motor 34b. A reduction gear 34c meshes with a motor gear 34f, into which the drive shaft of the chuck motor 34b is press fitted. The reduction gear 34c meshes with a lead screw gear 34d. The lead screw gear 34d is fixed to a lead screw 34e. The lead screw 34e is provided to extend in the direction perpendicular to the line connecting between the pair of up-and-down rails 33 and 33. A nut 36a fixed to the chuck 36 is screwed with the lead screw 34e.

When the chuck motor 34b is driven, the drive force of the chuck motor 34b is transferred to the nut 36a via the motor gear 34f, the reduction gear 34c, the lead screw gear 34d, and the lead screw 34e, whereby the chuck 36 shifts along the lead screw 34e.

Further, the chuck 36 is structured to be capable of adjusting the interval of the pair of hooks 35, 35. By the chuck 36 reducing the interval between the pair of hooks 35, 35, the pair of hooks 35, 35 can engage with the engaging recess portions 21d, 21d of the magazine tray 21. On the other hand, by the chuck 36 increasing the interval of the pair of hooks 35, 35, the engaged state between the pair of hooks 35, 35 and the engaging recess portions 21d, 21d of the magazine tray 21 can be released.

The paired up-and-down rails 33 are attached to opposite side faces of a U-shaped angle plate 37, respectively. The top end portions of the paired lead screws 32j are rotatably attached to the top face of the angle plate 37.

The picker motor 31c, the rotary table motor 31f, the up-and-down table motor 32c, and the chuck motor 34b are connected to the control unit of the electric circuit and the power supply 7 via an FFC (flexible flat cable) 114 (see FIG. 1), and drive under control of the control unit.

Figure 6:
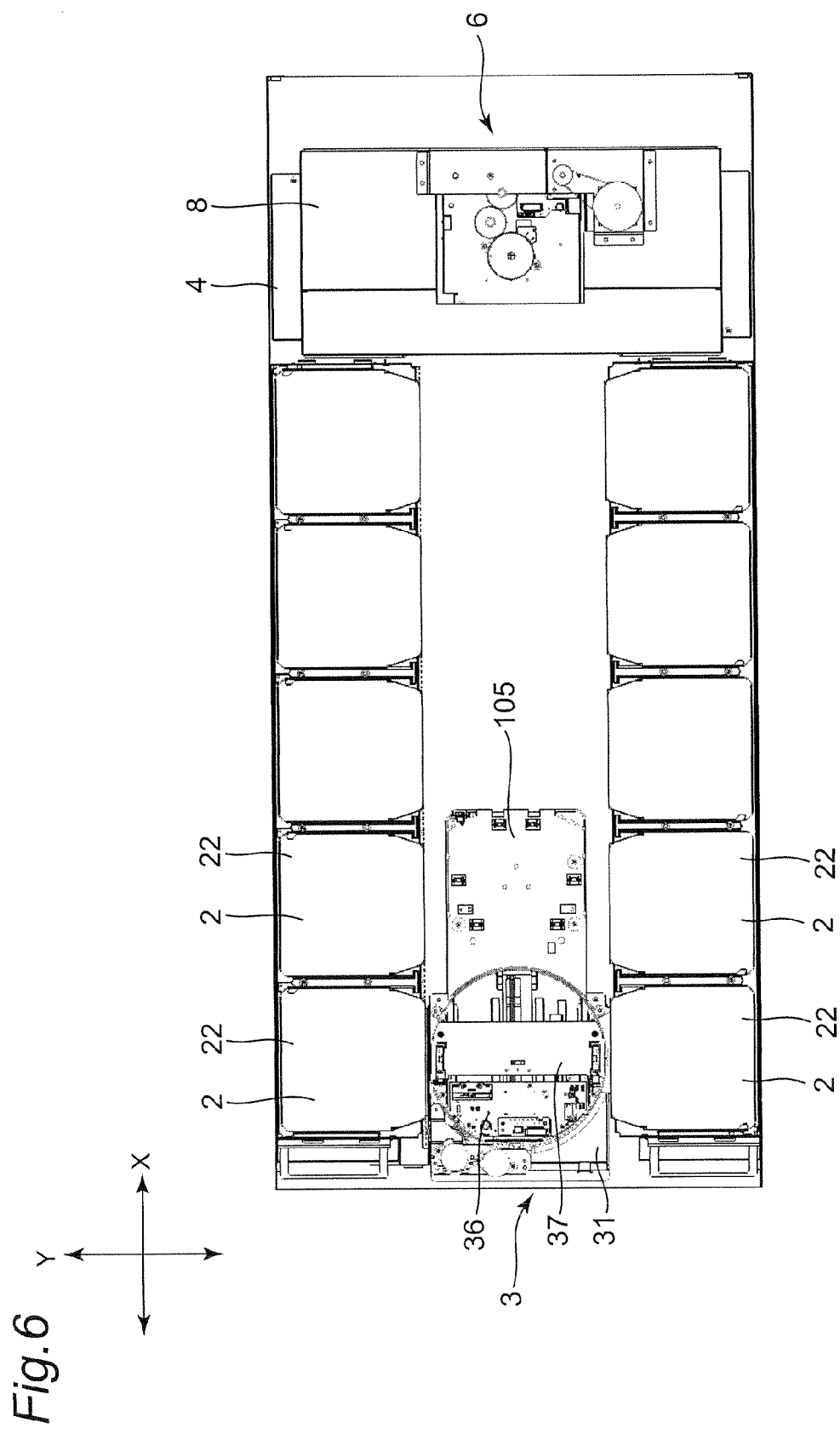
FIG. 6 is a plan view showing the state where the picker shown in FIG. 3 shifts to the position at the front of the magazine selected from a plurality of magazines.
Figure 7:
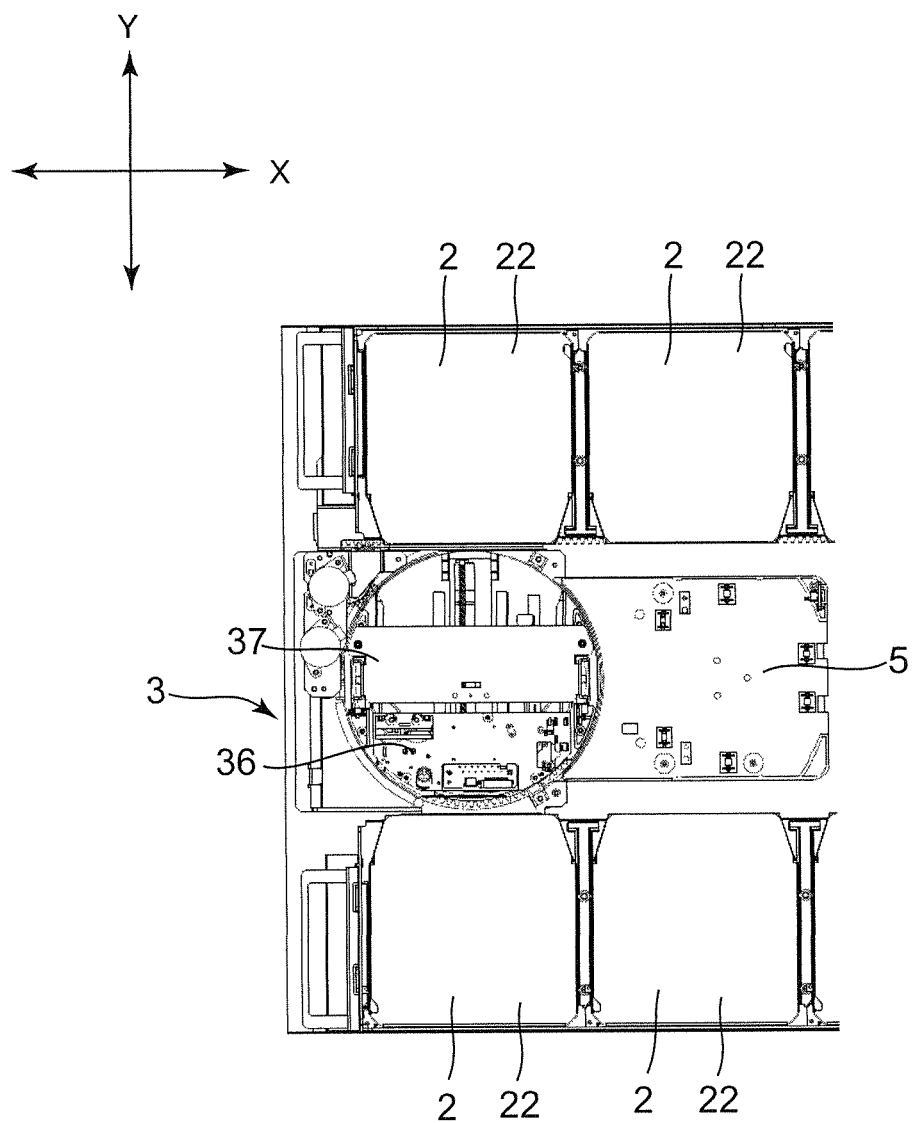
FIG. 7 is a plan view showing the manner of the picker shown in FIG. 3 drawing out a magazine tray from the magazine.

FIGS. 6 to 12 each show the manner of the picker 3 drawing out the magazine tray 21 from the case 22. As the run base 31 runs in the device depth direction X and the up-and-down table 34 rises and lowers in the device height direction Z along the pair of up-and-down rails 33, as shown in FIG. 6, the picker 3 shifts to the location at the front of one magazine 2 selected from a plurality of magazines 2. Further, as shown in FIG. 7, the rotary table 32 is rotated so that the chuck 36 is oriented to the front side of the magazine 2.

Figure 9:
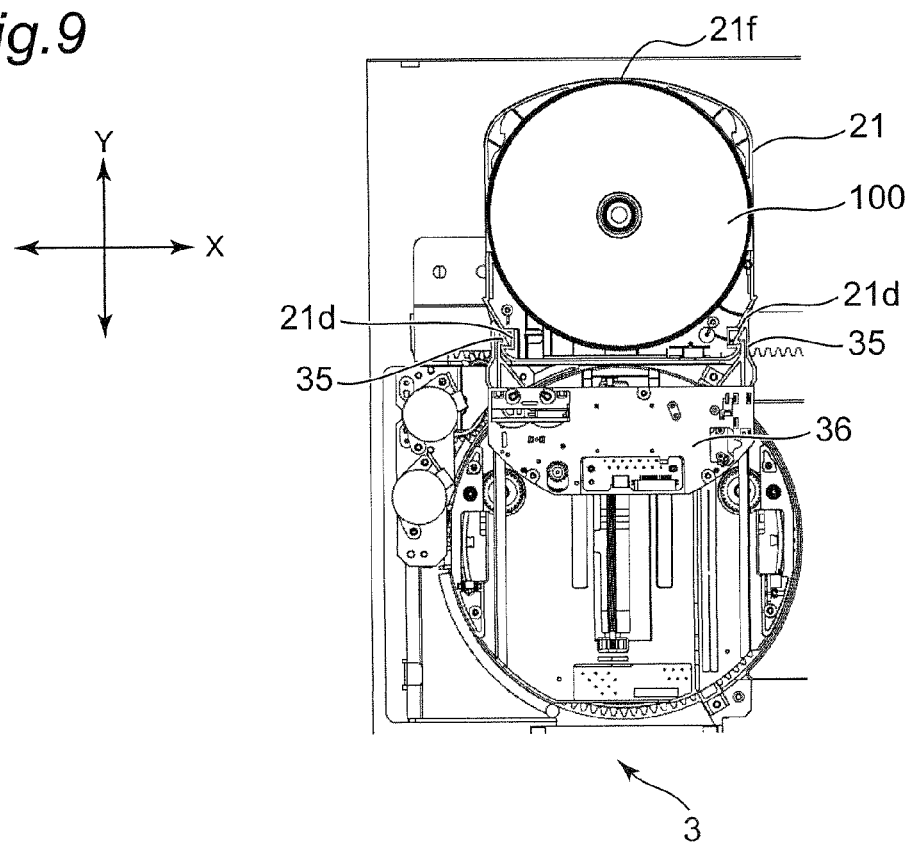
FIG. 9 is a plan view showing the manner of the picker shown in FIG. 3 drawing out the magazine tray from the magazine.

Thereafter, as shown in FIG. 8, the chuck 36 advances toward the magazine tray 21, whereby, as shown in FIG. 9, the pair of hooks 35, 35 is engaged with the engaging recess portions 21d, 21d of the magazine tray 21. In this state, by the chuck 36 receding from the case 22, the magazine tray 21 is drawn out from the case 22.

Figure 10:
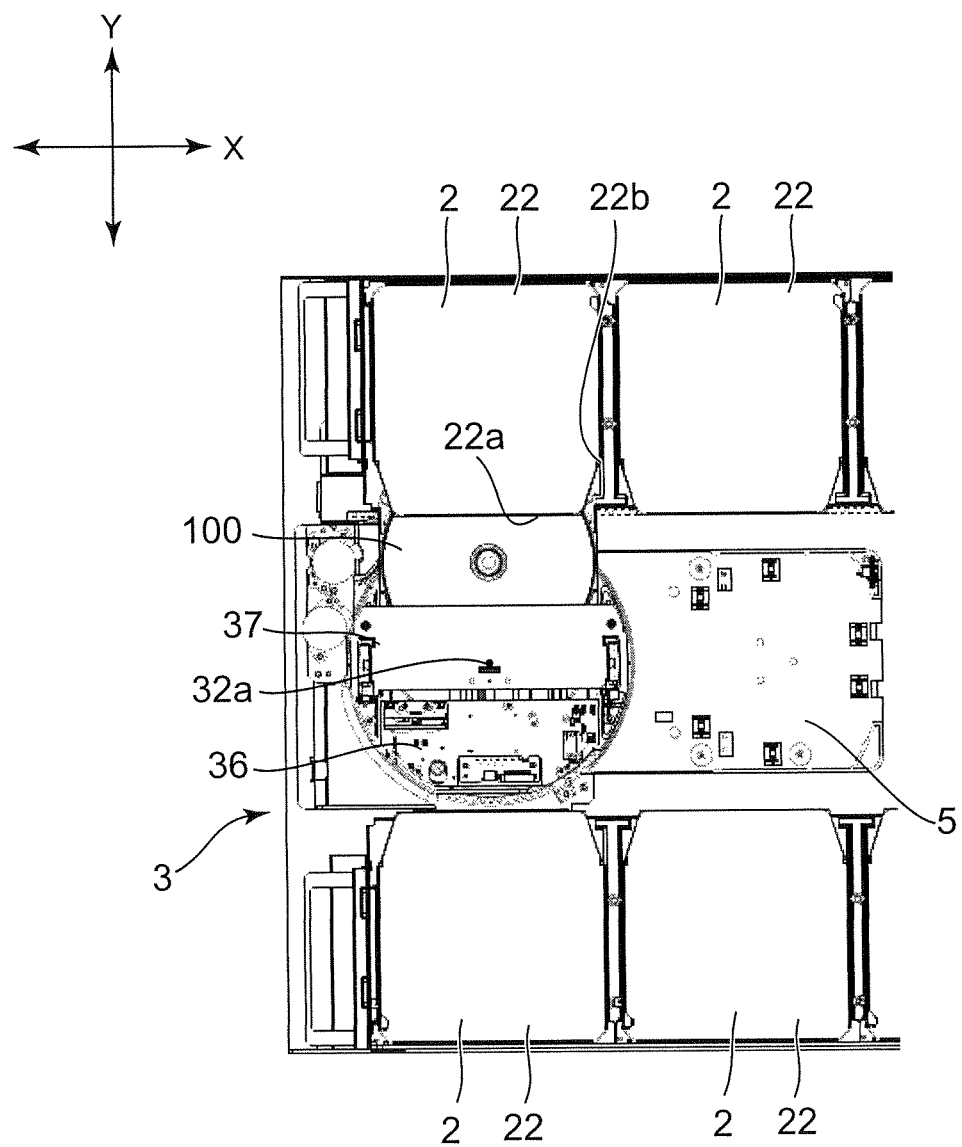
FIG. 10 is a plan view showing the manner of the picker shown in FIG. 3 drawing out the magazine tray from the magazine.
Figure 11:
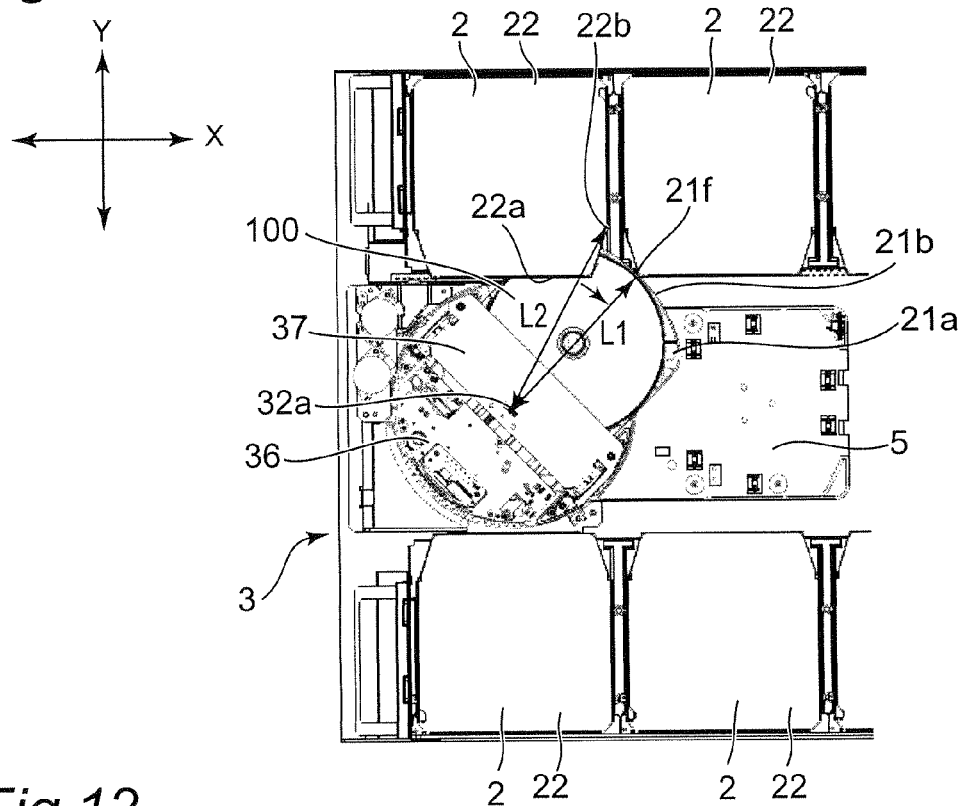
FIG. 11 is a plan view showing the manner of the picker shown in FIG. 3 drawing out the magazine tray from the magazine.
Figure 12:
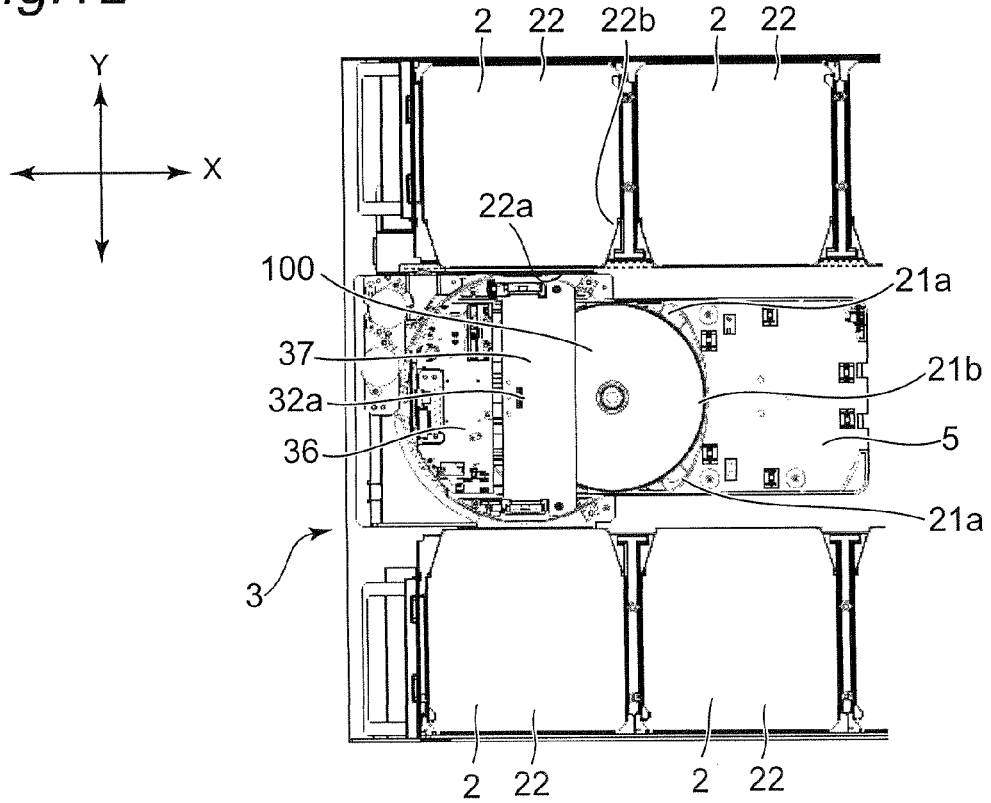
FIG. 12 is a plan view showing the state where the picker shown in FIG. 3 has drawn out the magazine tray from the magazine.

As shown in FIG. 10, by the chuck 36 receding (i.e., shifting to the location at the front of the case 22), after the cut portions 21a of the magazine tray 21 pass through the opening 22a of the case 22, the rotary table 32 rotates clockwise substantially about the rotation axis 32a. In other words, as shown in FIG. 11, when the distance L1 between a vertex 21f (i.e., the position farthest from the rotation axis 32a) of the side face 21b of the magazine tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 11 and 12, the magazine tray 21 rotates substantially about the rotation axis 32a. As a result, as shown in FIG. 12, the magazine tray 21 is completely drawn out from the case 22.

Figure 13:
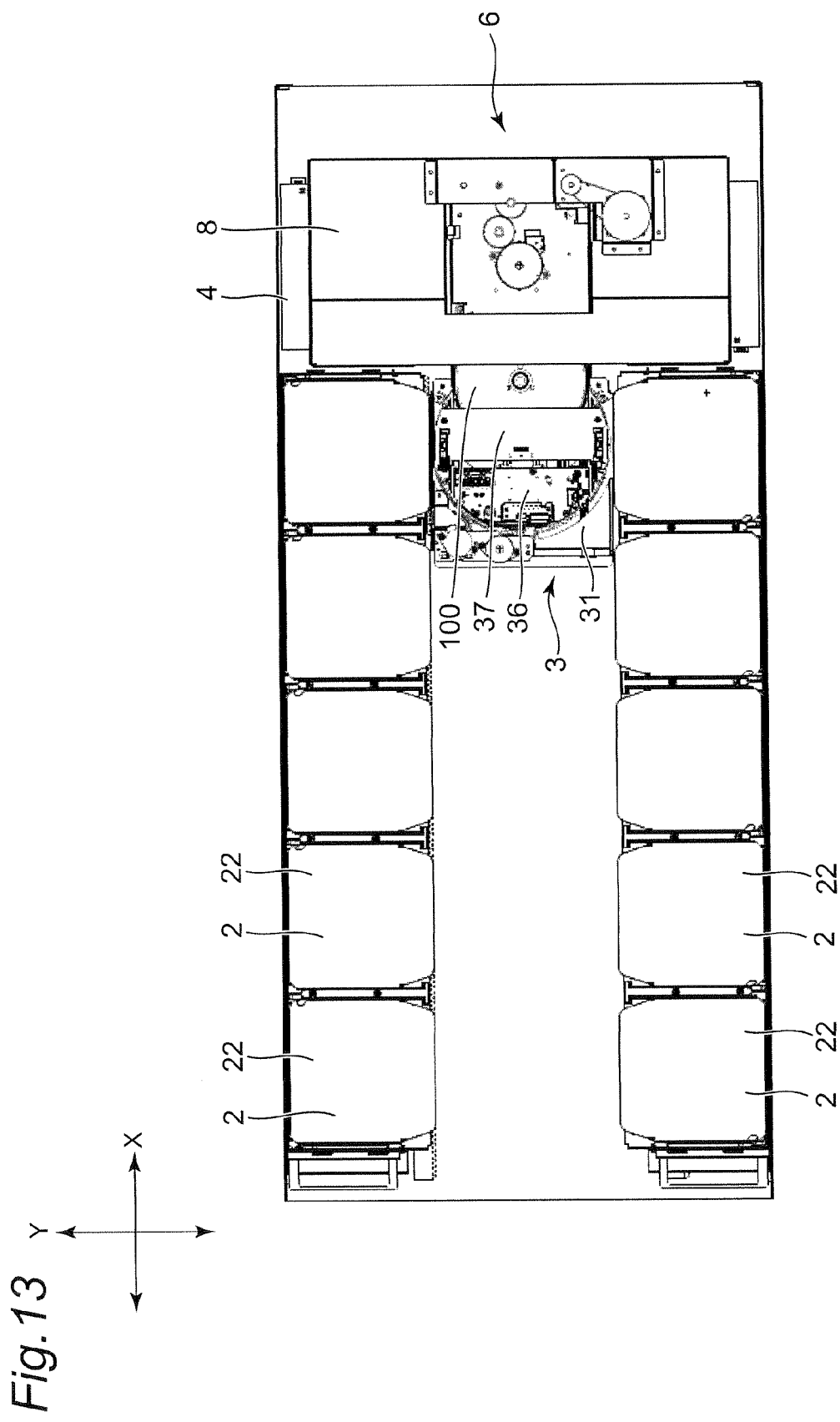
FIG. 13 is a plan view showing the state where the picker shown in FIG. 3 has conveyed the magazine tray to a position near the plurality of disc drives.
Figure 14:
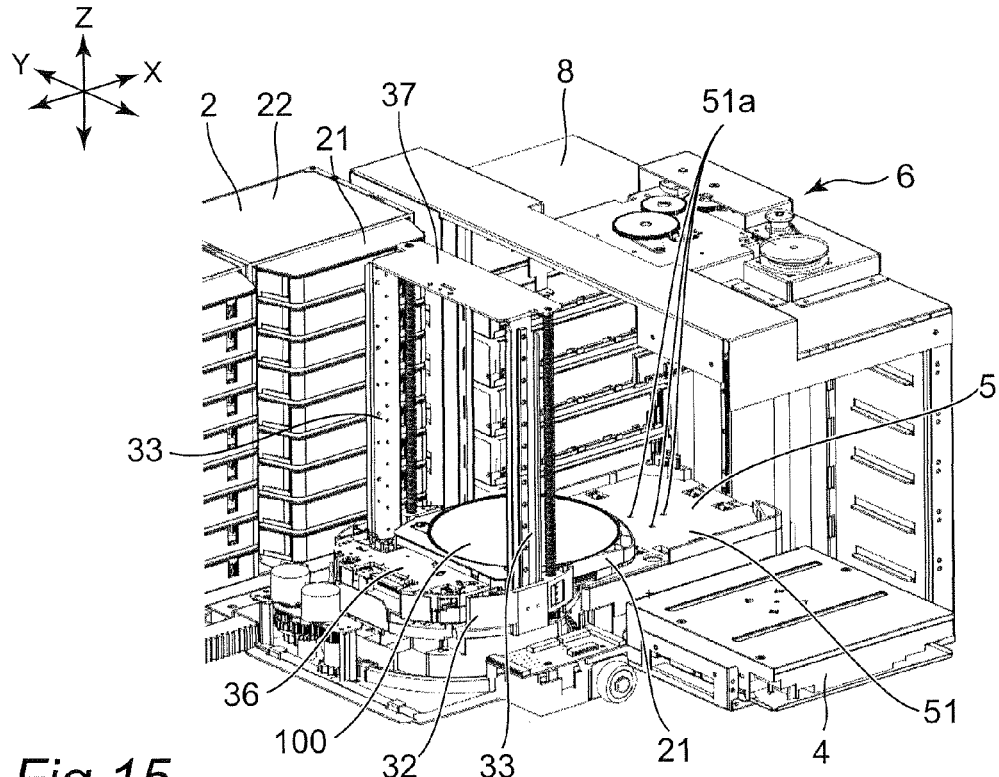
FIG. 14 is a perspective view showing the state where the picker shown in FIG. 3 has conveyed the magazine tray to a position near the plurality of disc drives.
Figure 15:
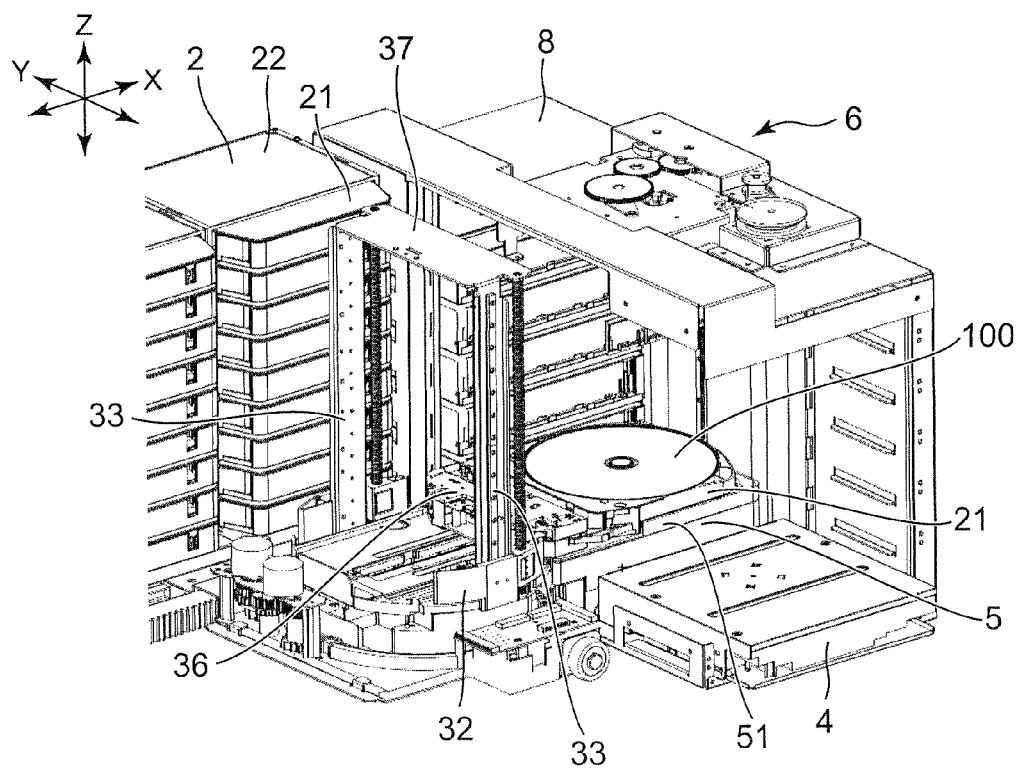
FIG. 15 is a perspective view showing the state where the picker shown in FIG. 3 has shifted the magazine tray to a position above a lifter included in the disc device shown in FIG. 1.

As shown in FIG. 12, the magazine tray 21 drawn out from the case 22 is conveyed to the location near the plurality of disc drives 4 as shown in FIGS. 13 and 14, by the run base 31 of the picker 3 running to the device-rear side. Thereafter, as shown in FIG. 15, the chuck 36 of the picker 3 advances, and the magazine tray 21 is placed at a prescribed position on the magazine tray guide 51 at the top of the lifter 5. It is to be noted that, the disc drives 4 on the near side are not shown in FIGS. 14 and 15. Similarly, the disc drives 4 on the near side are not shown also in FIGS. 21 to 28, which will be referred to later.

Figure 16:
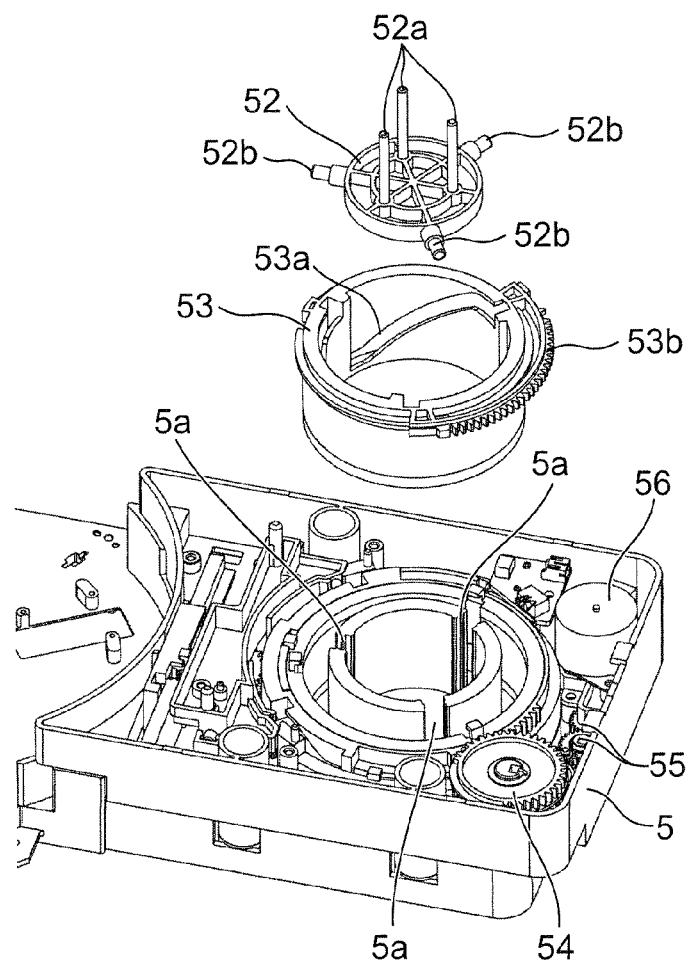
FIG. 16 is an exploded perspective view showing the state where a magazine tray guide of the lifter included in the disc device shown in FIG. 1 is removed.
Figure 17:
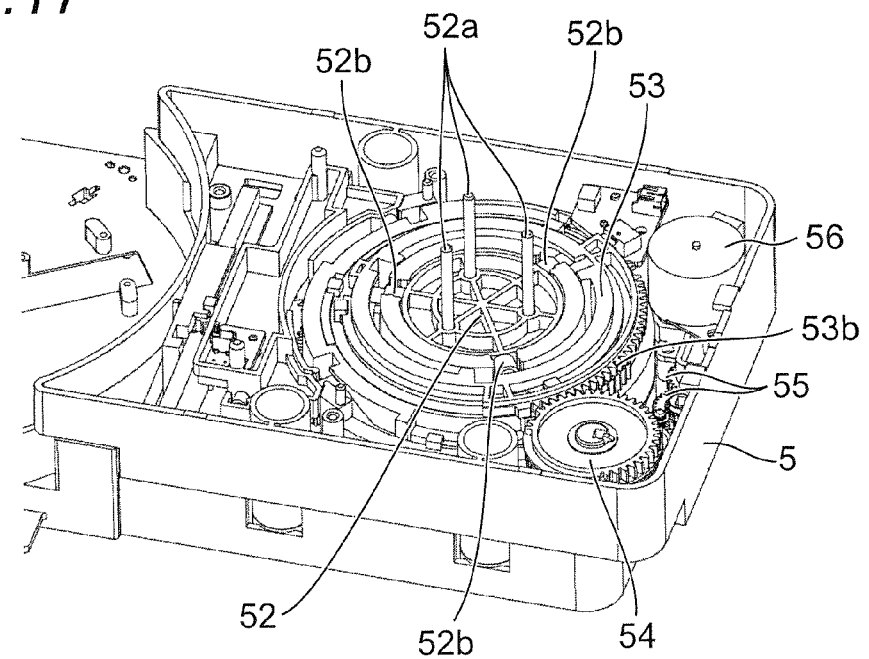
FIG. 17 is an assembly perspective view showing the state where the magazine tray guide of the lifter included in the disc device shown in FIG. 1 is removed.

FIG. 16 is an exploded perspective view showing the state where the magazine tray guide 51 of the lifter 5 is taken out, and FIG. 17 is an assembly perspective view thereof.

As shown in FIGS. 16 and 17, the lifter 5 includes an up-and-down plate 52, a rotary cam 53, a drive gear 54, a relay gear 55, and a lifter motor 56.

The up-and-down plate 52 includes up-and-down pins 52a each being an exemplary rod-like member, and cam pins 52b. In the present embodiment, the three up-and-down pins 52a are provided at an interval of 120 degrees, and so are the three cam pins 52b.

The three up-and-down pins 52a are provided at positions where they agree with the three holes 21e provided at the magazine tray 21 as shown in FIG. 2B, when the magazine tray 21 is placed at the prescribed position on the magazine tray guide 51 as shown in FIG. 15. Further, as shown in FIG. 14, the magazine tray guide 51 is provided with three holes 51a at the positions corresponding to the three up-and-down pins 52a. The three cam pins 52b are engaged with three slits 5a provided at the body of the lifter 5. The slits 5a are provided so as to extend in the device height direction Z.

Three cam grooves 53a are provided at the inner circumferential face of the rotary cam 53. Each cam groove 53a has an inclined face along which the tip portion of corresponding one of the three cam pins 52b slides. A cam gear 53b is provided at the outer circumferential face of the rotary cam 53. The cam gear 53b meshes with the drive gear 54. The drive gear 54 meshes with the relay gear 55. The relay gear 55 meshes with the motor gear (not shown), into which the drive shaft of the lifter motor 56 is press fitted.

When the lifter motor 56 is driven, the drive force of the lifter motor 56 is transferred to the drive gear 54 via the motor gear (not shown) and the relay gear 55, whereby the drive gear 54 rotates. Thus, the rotary cam 53 meshing with the drive gear 54 by the cam gear 53b rotates. As the rotary cam 53 rotates, tip portions of the three cam pins 52b, whose rotation is regulated by the three slits 5a, slide along the inclined face of the three cam grooves 53a, and the up-and-down plate 52 rises and lowers in the device height direction Z. The lifter motor 56 is connected to the control unit of the electric circuit and the power supply 7 via the FFC 14 (see FIG. 1), and drives under control of the control unit.

As shown in FIG. 17, when the up-and-down plate 52 rises, the three up-and-down pins 52a enter inside the magazine tray 21 through the three holes 51a of the magazine tray guide 51 and the three holes 21e of the magazine tray 21. By the rising of the three up-and-down pins 52a, a plurality of discs 100 are pushed out from the magazine tray 21. The plurality of discs 100 pushed out by the three up-and-down pins 52a are retained by the carrier 6.

Figure 18:
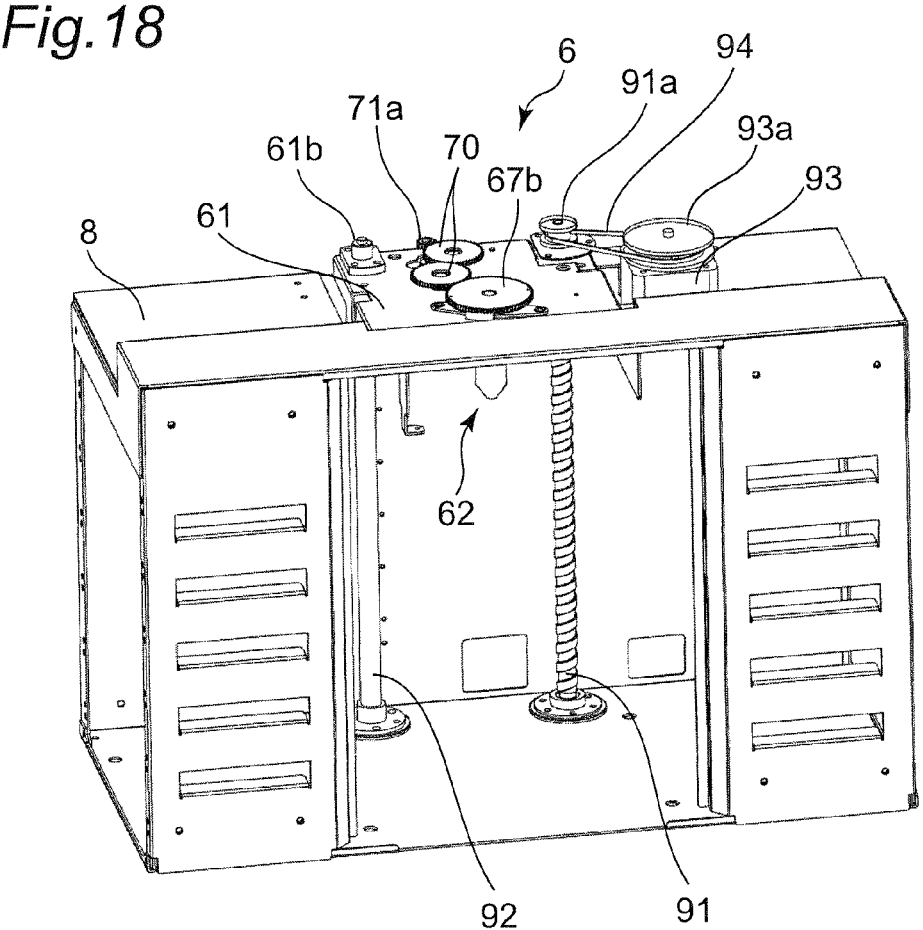
FIG. 18 is a perspective view of a carrier included in the disc device shown in FIG. 1.

As shown in FIG. 18, the carrier 6 is provided at a housing 8 storing a plurality of (e.g., 12 pieces of) disc drives 4. The carrier 6 includes a shift base 61 shifting in the device height direction Z and a disc chuck unit 62 provided at the shift base 61.

Figure 19:
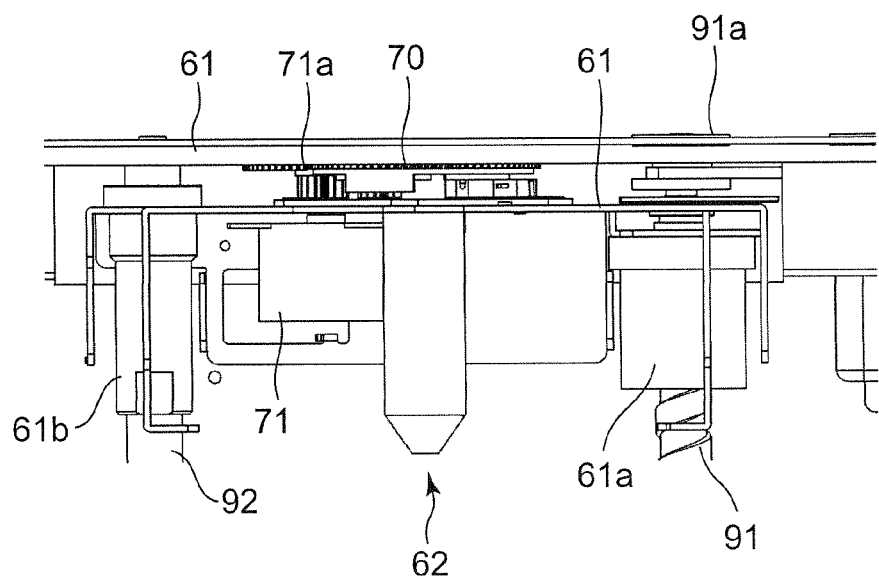
FIG. 19 is a partial enlarged side view of the carrier shown in FIG. 18.

As shown in FIG. 19, the shift base 61 is connected to a ball screw 91 via a bush 61a and connected to a guide shaft 92 via a guide shaft bearing 61b. The ball screw 91 and the guide shaft 92 are provided so as to extend in the device height direction Z.

As shown in FIG. 18, a pulley 91a is attached to the top end portion of the ball screw 91. Further, the housing 8 is provided with a carrier motor 93 that produces the drive force for rotating the ball screw 91 about its axis. A pulley 93a is attached to the drive shaft of the carrier motor 93. A belt 94 is wrapped around the pulley 91a and the pulley 93a.

When the carrier motor 93 is driven, the drive force of the carrier motor 93 is transferred to the ball screw 91 via the pulley 93a, the belt 94, and the pulley 91a, and the ball screw 91 rotates about its axis. By the rotation of the ball screw 91, the shift base 61 is guided by the ball screw 91 and the guide shaft 92 and shifts in the device height direction Z. The carrier motor 93 is connected to the control unit of the electric circuit and the power supply 7, and drives under control of the control unit.

The disc chuck unit 62 is structured to retain a plurality of discs 100 pushed out by the lifter 5, and to separate the retained plurality of discs 100 one by one. The detail of the structure of the shift base 61 and the disc chuck unit 62 will be detailed later.

Figure 20:
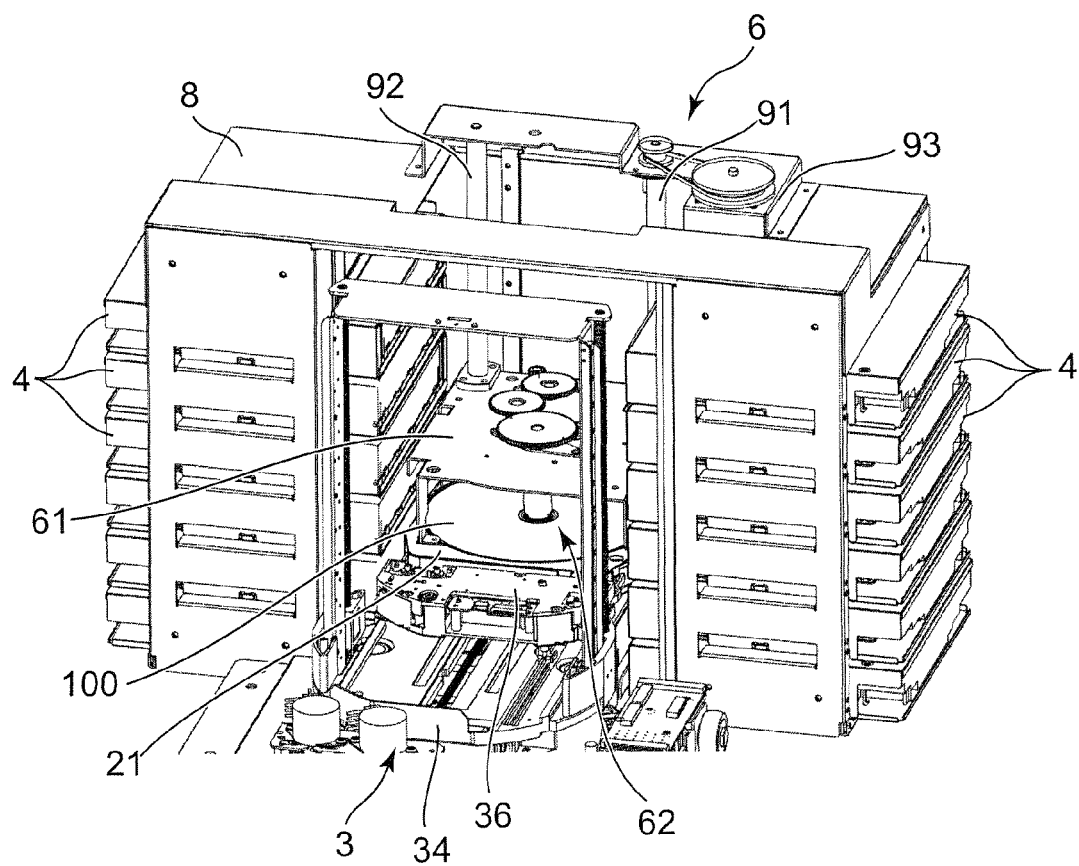
FIG. 20 is a perspective view showing the state where a disc chuck unit included in the carrier shown in FIG. 18 is lowered to a position above and near the magazine tray.
Figure 21:
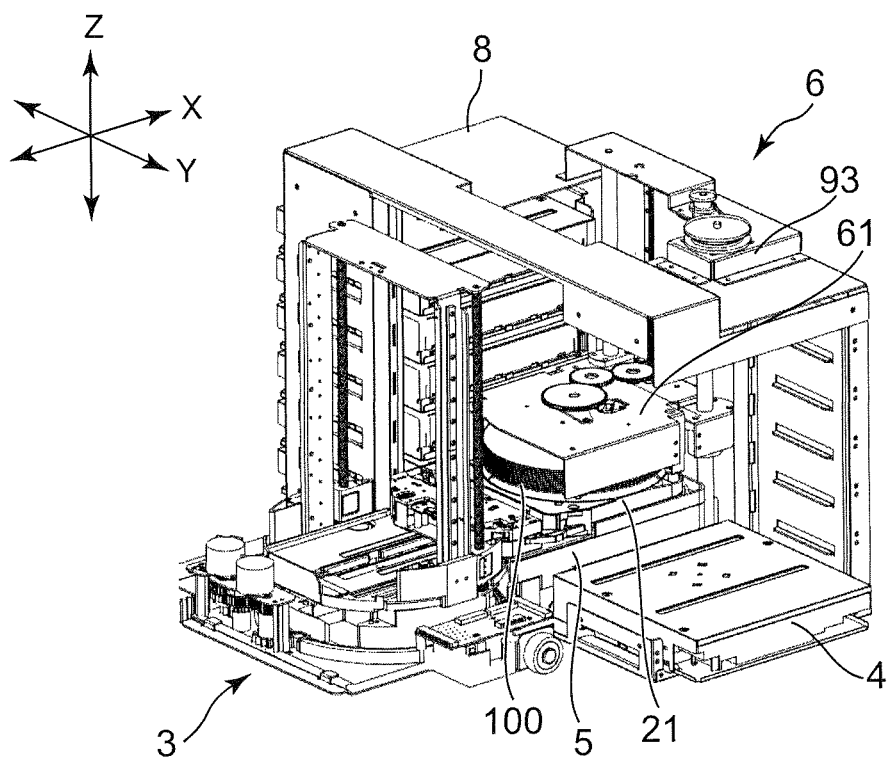
FIG. 21 is a perspective view showing the state where all the discs are held by the disc chuck unit.

As shown in FIG. 15, when the magazine tray 21 is placed at a prescribed position at the top of the lifter 5, as shown in FIG. 20, the shift base 61 is lowered to the position near the magazine tray 21. Thus, the tip portion of the disc chuck unit 62 engages with the engaging portion 23a of the core rod 23 (see FIG. 2B) provided at the magazine tray 21, whereby the disc chuck unit 62 and the core rod 23 become coaxial to each other. In this state, the lifter motor 56 is driven and the up-and-down plate 52 rises (see FIG. 17).

When the up-and-down plate 52 rises, the up-and-down pins 52a enter inside the magazine tray 21 through the holes 51a and 21e, to push out a plurality of discs 100 from the magazine tray 21. Thus, as show in FIG. 21, the disc chuck unit 62 retains the plurality of discs 100.

Figure 22:
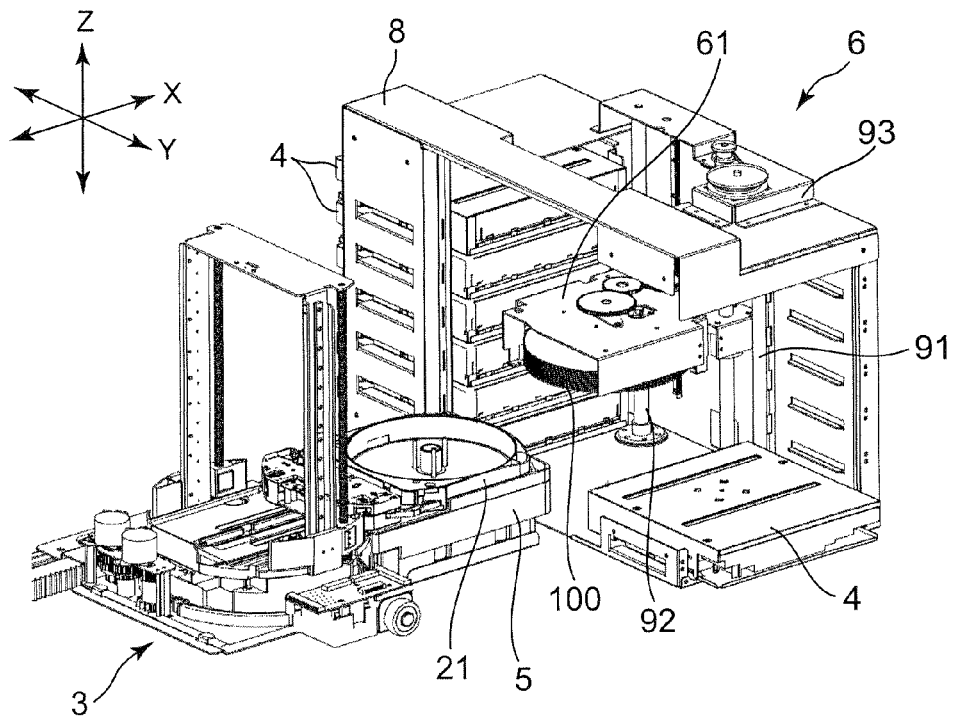
FIG. 22 is a perspective view showing the state, which follows the state shown in FIG. 21, where the picker has shifted to the device-front side, and the magazine tray has receded from the position near the disc drive.
Figure 23:
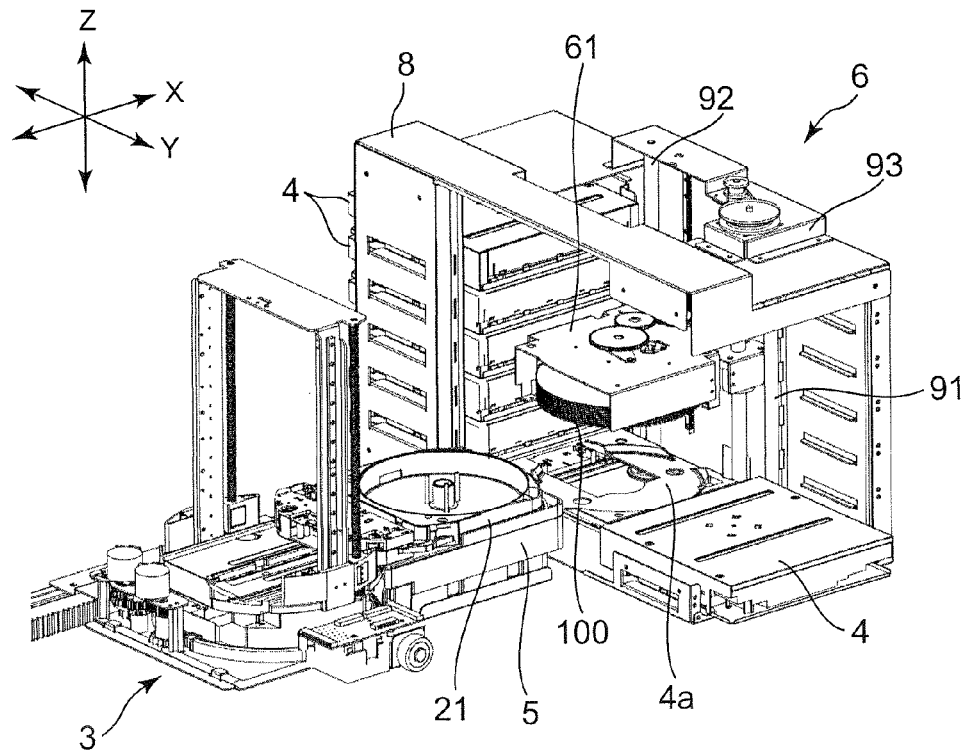
FIG. 23 is a perspective view showing the state, which follows the state shown in FIG. 22, where a tray of the bottommost-stage disc drive is ejected.

When the disc chuck unit 62 retains all the discs 100, the shift base 61 rises as being guided by the ball screw 91 and the guide shaft 92. Thus, engagement between the tip portion of the disc chuck unit 62 and the engaging portion 23a of the core rod 23 (see FIG. 2B) is released. Thereafter, as shown in FIG. 22, the picker 3 shifts to the device-front side, and the magazine tray 21 recedes from the location near the disc drive 4. Thereafter, under control of the control unit of the electric circuit and the power supply 7, the tray 4a of the disc drive 4 is ejected as shown in FIG. 23.

Figure 24:
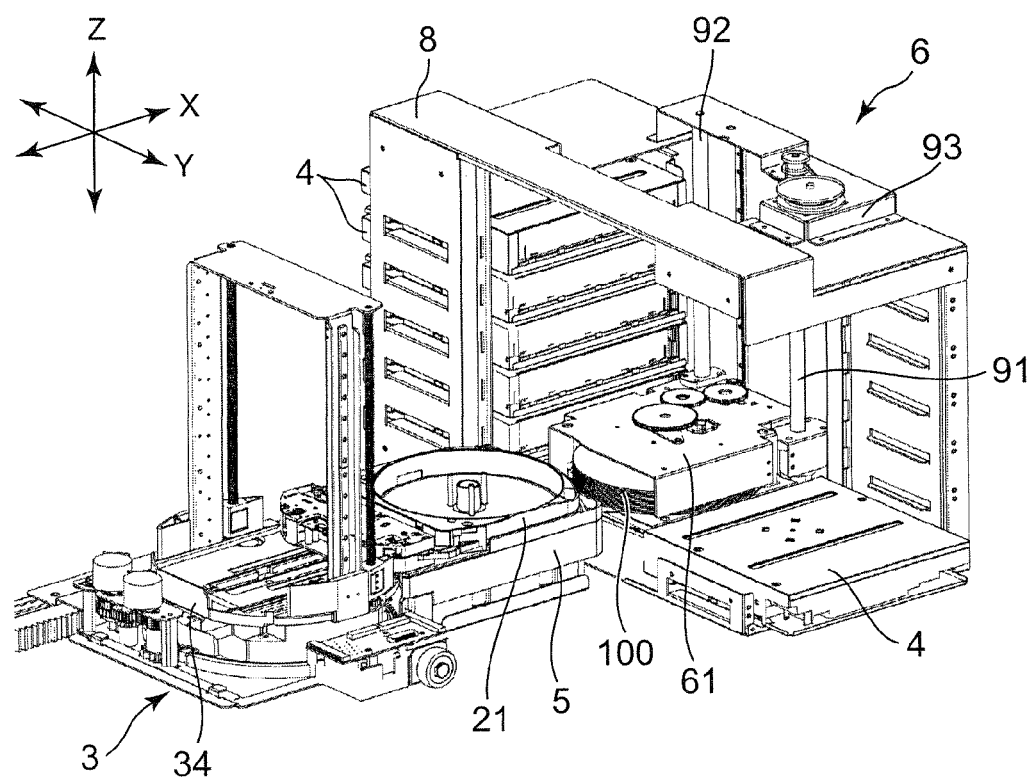
FIG. 24 is a perspective view showing the state, which follows the state shown in FIG. 23, where a shift base is lowered such that the plurality of discs retained by the disc chuck unit position above the tray.
Figure 25:
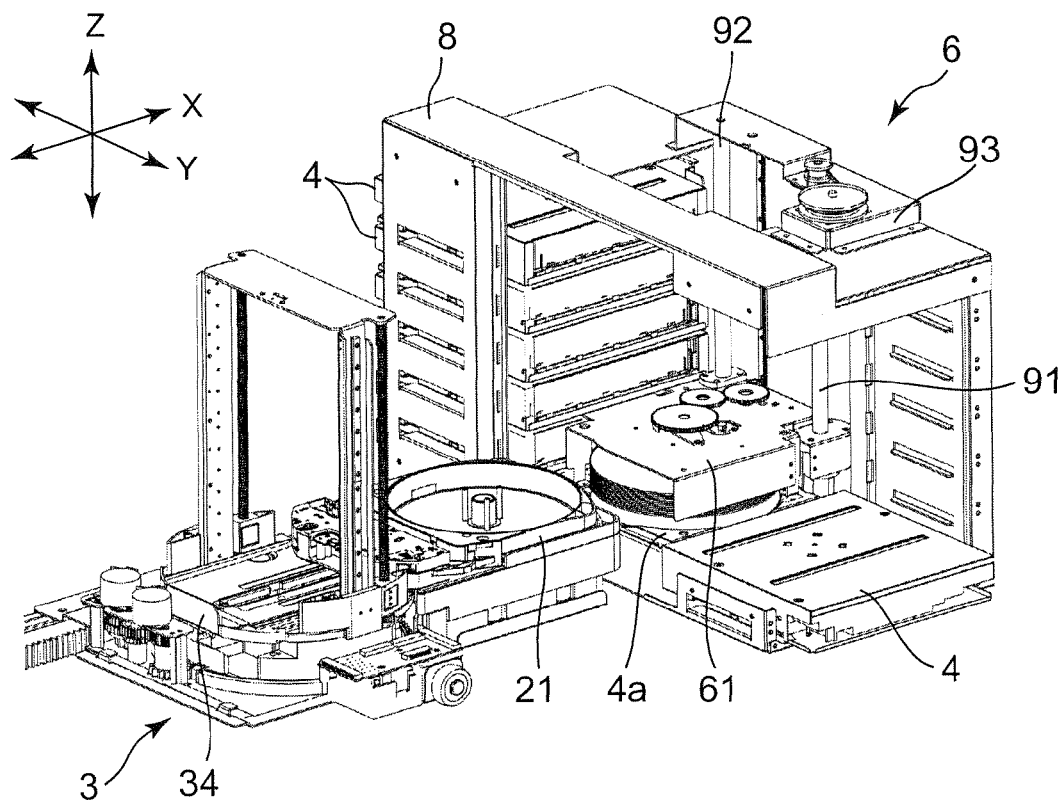
FIG. 25 is a perspective view showing the state where the bottommost disc is placed on the tray.

Thereafter, as shown in FIG. 24, the shift base 61 is lowered such that the plurality of discs 100 retained by the disc chuck unit 62 are located above the tray 4a (e.g., immediately above). Thereafter, by the disc chuck unit 62, the bottommost disc 100 is separated from the other discs, and placed on the tray 4a. FIG. 25 is a perspective view showing the state where the bottommost disc 100 is placed on the tray 4a.

Figure 26:
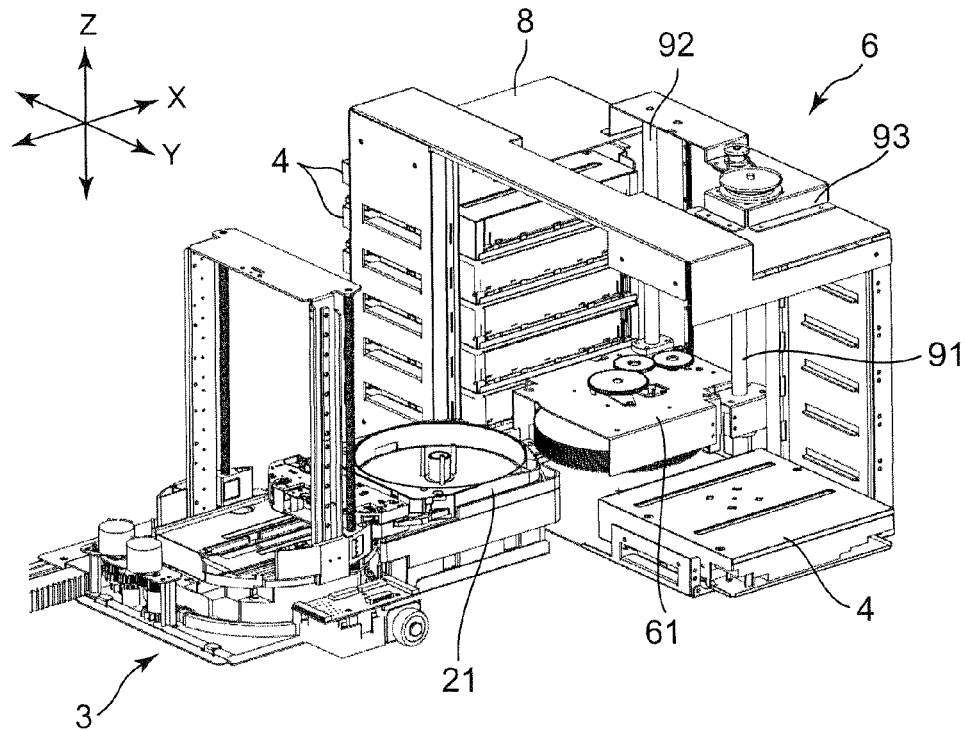
FIG. 26 is a perspective view showing the state, which follows the state shown in FIG. 25, where the tray has been carried into the disc drive.

When the bottommost disc 100 is placed on the tray 4a, the shift base 61 is raised such that the disc chuck unit 62 and the tray 4a are not brought into contact with each other. Thereafter, as shown in FIG. 26, the tray 4a is carried into the disc drive 4. Thereafter, or simultaneously therewith, the tray 4a of the disc drive 4 opposing to the handled disc drive is ejected (not shown). Thereafter, in the manner similarly to that described above, a disc 100 is placed on the tray 4a, and the tray 4a is carried into the disc drive 4. Thus, the loading operation as to the disc drives 4 of the bottommost stage (first stage) is completed. This loading operation is repeated as to the second and following stages.

Figure 27:
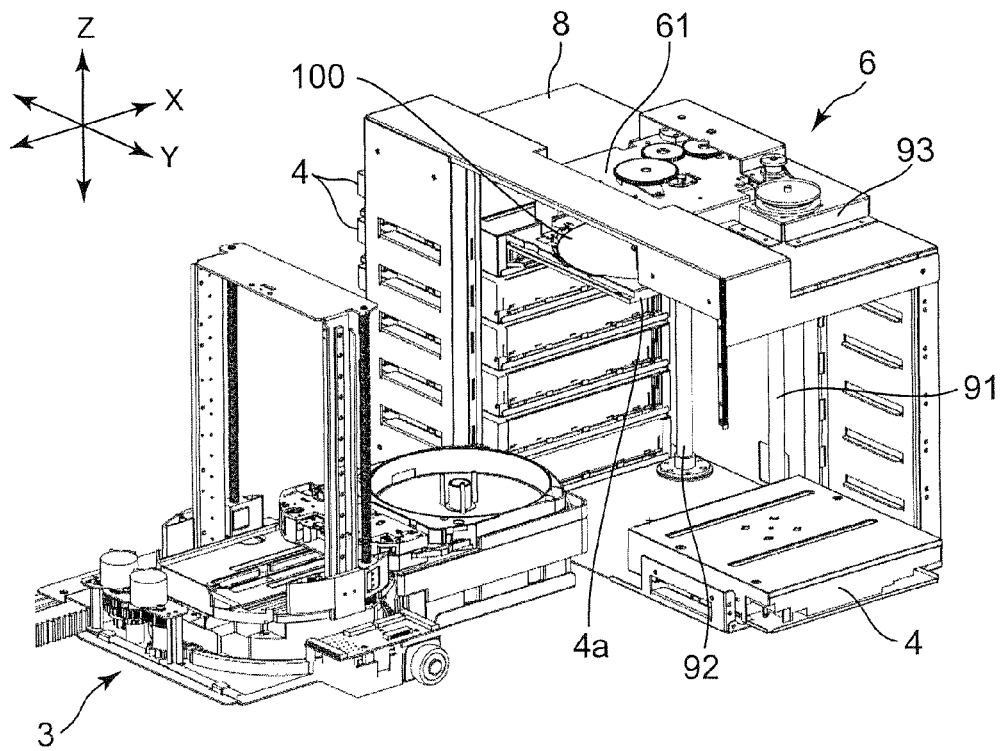
FIG. 27 is a perspective view where the carrier places a disc on the tray of the topmost-stage disc drive.

FIG. 27 shows the manner in which a disc 100 is placed on the tray 4a of the disc drive 4 of the topmost stage (e.g., sixth stage). When the loading operation as to the topmost-stage disc drives 4 is completed, all the disc drives 4 now accommodate the discs 100, and recording on or reproduction from the discs 100 in the disc drives 4 is enabled.

It is to be noted that, the collection of the discs 100 in the disc drives 4 should be performed in the order reverse to the foregoing manner, for example. Specifically, it is performed as follows.

Firstly, as shown in FIG. 27, the tray 4a of the topmost-stage disc drive 4 is ejected.

Thereafter, the disc chuck unit 62 is inserted into the center hole 100a of the disc 100 on the tray 4a, and the disc chuck unit 62 retains the disc 100.

Thereafter, the tray 4a from which the disc 100 is collected by the disc chuck unit 62 is carried into the disc drive 4. Thereafter or simultaneously therewith, the tray 4a of the disc drive 4 opposing to the handled disc drive is ejected (not shown). Thereafter, in the manner similarly to that described above, the disc 100 of the tray 4a is collected by the disc chuck unit 62, and the tray 4a is carried into the disc drive 4. Thus, the disc collection operation as to the disc drives 4 of the topmost stage (first stage) is completed. This disc collection operation is repeated until the discs 100 in the bottommost-stage disc drives 4 are collected.

When the disc chuck unit 62 has collected all the discs 100, the shift base 61 is raised. Thereafter, the picker 3 shifts to the device-rear side, and the magazine tray 21 is set below the disc chuck unit 62.

Thereafter, the shift base 61 is lowered, and the tip portion of the disc chuck unit 62 engages with the engaging portion 23a (see FIG. 2B) of the core rod 23, whereby the disc chuck unit 62 and the core rod 23 become coaxial to each other.

Figure 28:
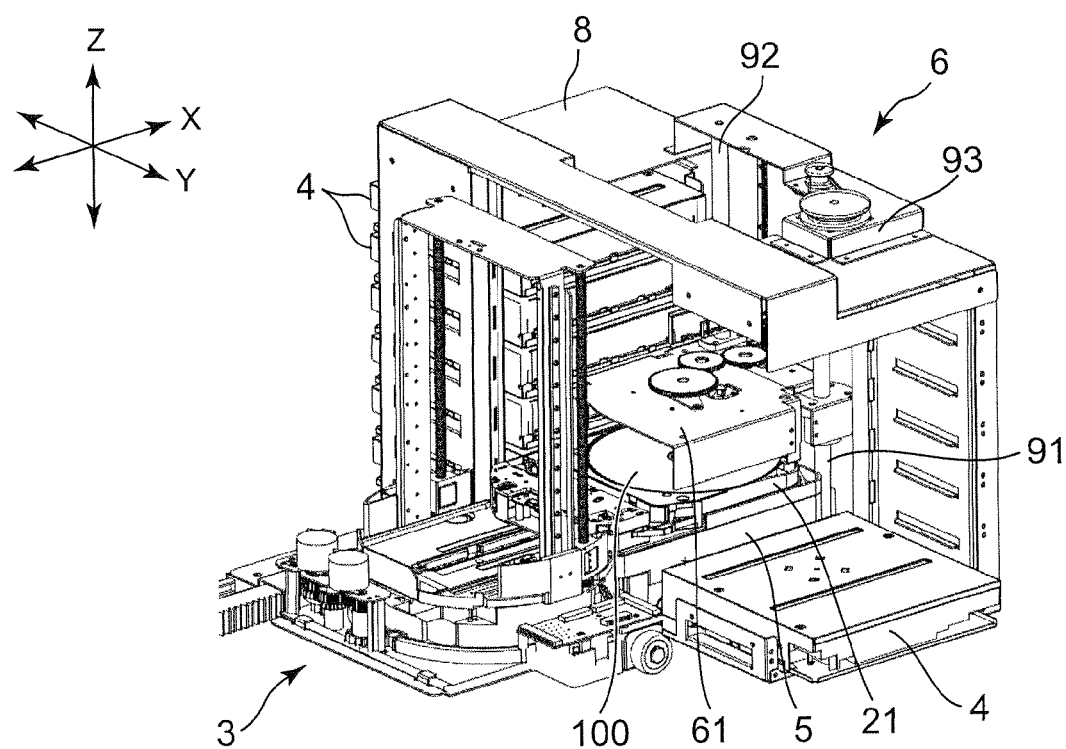
FIG. 28 is a perspective view showing the state where a plurality of discs collected by the carrier are stored in the magazine tray.

Thereafter, all the discs 100 retained by the disc chuck unit 62 are pushed into the magazine tray 21 as shown in FIG. 28, and stored.

Thereafter, the shift base 61 is raised, and the engagement between the tip portion of the disc chuck unit 62 and the engaging portion 23a of the core rod 23 is released.

The magazine tray 21 having stored all the discs 100 are returned into the magazine stocker 1 by the picker 3. This conveyance of the magazine tray 21 into the magazine stocker 1 is achieved by, for example, performing the operations that are reverse to the operations having been described with reference to FIGS. 6 to 15.

Next, a more detailed description will be given of the structure of the disc chuck unit 62.

Figure 30:
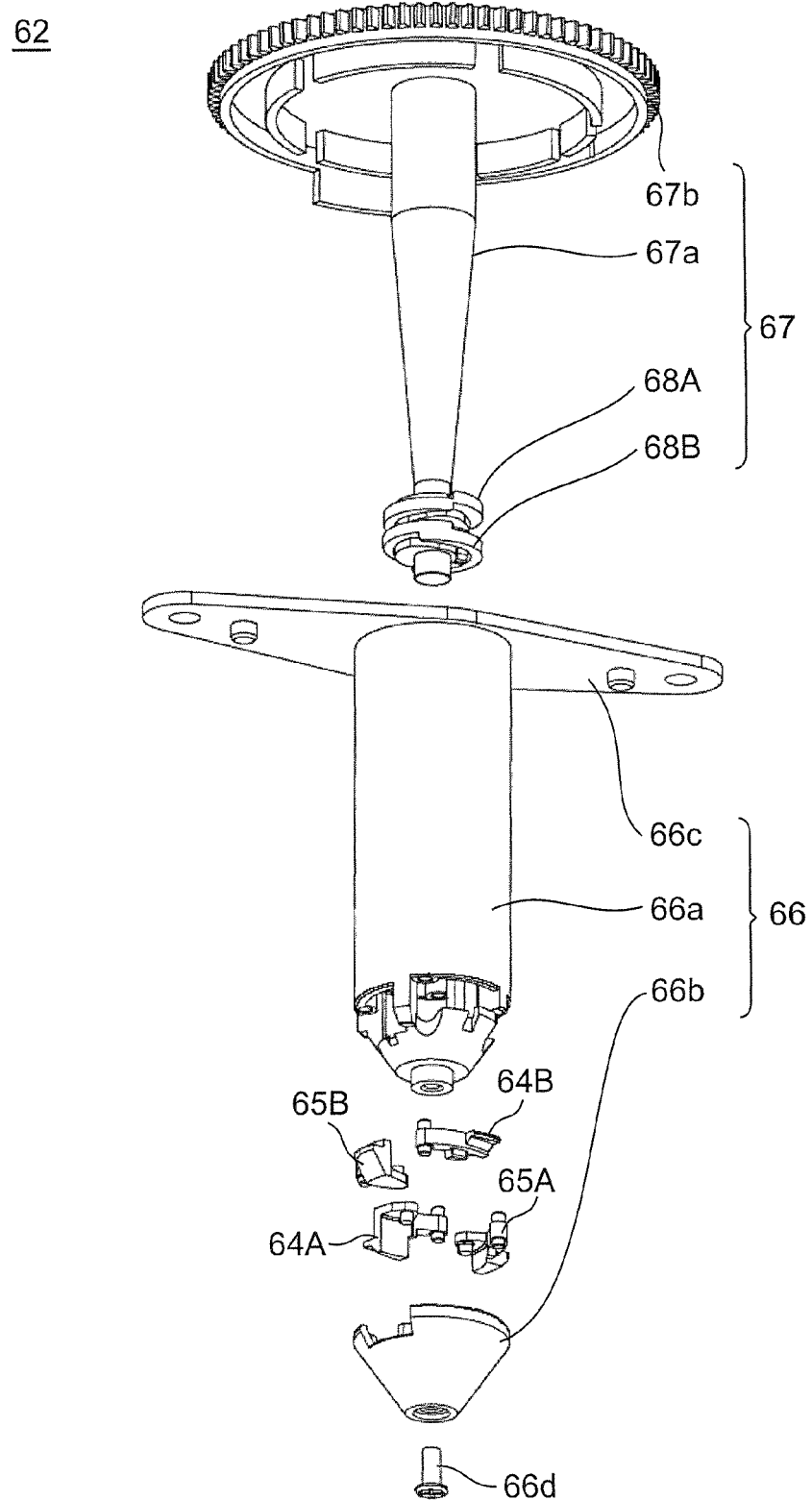
FIG. 30 is an exploded perspective view of the disc chuck unit included in the carrier shown in FIG. 18 as seen diagonally from below.

As shown in FIGS. 29 and 30, the disc chuck unit 62 includes separator hooks 64A, 64B, bottom hooks 65A, 65B, a spindle unit 66, and a camshaft unit 67.

Figure 31:
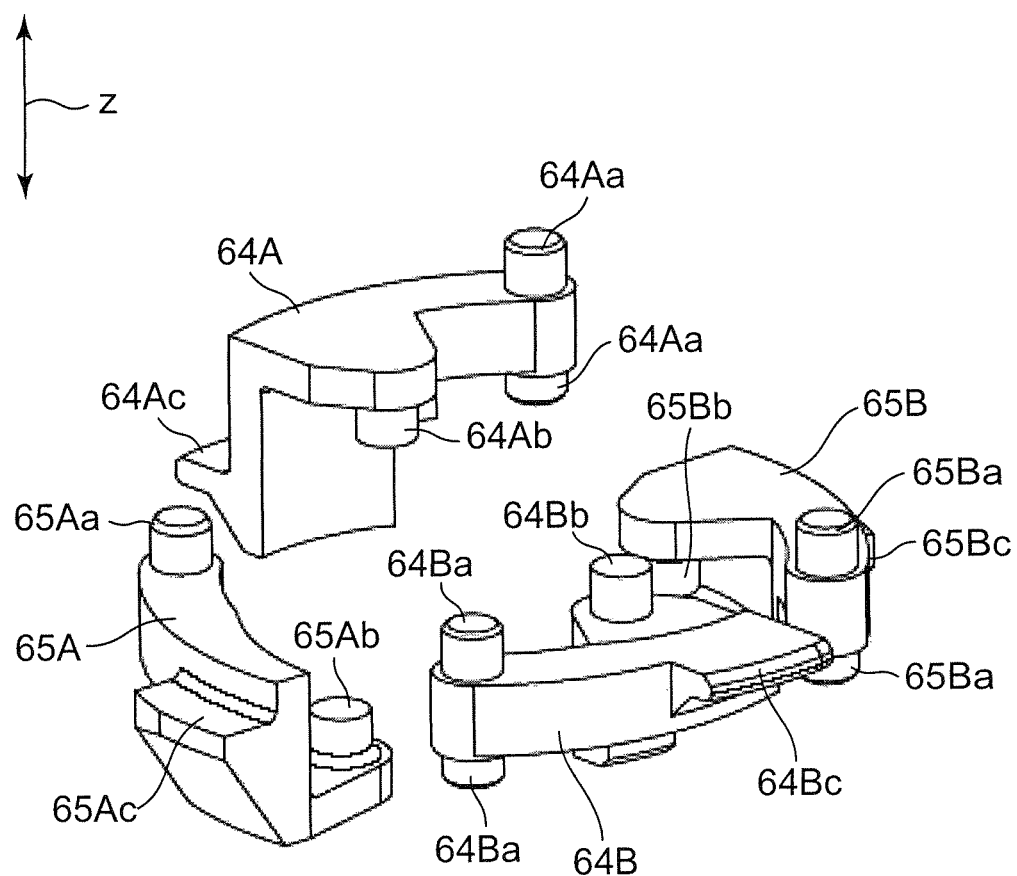
FIG. 31 is an enlarged perspective view of two separator hooks and two bottom hooks included in the disc chuck unit shown in FIG. 29.

FIG. 31 is an enlarged perspective view of the separator hooks 64A, 64B and the bottom hooks 65A, 65B. The hooks 64A to 65B are formed to be substantially lever-shaped, and include rotary shafts 64Ac to 65Ba and drive pins 64Ab to 65Bb extending in the device height direction Z, and claw portions 64Ac to 65Bc, which is an example of an inner circumferential hold portion, projecting in the direction crossing the device height direction Z.

Figure 32:
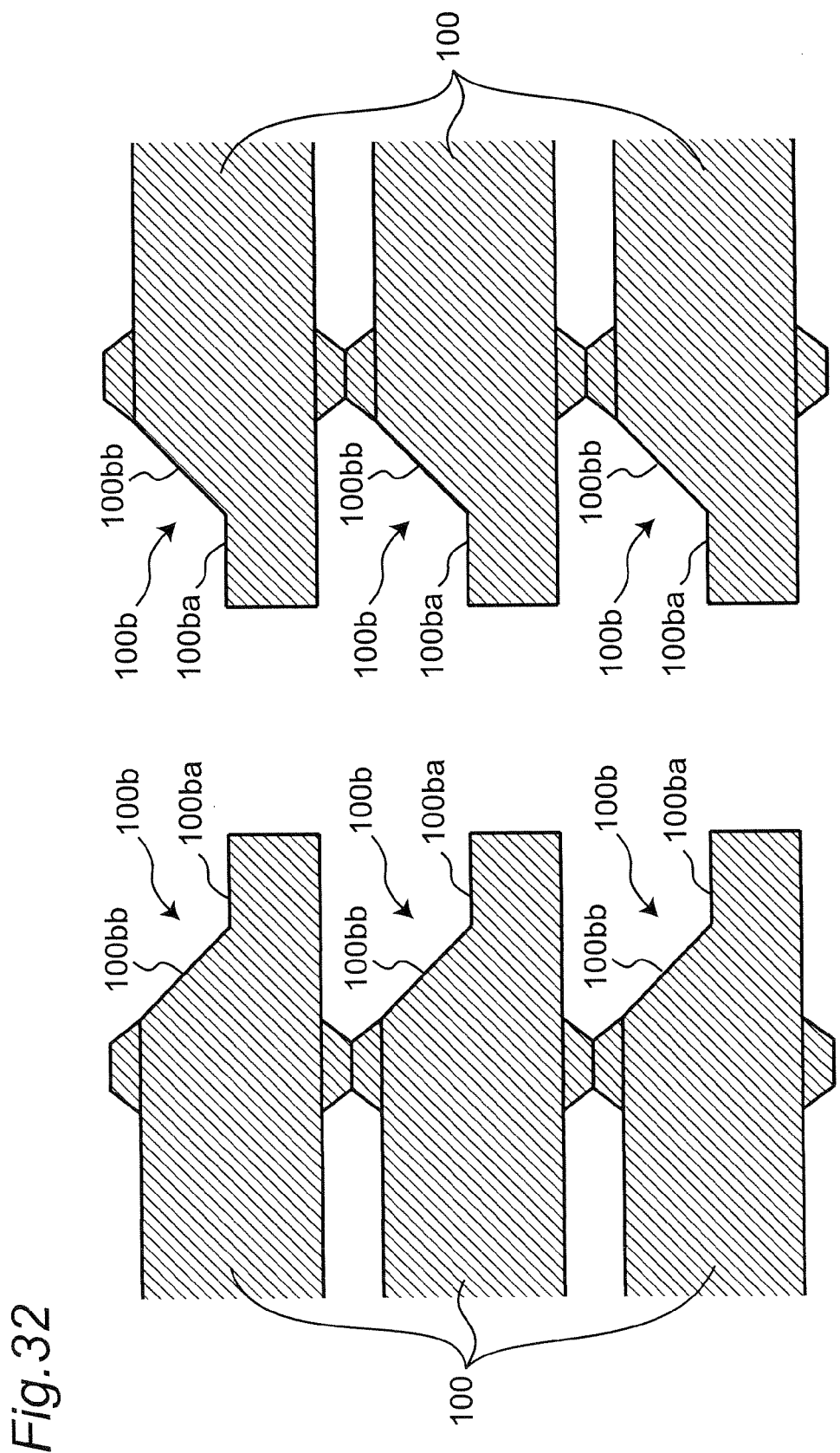
FIG. 32 is a cross sectional view showing the discs each provided with a recess portion at their inner circumferential portion.

Further, as shown in FIG. 32, in the present embodiment, the inner circumferential portion of each disc 100 is provided with a recess portion 100b. The recess portion 100b is formed to have a shape obtained by cutting the top corner portion of the inner circumferential portion of the disc 100 so as to have a level face 100ba and an inclined face 100bb. As shown in FIG. 31, the bottom faces of the claw portions 64Ac, 64Bc of the separator hooks 64A, 64B are each formed to have an inclined face, such that the thickness becomes greater downward from the outer circumferential side to the inner circumferential side. Further, the top faces of the claw portions 64Ac to 65Bc are formed to be perpendicular to the device height direction Z.

As shown in FIGS. 29 and 30, the spindle unit 66 includes a spindle shaft 66a of a substantially cylindrical shape, a spindle head 66b of a substantially circular truncated cone shape provided below the spindle shaft 66a, and a flange 66c provided at the top end portion of the spindle shaft 66a.

By the flange 66c being directly or indirectly attached to the shift base 61, the spindle unit 66 shifts integrally with the shift base 61. The diameter of the spindle shaft 66a is set to be smaller than the diameter of the center hole 100a of each disc 100. For example, the diameter of the spindle shaft 66a is 14.5 mm, and the diameter of the center hole 100a of the disc 100 is 15 mm.

Figure 33:
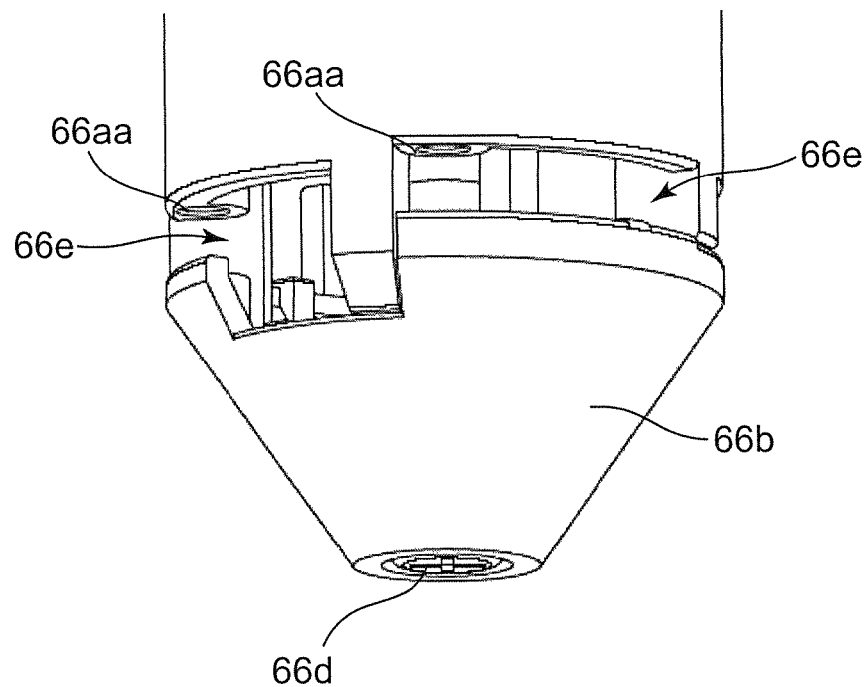
FIG. 33 is a perspective view showing the state where a spindle head included in the disc chuck unit shown in FIG. 29 is fixed to the bottom end portion of a spindle shaft by a screw.

As shown in FIG. 33, the spindle head 66b is fixed to the bottom end portion of the spindle shaft 66a by a screw 66d. Between the spindle head 66b and the spindle shaft 66a, four openings 66e are formed. The claw portions 64Ac to 65Bc of the hooks 64A to 65B are structured so as to be capable of advancing and retracting through the openings 66e.

Figure 34:
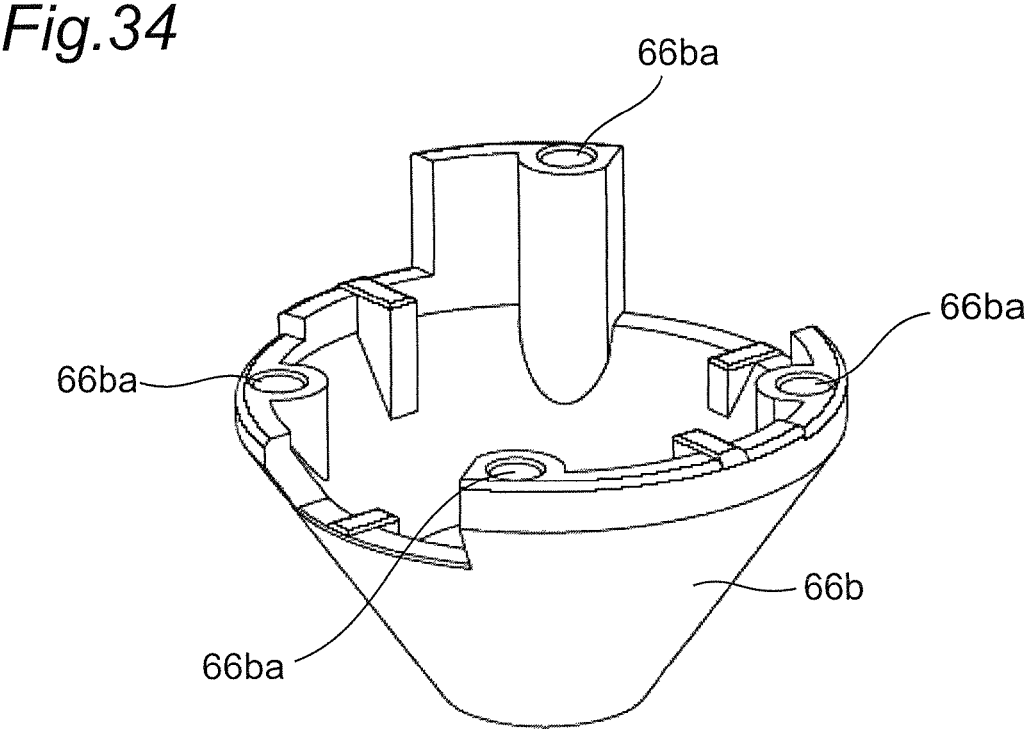
FIG. 34 is a perspective view of the spindle head included in the disc chuck unit shown in FIG. 29.
Figure 37A:
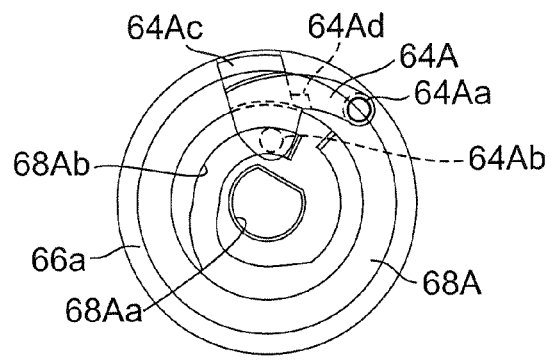
FIG. 37A is a diagram showing the manner of a drive pin of one separator hook sliding along a cam groove formed at the top face of one cam plate.
Figure 37B:
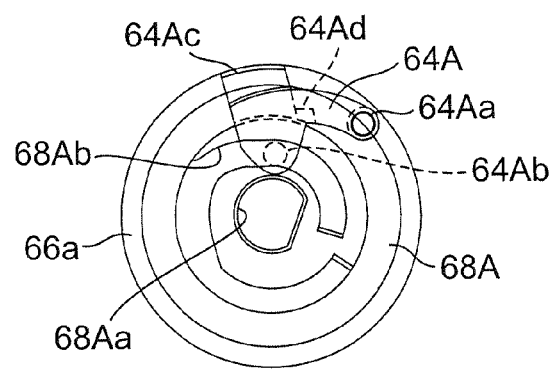
FIG. 37B is a diagram showing the manner of the drive pin of the one separator hook sliding along the cam groove formed at the top face of the one cam plate.
Figure 37C:
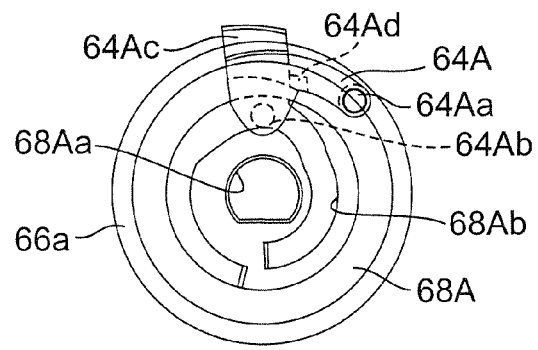
FIG. 37C is a diagram showing the manner of the drive pin of the one separator hook sliding along the cam groove formed at the top face of the one cam plate.
Figure 37D:
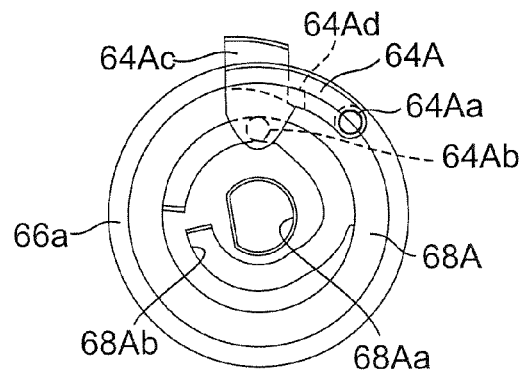
FIG. 37D is a diagram showing the manner of the drive pin of the one separator hook sliding along the cam groove formed at the top face of the one cam plate.
Figure 38A:
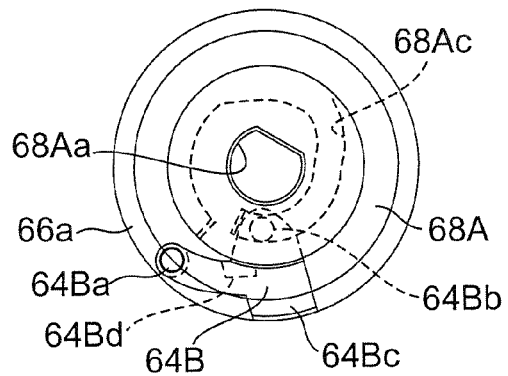
FIG. 38A is a diagram showing the manner of a drive pin of other separator hook sliding along a cam groove formed at the bottom face of the one cam plate.
Figure 38B:
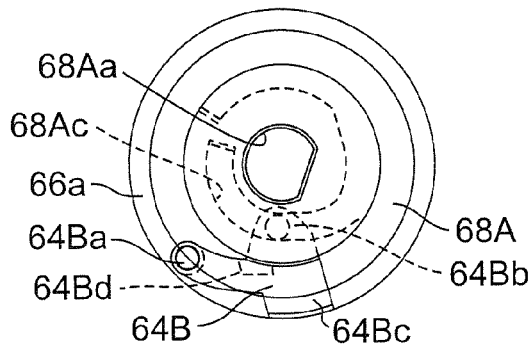
FIG. 38B is a diagram showing the manner of the drive pin of the other separator hook sliding along the cam groove formed at the bottom face of the one cam plate.
Figure 38C:
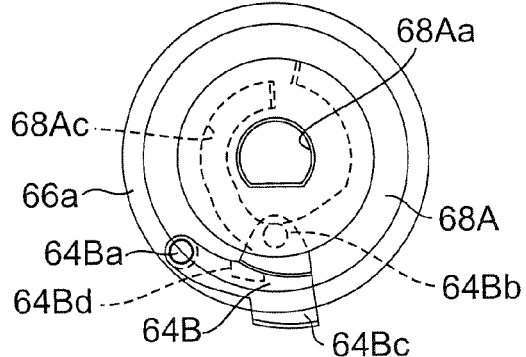
FIG. 38C is a diagram showing the manner of the drive pin of the other separator hook sliding along the cam groove formed at the bottom face of the one cam plate.
Figure 38D:
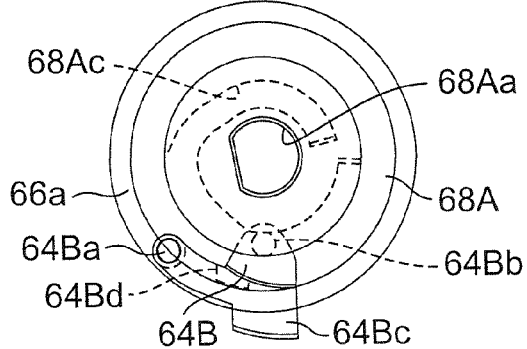
FIG. 38D is a diagram showing the manner of the drive pin of the other separator hook sliding along the cam groove formed at the bottom face of the one cam plate.
Figure 39A:
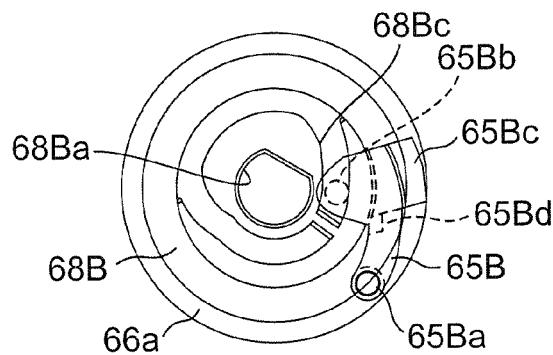
FIG. 39A is a diagram showing the manner of a drive pin of one bottom hook sliding along a cam groove formed at the top face of other cam plate.
Figure 39B:
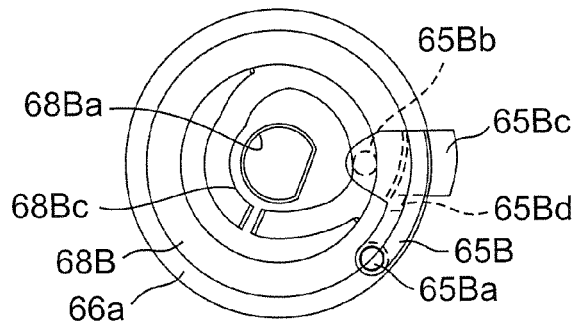
FIG. 39B is a diagram showing the manner of the drive pin of the one bottom hook sliding along the cam groove formed at the top face of the other cam plate.
Figure 39C:
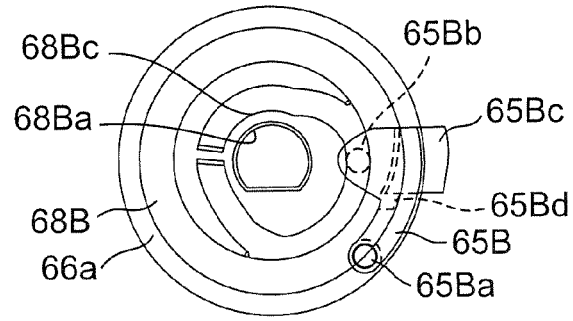
FIG. 39C is a diagram showing the manner of the drive pin of the one bottom hook sliding along the cam groove formed at the top face of the other cam plate.
Figure 39D:
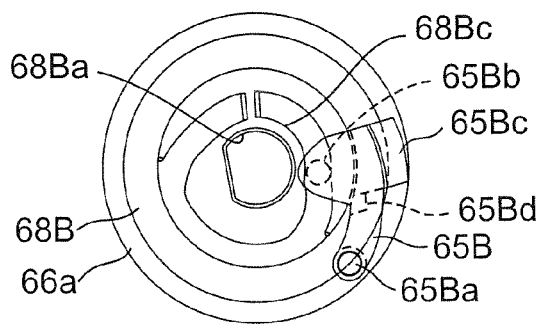
FIG. 39D is a diagram showing the manner of the drive pin of the one bottom hook sliding along the cam groove formed at the top face of the other cam plate.
Figure 40A:
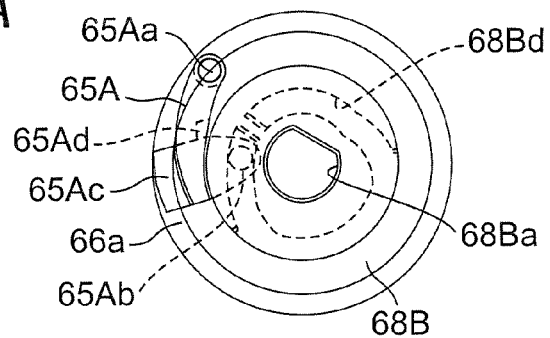
FIG. 40A is a diagram showing the manner of a drive pin of other bottom hook sliding along a cam groove formed at the bottom face of the other cam plate.
Figure 40B:
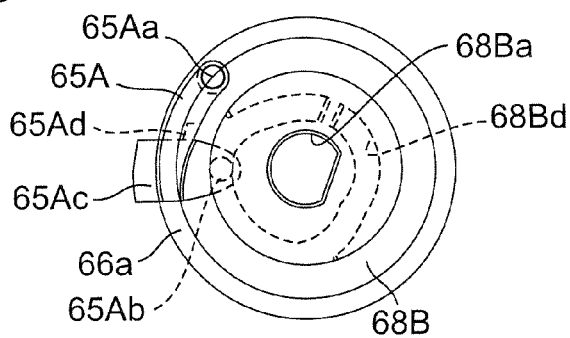
FIG. 40B is a diagram showing the manner of the drive pin of the other bottom hook sliding along the cam groove formed at the bottom face of the other cam plate.
Figure 40C:
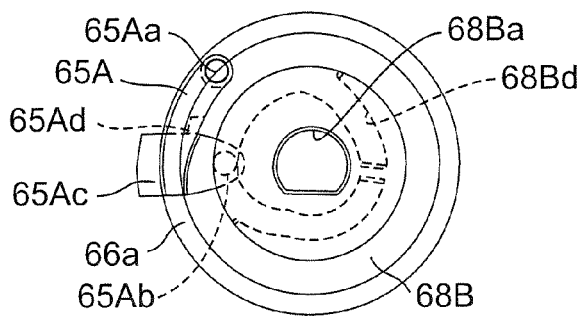
FIG. 40C is a diagram showing the manner of the drive pin of the other bottom hook sliding along the cam groove formed at the bottom face of the other cam plate.
Figure 40D:
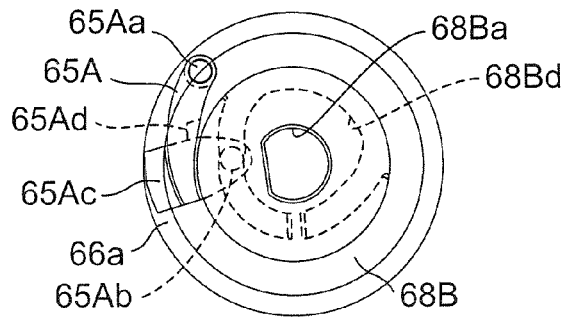
FIG. 40D is a diagram showing the manner of the drive pin of the other bottom hook sliding along the cam groove formed at the bottom face of the other cam plate.

As shown in FIG. 34, the spindle head 66b is provided with four rotary shaft holes 66ba. Further, as shown in FIG. 33, the spindle shaft 66a is provided with rotary shaft holes 66aa at the positions corresponding to the positions opposing to the rotary shaft holes 66ba. The hooks 64A to 65B are rotatably retained, by the rotary shafts 64Ac to 65Bc being inserted into corresponding rotary shaft holes 66aa, 66ba. Further, the hooks 64A to 65B are retained such that the top faces of the claw portions 64Ac, 64Bc of the separator hooks 64A, 64B are positioned higher than the top faces of the claw portions 65Ac, 65Bc of the bottom hooks 65A, 65B by the thickness of approximately one disc. Further, the separator hook 64A and the separator hook 64B are retained at the positions being out of phase by 180 degrees from each other in the circumferential direction of the spindle unit 66. The bottom hook 65A and the bottom hook 65B are retained at the positions being out of phase by 180 degrees from each other in the circumferential direction of the spindle unit 66.

As shown in FIG. 35, the camshaft unit 67 includes a substantially cylindrical camshaft 67a, a cam gear 67b provided at the top end portion of the camshaft 67a, and cam plates 68A, 68B provided at the bottom end portion of the camshaft 67a.

At the center portion of the cam gear 67b, a rotary shaft hole 67ba is provided. Into the rotary shaft hole 67ba, a rotary shaft (not shown) provided at the shift base 61 is inserted. As shown in FIG. 18, the cam gear 67b meshes with a relay gear 70. The relay gear 70 is structured with two gears, for example, and rotatably provided at the shift base 61. Further, as shown in FIG. 18 or 19, the relay gear 70 meshes with a motor gear 71a, into which the drive shaft of the disc chuck motor 71 provided at the shift base 61 is press fitted.

When the disc chuck motor 71 is driven, the drive force of the disc chuck motor 71 is transferred to the camshaft 67a via the motor gear 71a, the relay gear 70, and the cam gear 67b, whereby the camshaft 67a rotates. The disc chuck motor 71 is connected to the control unit of the electric circuit and the power supply 7, and drives under control of the control unit.

As shown in FIG. 35, the bottom end portion of the camshaft 67a is provided with an engaging portion 67aa for engaging with the cam plate 68A, and an engaging portion 67ab for engaging with the cam plate 68B. The engaging portions 67aa, 67ab are each formed to have a D-shaped cross section.

At the center portion of the cam plate 68A, a D-shaped rotary shaft hole 68Aa is provided. The cam plate 68A is structured so as to be capable of integrally rotating with the camshaft 67a, by the engaging portion 67aa of the camshaft 67a engaging with the rotary shaft hole 68Aa.

At the center portion of the top face of the cam plate 68B, a D-shaped rotary shaft hole 68Ba is provided. The cam plate 68B is structured so as to be capable of integrally rotating with the camshaft 67a, by the engaging portion 67ab of the camshaft 67a engaging with the rotary shaft hole 68Ba.

Further, at the center portion of the bottom face of the cam plate 68B, a rotary shaft 68Bb is provided. As shown in FIG. 29, the rotary shaft 68Bb is inserted into a rotary shaft bearing 66ab provided at the bottom end portion of the spindle shaft 66a.

The top face of the cam plate 68A is provided with a cam groove 68Ab (see FIG. 35) along which the drive pin 64Ab of the separator hook 64A slides when the camshaft 67a rotates. FIGS. 37A to 37D each show the manner of the drive pin 64Ab of the separator hook 64A sliding along the cam groove 68Ab.

The bottom face of the cam plate 68A is provided with a cam groove 68Ac (see FIG. 36) along which the drive pin 64Bb of the separator hook 64B slides when the camshaft 67a rotates. FIGS. 38A to 38D each show the manner of the drive pin 64Bb of the separator hook 64B sliding along the cam groove 68Ac. The cam groove 68Ac has mirror symmetry relative to the cam groove 68Ab, and is provided at the position being out of phase by 180 degrees in the circumferential direction of the spindle unit 66.

The top face of the cam plate 68B is provided with a cam groove 68Bc (see FIG. 35) along which the drive pin 65Bb of the bottom hook 65B slides when the camshaft 67a rotates. FIGS. 39A to 39D each show the manner of the drive pin 65Bb of the bottom hook 65B sliding along the cam groove 68Bc.

The bottom face of the cam plate 68B is provided with a cam groove 68Bd (see FIG. 36) along which the drive pin 65Ab of the bottom hook 65A slides when the camshaft 67a rotates. FIGS. 40A to 40D each show the manner of the drive pin 65Ab of the bottom hook 65A sliding along the cam groove 68Bd. The cam groove 68Bd has mirror symmetry relative to the cam groove 68Bc, and is provided at the position being out of phase by 180 degrees in the circumferential direction of the spindle unit 66.

FIGS. 41A to 41D are each a diagram focusing on the positional relationship between the camshaft 67a and the four hooks 64A to 65B.

Figure 41A:
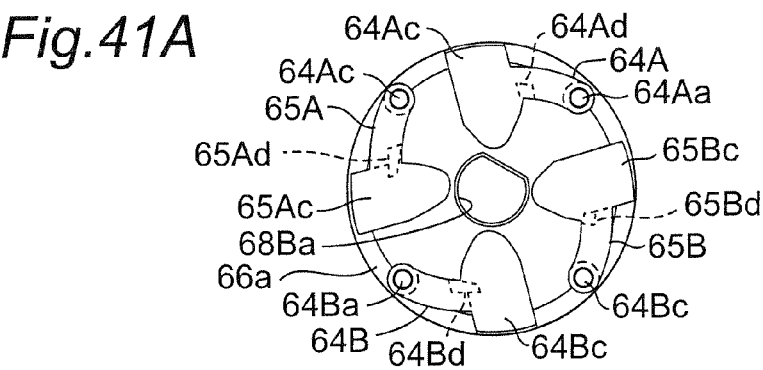
FIG. 41A is a diagram showing the manner of the hooks shown in FIGS. 37A to 40D sliding along corresponding cam grooves, focusing on the positional relationship between a camshaft and the hooks.
Figure 41B:
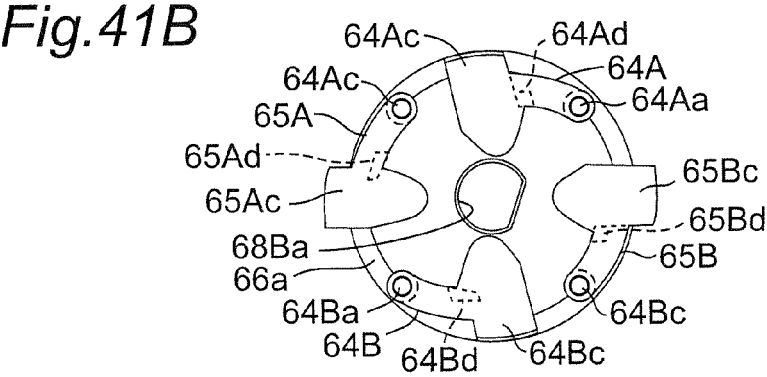
FIG. 41B is a diagram showing the manner of the hooks shown in FIGS. 37A to 40D sliding along corresponding cam grooves, focusing on the positional relationship between the camshaft and the hooks.
Figure 41C:
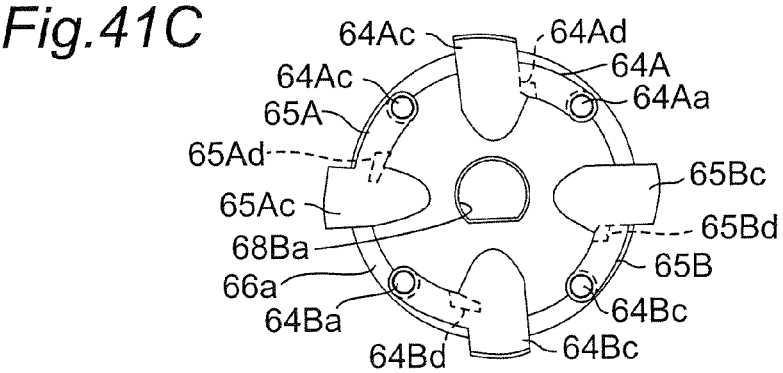
FIG. 41C is a diagram showing the manner of the hooks shown in FIGS. 37A to 40D sliding along corresponding cam grooves, focusing on the positional relationship between the camshaft and the hooks.
Figure 41D:
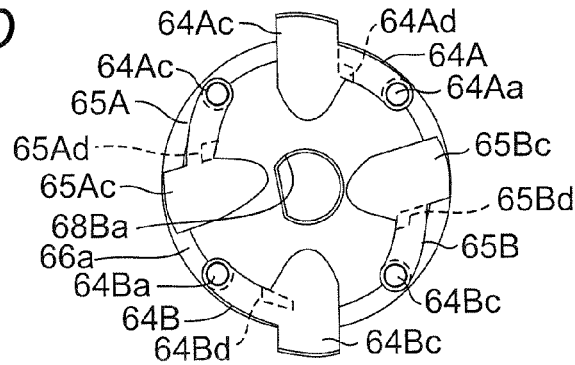
FIG. 41D is a diagram showing the manner of the hooks shown in FIGS. 37A to 40D sliding along corresponding cam grooves, focusing on the positional relationship between the camshaft and the hooks.

The separator hook 64A and the separator hook 64B shift such that, in accordance with the rotation of the camshaft 67a, their respective claw portions 64Ac, 64Bc are located at the position inside the spindle shaft 66a (see FIGS. 41A and 41B), the position outside the spindle shaft 66a (see FIG. 41C), and the position further outside the spindle shaft 66a (see FIG. 41D). It is to be noted that, the separator hooks 64A, 64B are provided with stoppers 64Ad, 64Bd for restricting the rotation range.

In the following, the position shown in FIG. 41A where all the hooks 64A to 65B are located inside the spindle shaft 66a is referred to as the stored position. Further, the position shown in FIG. 41B where only the bottom hooks 65A, 65B are located outside the spindle shaft 66a is referred to as the holding position. Further, the position shown in FIG. 41C where all the hooks 64A to 65B are located outside the spindle shaft 66a is referred to as the switching position. Further, the position shown in FIG. 41D where the separator hooks 64A, 64B are located further outside the spindle shaft 66a and the bottom hooks 65A, 65B are located inside the spindle shaft 66a is referred to as the separating position.

Next, with reference to FIGS. 42 to 50, a description will be given of the operation in which the carrier 6 separates one disc from a plurality of discs and places the separated disc on the tray 4a of the disc drive 4. It is to be noted that, throughout FIGS. 42 to 50, for the sake of convenience, the claw portions 64Ac, 64Ad of the separator hooks 64A, 64B and the claw portions 65Ac, 65Bc of the bottom hooks 65A, 65B are shown to be on an identical cross section. Further, here, the description is started from the state where the up-and-down pins 52a push out a plurality of discs 100 from the magazine tray 21.

Figure 42:
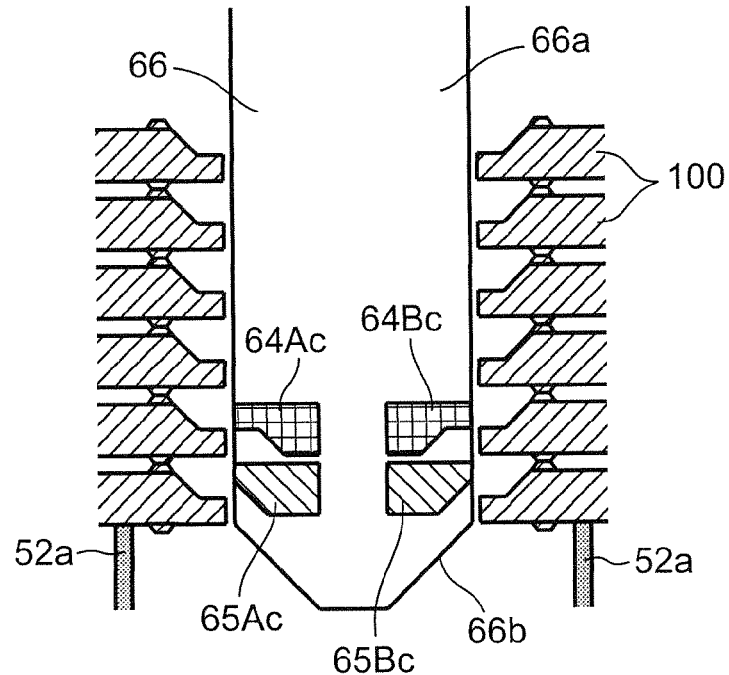
FIG. 42 is a diagram schematically showing the manner of the carrier shown in FIG. 18 separating one disc from a plurality of discs.

When the up-and-down pins 52a push out a plurality of discs 100, as shown in FIG. 42, the spindle unit 66 is inserted inside the center hole 100a of a plurality of discs 100. Here, the hooks 64A to 65B are located at the stored position (see FIG. 41A).

Figure 43:
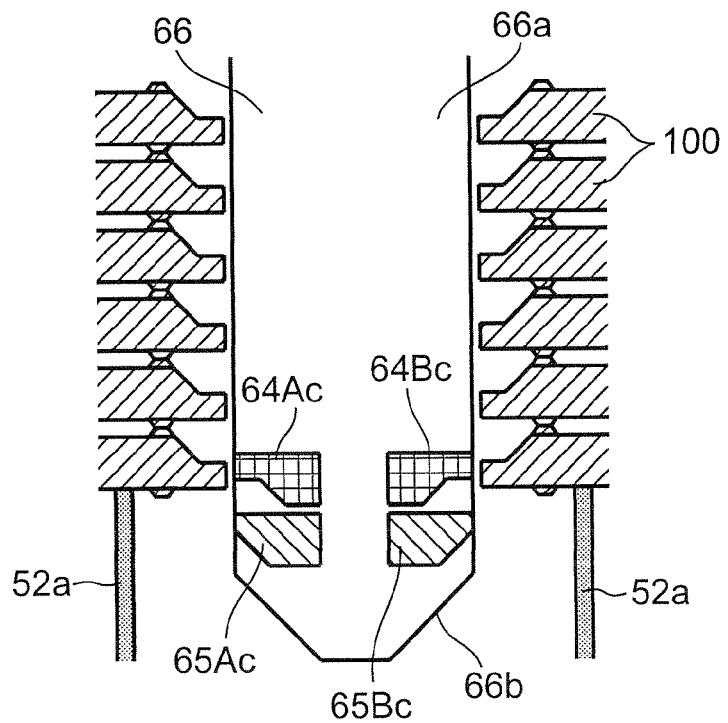
FIG. 43 is a diagram schematically showing the manner of the carrier shown in FIG. 18 separating one disc from a plurality of discs.
Figure 44:
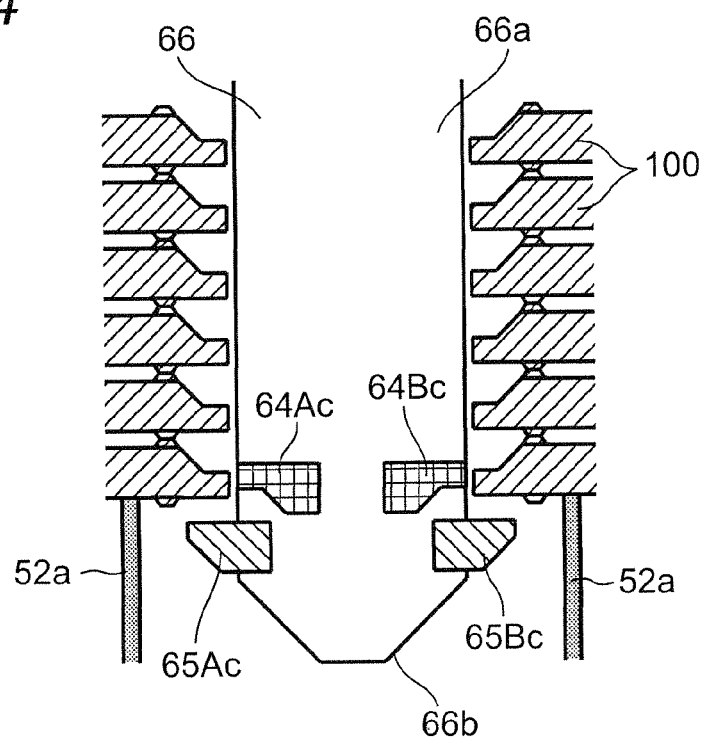
FIG. 44 is a diagram schematically showing the manner of the carrier shown in FIG. 18 separating one disc from a plurality of discs.

As shown in FIG. 43, when the up-and-down pins 52a push the plurality of discs 100 until the claw portions 65Ac, 65Bc of the bottom hooks 65A, 65B are located lower than the bottommost disc among the plurality of discs, the disc chuck motor 71 (see FIG. 19) is driven, whereby the camshaft 67a axially rotates in the normal direction. Thus, as shown in FIG. 44, the hooks 64A to 65B shift from the stored position (see FIG. 41A) to the holding position (see FIG. 41B).

Figure 45:
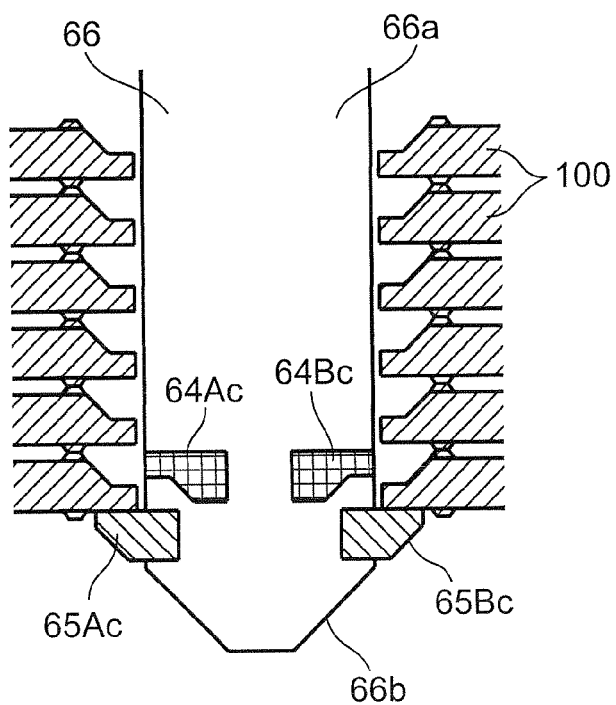
FIG. 45 is a diagram schematically showing the manner of the carrier shown in FIG. 18 separating one disc from a plurality of discs.

Thereafter, the shift base 61 is raised, and as shown in FIG. 45, the top face of the claw portions 65Ac, 65Bc of the bottom hooks 65A, 65B are brought into contact with the inner circumferential portion of the bottommost disc 100, to hold all the discs 100. Further, at this time, engagement between the spindle head 66b and the engaging portion 23a (see FIG. 2B) of the core rod 23 is released.

Figure 46:
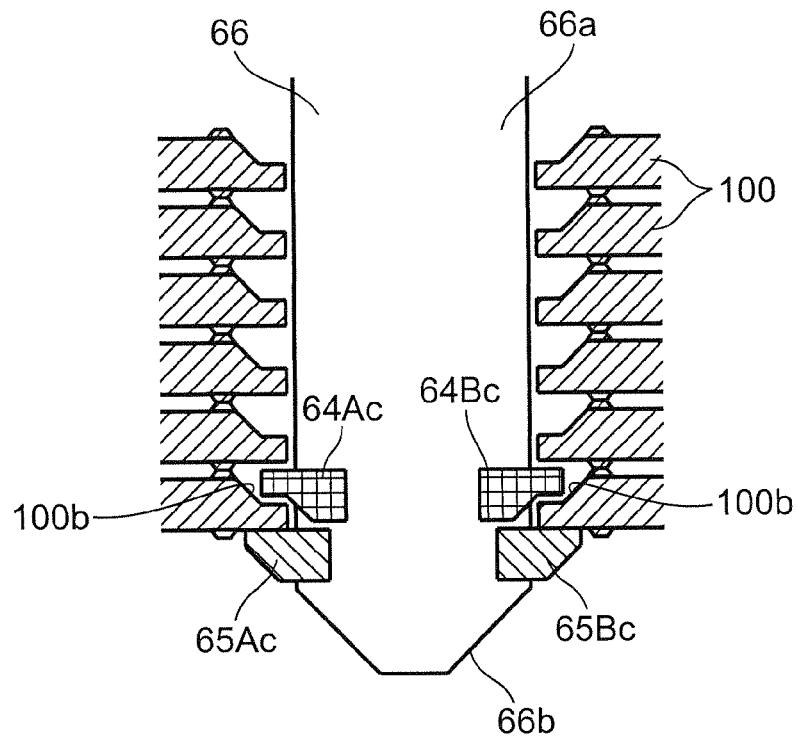
FIG. 46 is a diagram schematically showing the manner of the carrier shown in FIG. 18 separating one disc from a plurality of discs.

Thereafter, the disc chuck motor 71 (see FIG. 19) is further driven, whereby the camshaft 67a further rotates in the normal direction. Thus, the hooks 64A to 65B shift from the holding position (see FIG. 41B) to the switching position (see FIG. 41C), and as shown in FIG. 46, the claw portions 64Ac, 64Bc of the separator hooks 64A, 64B are inserted into the recess portion 100b of the bottommost disc 100.

Thereafter, the picker 3 shifts to the device-front side, whereby the magazine tray 21 recedes from the position near the disc drive 4 (see FIG. 22). Thereafter, the tray 4a of the disc drive 4 is discharged (see FIG. 23).

Figure 47:
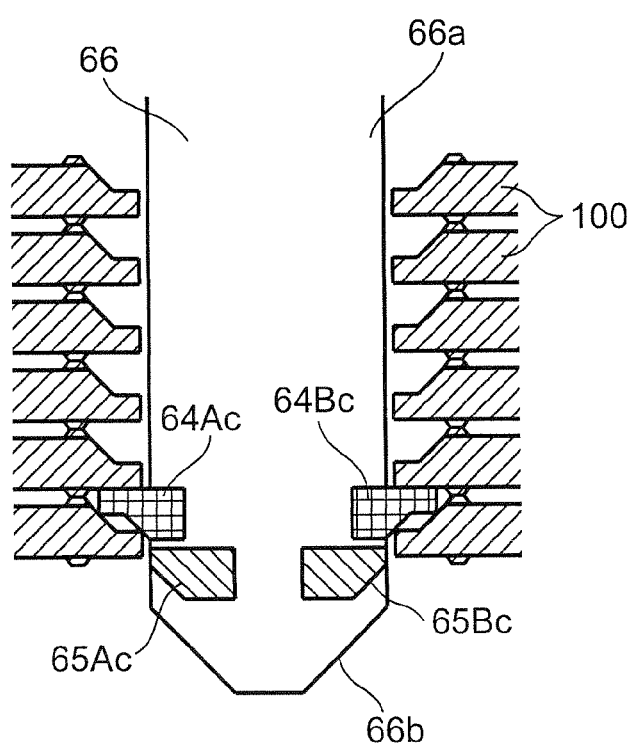
FIG. 47 is a diagram schematically showing the manner of the carrier shown in FIG. 18 separating one disc from a plurality of discs.
Figure 48:
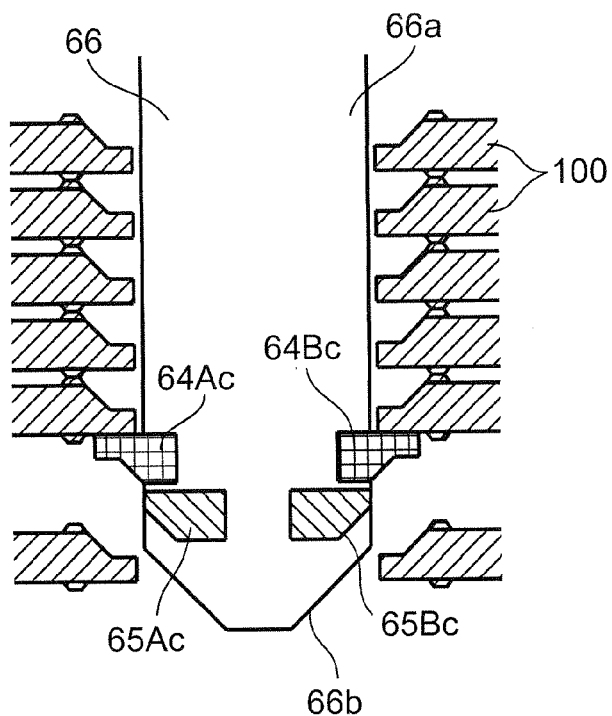
FIG. 48 is a diagram schematically showing the manner of the carrier shown in FIG. 18 separating one disc from a plurality of discs.

Thereafter, the shift base 61 is lowered such that the plurality of discs 100 retained by the spindle unit 66 is located above the tray 4a (e.g., immediately above). In this state, the disc chuck motor 71 is further driven, and the camshaft 67a is rotated further in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inside the spindle shaft 66a. As a result, as shown in FIG. 48, the bottommost disc 100 falls by its self weight, to be placed on the tray 4a. Further, at this time, the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the separator hooks 64A, 64B further project outside the spindle shaft 66a, and the top faces of the claw portions 64Ac, 64Bc of the separator hooks 64A, 64B are brought into contact with the inner circumferential portion of the bottommost disc 100 out of the rest of the disc, and hold the rest of the discs 100.

When the bottommost disc 100 is placed on the tray 4a, the shift base 61 is raised such that the spindle unit 66 and the tray 4a are not brought into contact with each other. Thereafter, the tray 4a is carried into the disc drive 4. Thereafter or simultaneously therewith, the tray 4a of the disc drive 4 opposing to the handled disc drive is ejected (not shown).

Figure 49:
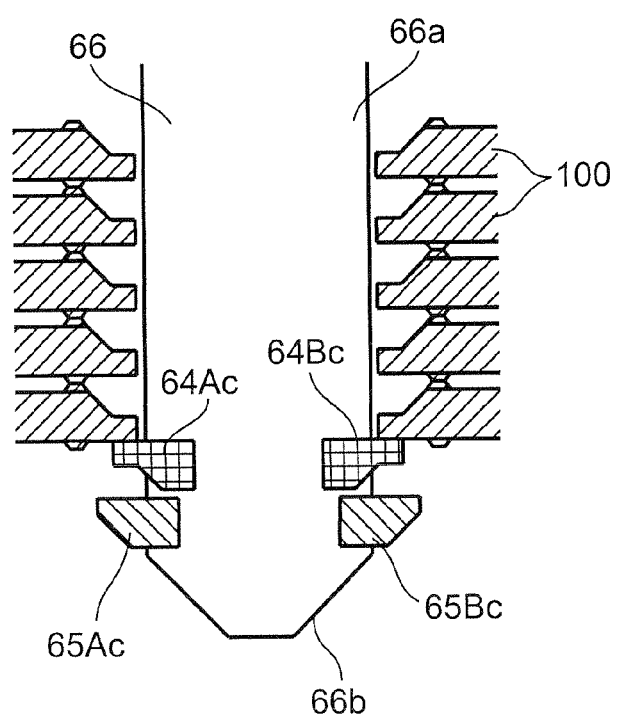
FIG. 49 is a diagram schematically showing the manner of the carrier shown in FIG. 18 separating one disc from a plurality of discs.

Thereafter, the disc chuck motor 71 is reversely driven, whereby the camshaft 67a rotates in the reverse direction. Thus, the hooks 64A to 65B shift from the separating position (see FIG. 41D) to the switching position (see FIG. 41C), and as shown in FIG. 49, the claw portions 65Ac, 65Bc of the bottom hooks 65A, 65B shift to the positions outside the spindle shaft 66a.

Figure 50:
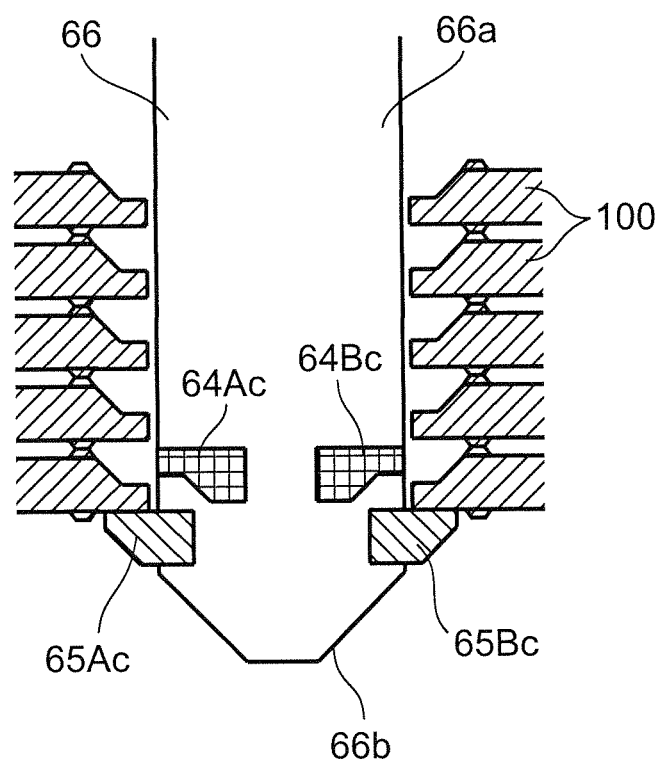
FIG. 50 is a diagram schematically showing the manner of the carrier shown in FIG. 18 separating one disc from a plurality of discs.

Thereafter, the disc chuck motor 71 is further reversely driven, whereby the camshaft 67a further rotates in the reverse direction. Thus, the hooks 64A to 65B shift from the switching position (see FIG. 41C) to the holding position (see FIG. 41B), whereby the claw portions 64Ac, 64Bc of the separators 64A, 64B shift to the positions inside the spindle shaft 66a as shown in FIG. 50. As a result, the rest of the discs 100 held by the top face of the claw portions 64Ac, 64Bc of the separator hooks 64A, 64B fall by their self weight, and held by the top face of the claw portions 65Ac, 65Bc of the bottom hooks 65A, 65B.

Thereafter, the disc chuck motor 71 is driven, whereby the camshaft 67a rotates in the normal direction. Thus, the hooks 64A to 65B shifts from the holding position (see FIG. 41B) to the switching position (see FIG. 41C), and as shown in FIG. 46, the claw portions 64Ac, 64Bc of the separator hooks 64A, 64B are inserted into the recess portion 100b of the bottommost disc 100.

Thereafter, the shift base 61 is lowered such that the plurality of discs 100 retained by the spindle unit 66 is located above (e.g., immediately above) the ejected tray 4a. In this state, the disc chuck motor 71 is further driven, whereby the camshaft 67a further shifts in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inner than the spindle shaft 66a. As a result, as shown in FIG. 48, the bottommost disc 100 falls by its self weight, to be placed on the tray 4a. Further, at this time, the separator hooks 64A, 64B further project outside the spindle shaft 66a, and the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the top faces of the claw portions 64Ac, 64Bc of the separator hooks 64A, 64B are brought into contact with the inner circumferential portion of the bottommost disc out of the rest of the discs, and hold the rest of the discs 100.

When the bottommost disc 100 is placed on the tray 4a, the shift base 61 is raised such that the spindle unit 66 and the tray 4a are not brought into contact with each other. Thereafter, the tray 4a is carried into the disc drive 4. Thus, the loading operation as to the disc drives 4 of the bottommost stage (first stage) is completed. This loading operation is repeated as to the second and following stages.

When the loading operation to the topmost-stage disc drives 4 is completed, all the disc drives 4 now accommodate the discs 100, and recording on or reproduction from the discs 100 in the disc drives 4 is enabled.

Next, a description will be given of the operation of the carrier 6 collecting the discs 100 from the disc drives 4.

Firstly, the tray 4a of the topmost-stage disc drive 4 is ejected.

Thereafter, the shift base 61 is lowered, and the spindle unit 66 is inserted into the center hole 100a of the disc 100 on the tray 4a. At this time, the hooks 64A to 65B are at the stored position (see FIG. 41A).

When the shift base 61 is lowered until the disc 100 is located above the bottom hooks 65A, 65B, the disc chuck motor 71 (see FIG. 19) is driven, whereby the camshaft 67a rotates in the normal direction. Thus, the hooks 64A to 65B shift from the stored position (see FIG. 41A) to the holding position (see FIG. 41B).

Thereafter, the shift base 61 is raised, and the top face of the claw portions 65Ac, 65Bc of the bottom hooks 65A, 65B are brought into contact with the inner circumferential portion of the disc 100, to retain the disc 100. Thus, the disc 100 on the tray 4a is collected.

Thereafter, the tray 4a from which the disc 100 is collected is carried into the disc drive 4. Thereafter or simultaneously therewith, the tray 4a of the disc drive 4 opposing to the handled disc drive 4 is ejected.

Thereafter, the shift base 61 is lowered such that the disc retained by the spindle unit 66 is located above (e.g., immediately above) the disc 100 on the ejected tray 4a.

Thereafter, the disc chuck motor 71 (see FIG. 19) is reversely driven, and the camshaft 67a rotates in the reverse direction. Thus, the hooks 64A to 65B shift from the holding position (see FIG. 41B) to the stored position (see FIG. 41A). Thus, the disc 100 retained by the spindle unit 66 falls by its self weight, and stacked on the disc 100 on the ejected tray 4a.

Thereafter, the shift base 61 is lowered, and the spindle unit 66 is inserted into the center holes 100a of the two discs 100 on the ejected tray 4a.

When the shift base 61 is lowered until the two discs 100 are located above the bottom hooks 65A, 65B, the disc chuck motor 71 (see FIG. 19) is driven, whereby the camshaft 67a rotates in the normal direction. Thus, the hooks 64A to 65B shift from the stored position (see FIG. 41A) to the holding position (see FIG. 41B).

Thereafter, the shift base 61 is raised, and the top faces of the claw portions 65Ac, 65Bc of the bottom hooks 65A, 65B are brought into contact with the inner circumferential portion of the bottommost disc 100, to hold all the discs 100.

Thereafter, the tray 4a from which the disc 100 is collected is carried into the disc drive 4. Thus, the disc collection operation of the disc drives 4 of the topmost stage (first stage) is completed. This disc collection operation is repeated until the discs 100 in the bottommost-stage disc drives 4 are collected.

When the spindle unit 66 has collected all the discs 100, the shift base 61 is raised. Thereafter, the picker 3 shifts to the device-rear side, and the magazine tray 21 is set below the spindle unit 66.

Thereafter, the shift base 61 is lowered, and the spindle head 66b (see FIG. 33) engages with the engaging portion 23a (see FIG. 2B) of the core rod 23, whereby the spindle head 66b and the core rod 23 become coaxial to each other.

Thereafter, the disc chuck motor 71 (see FIG. 19) is reversely driven, whereby the camshaft 67a rotates in the reverse direction. Thus, the hooks 64A to 65B shift from the holding position (see FIG. 41B) to the stored position (see FIG. 41A). Thus, all the discs 100 retained by the spindle unit 66 fall by their self weight along the spindle head 66b and the core rod 23, and stored in the magazine tray 21.

Next, a more detailed description will be given of the structure of the lifter 5.

Figure 51:
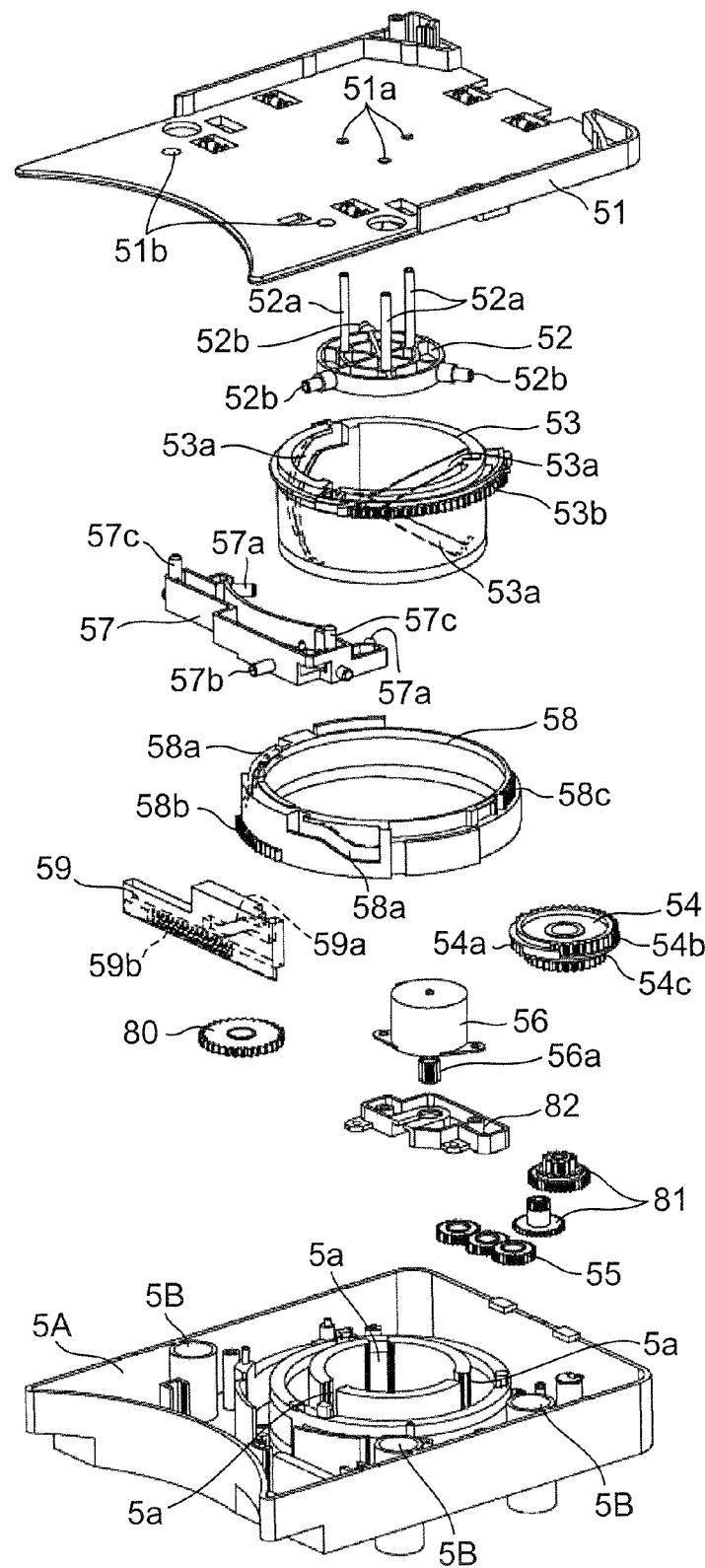
FIG. 51 is an exploded perspective view of the lifter included in the disc device shown in FIG. 1.
Figure 52A:
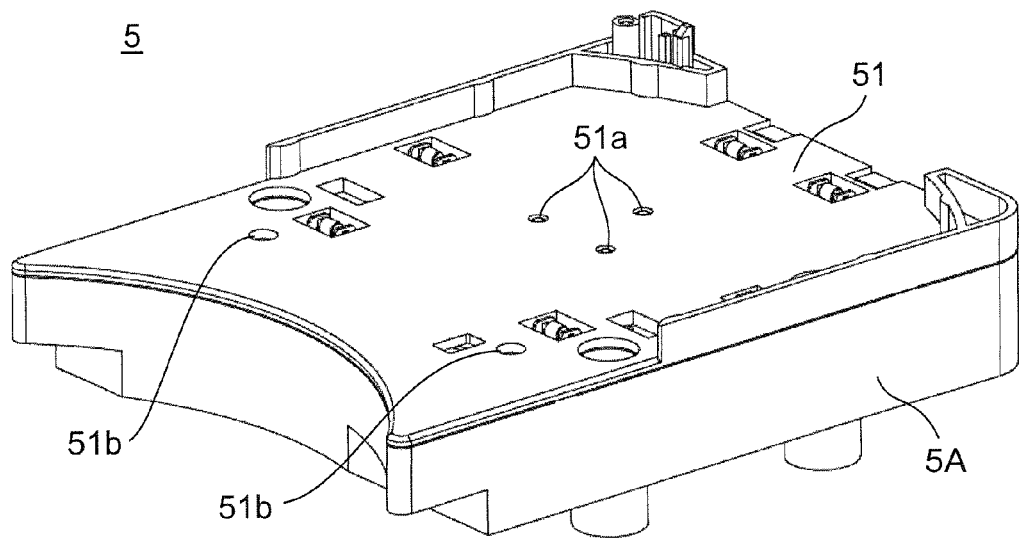
FIG. 52A is an assembled perspective view of the lifter included in the disc device shown in FIG. 1, in a state where a positioning pin of a positioning base and an up-and-down pin of an up-and-down plate are lowered.
Figure 52B:
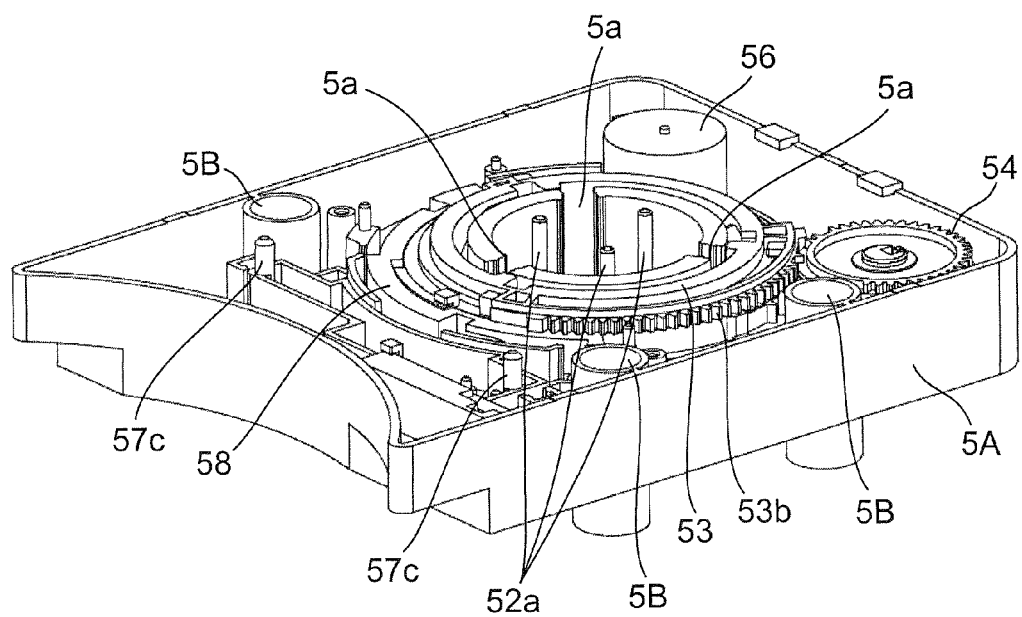
FIG. 52B is a perspective view showing a state where a magazine guide tray of the lifter shown in FIG. 52A is taken out.

FIG. 51 is an exploded perspective view of the lifter 5. FIG. 52A is a perspective view of the lifter 5, and FIG. 52B is an exploded perspective view showing a state where a magazine tray guide 51 of the lifter 5 is taken out.

The lifter 5 includes a lifter base 5A which is a body of the lifter 5. The lifter base 5A is provided with the magazine tray guide 51, the up-and-down plate 52, the rotary cam 53, the drive gear 54, the relay gear 55, and the lifter motor 56. The lifter base 5A is further provided with a positioning base 57, a positioning cam gear 58, a support cam 59, a link gear 80, a reduction gear 81, and a motor angle 82.

The positioning base 57 is provided with three cam pins 57*a*, 57*a*, and 57*b* projecting in the horizontal direction. Of the three cam pins, the two cam pins 57*a* engage with two cam grooves 58*a* formed in an outer circumferential surface of the substantially annular positioning cam gear 58. Of the three cam pins, the remaining one cam pin 57*b* engages with a cam groove 59*a* provided in the support cam 59.

A lower gear portion 58*b* is provided on a partial region of a lower portion of an outer periphery of the positioning cam gear 58. The lower gear portion 58*b* meshes with the link gear 80. The link gear 80 meshes with a rack portion 59*b* provided on the support cam 59.

If the positioning cam gear 58 rotates, a rotation force of the positioning cam gear 58 is transmitted to the rack portion 59*b* through the lower gear portion 58*b* and the link gear 80, and the support cam 59 shifts in the horizontal direction. At this time, the two cam pins 57*a* slide on inclined surfaces of the two cam grooves 58*a*, the cam pin 57*b* slides on an inclined surface of the cam groove 59*a*, and the positioning base 57 rises and lowers in a device height direction Z.

Figure 54A:
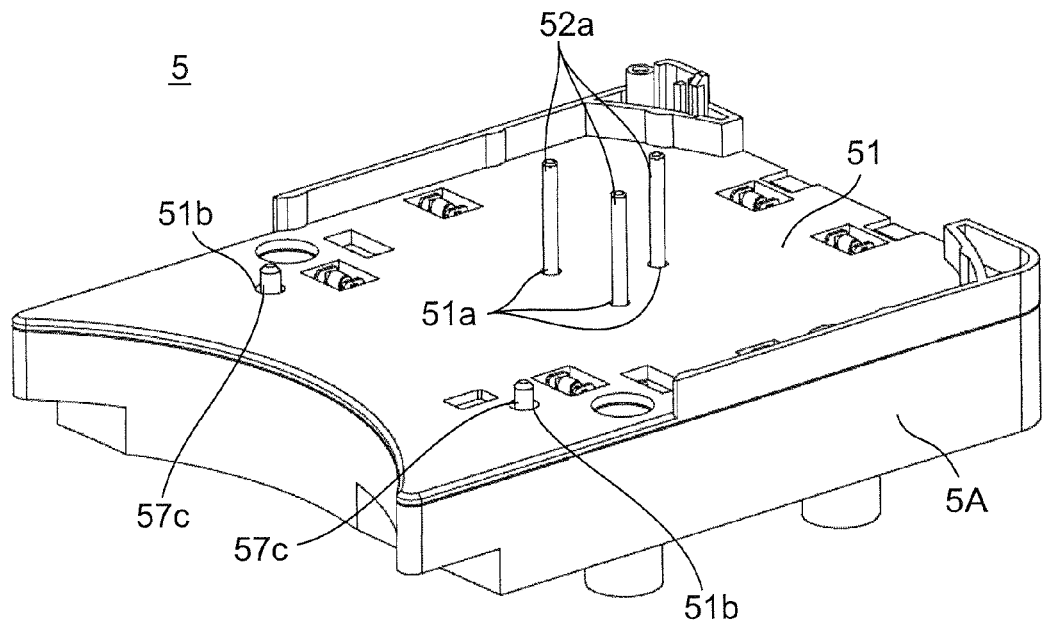
FIG. 54A is an assembled perspective view of the lifter included in the disc device shown in FIG. 1, in a state where the positioning pin of the positioning base and the up-and-down pin of the up-and-down plate rise.
Figure 54B:
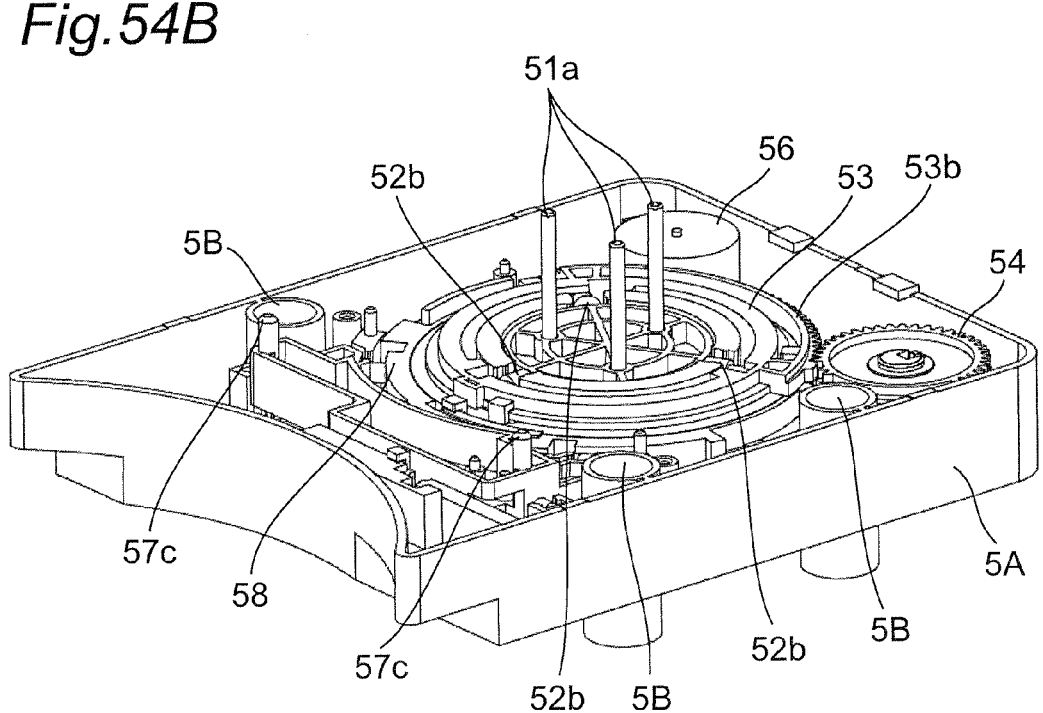
FIG. 54B is a perspective view showing a state where the magazine guide tray of the lifter shown in FIG. 54A is taken out.
Figure 55:
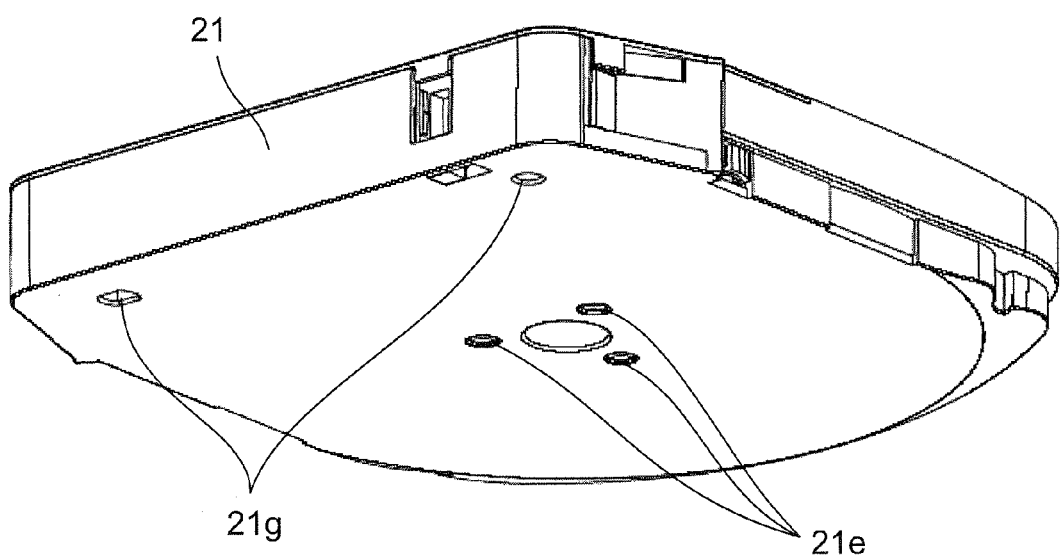
FIG. 55 is a perspective view showing the magazine included in the disc device shown in FIG. 1 as seen diagonally from below.

The positioning base 57 is provided with two positioning pins 57*c* projecting upward. As shown in FIG. 51, the two positioning pins 57*c* are provided at positions matching two holes 51*b* provided in the magazine tray guide 51. The two positioning pins 57*c* are provided at positions matching two holes 21*g* provided in the magazine tray 21 as shown in FIG. 55 when the magazine tray 21 is placed at a prescribed position on the magazine tray guide 51 as shown in FIG. 15. The two holes 21*g* are a circular hole and a long hole. The positioning pins 57*c* penetrate the holes 51*b* of the magazine tray guide 51 and engage with the holes 21*g* of the magazine tray 21 when the positioning base 57 is raised as shown in FIGS. 54A and 54B. Thus, the magazine tray 21 is fixed at a prescribed position shown in FIG. 15.

An upper gear portion 58*c* is provided on a partial region of an upper portion of an outer periphery of the positioning cam gear 58. The upper gear portion 58*c* of the positioning cam gear 58 meshes with an intermediate gear portion 54*a* provided on an intermediate portion of an outer periphery of the drive gear 54. A lower gear portion 54*c* provided on a lower portion of the outer periphery of the drive gear 54 meshes with the reduction gear 81. The reduction gear 81 meshes with the relay gear 55. The relay gear 55 meshes with the motor gear 56*a*, into which the drive shaft of the lifter motor 56 is press fitted. The lifter motor 56 is fixed to the lifter base 5A through the motor angle 82.

If the lifter motor 56 is driven, a drive force of the lifter motor 56 is transmitted to the drive gear 54 through the motor gear 56*a*, the relay gear 55 and the reduction gear 81, and the drive gear 54 rotates. Thus, the positioning cam gear 58 meshing with the intermediate gear portion 54*a* of the drive gear 54 and the upper gear portion 58*c* rotates, and the positioning base 57 rises and lowers in the device height direction Z.

Figure 53A:
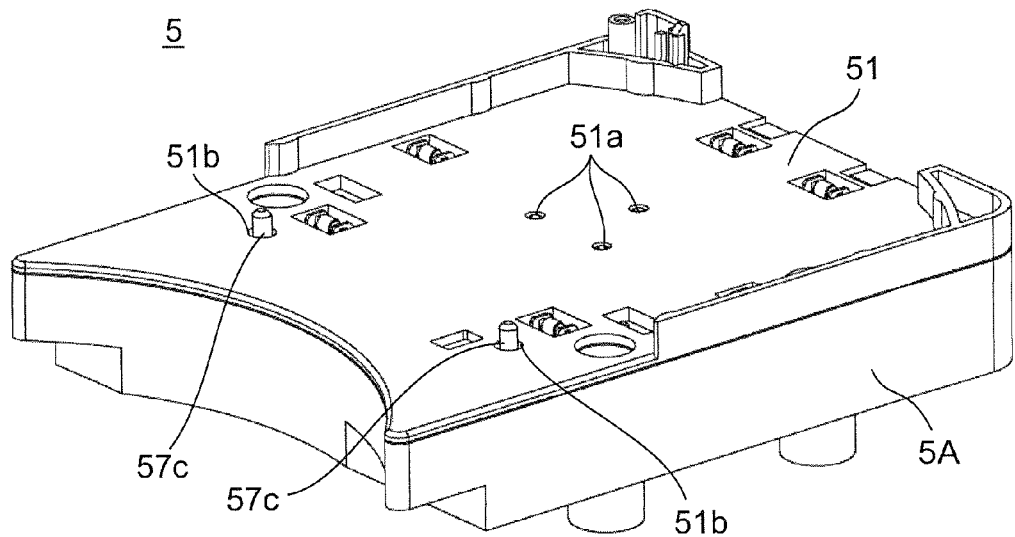
FIG. 53A is an assembled perspective view of the lifter included in the disc device shown in FIG. 1, in a state where the positioning pin of the positioning base rises.
Figure 53B:
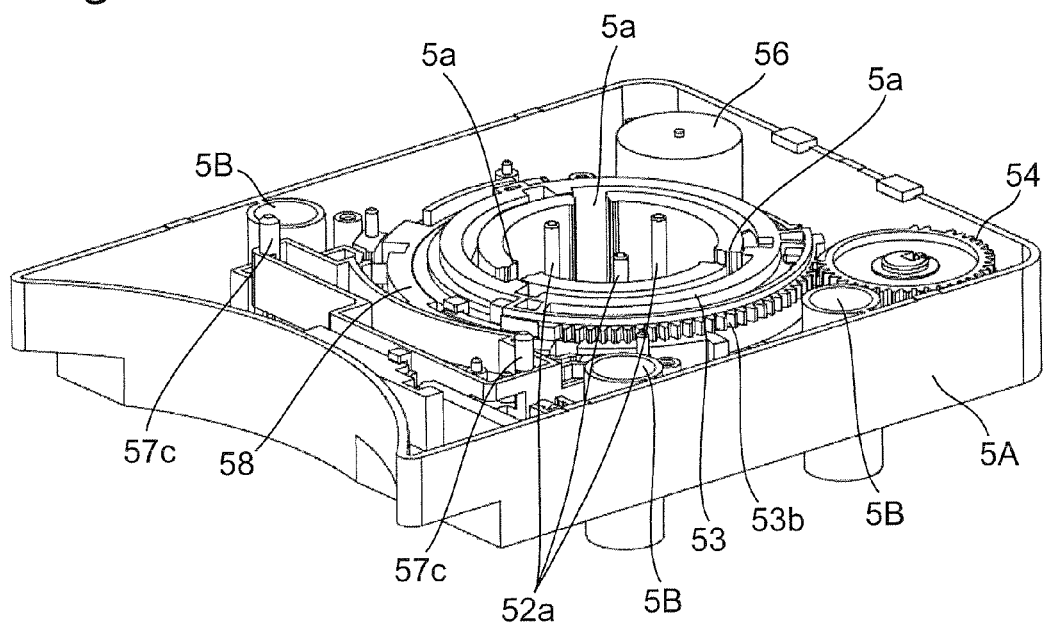
FIG. 53B is a perspective view showing a state where the magazine guide tray of the lifter shown in FIG. 53A is taken out.

An upper gear portion 54*b* is provided on an upper portion of the outer periphery of the drive gear 54. The upper gear portion 54*b* of the drive gear 54 is provided such that the upper gear portion 54*b* meshes with a cam gear 53*b* of the rotary cam 53 after the positioning base 57 rises as shown in FIGS. 53A and 53B. If the drive gear 54 rotates in a normal direction from a state shown in FIGS. 53A and 53B, the positioning cam gear 58 rotates and the up-and-down plate 52 rises as shown in FIGS. 54A and 54B.

When the up-and-down plate 52 rises, the three up-and-down pins 52*a* enter inside the magazine tray 21 through the three holes 51*a* of the magazine tray guide 51 and the three holes 21*e* of the magazine tray 21. By the rising of the three up-and-down pins 52*a*, a plurality of discs 100 are pushed out from the magazine tray 21.

If the drive gear 54 rotates in the reverse direction from the state shown in FIGS. 54A and 54B, the positioning cam gear 58 reversely rotates and the up-and-down plate 52 lowers as shown in FIGS. 53A and 53B. If the drive gear 54 further rotates in the reverse direction from the state shown in FIGS. 53A and 53B, the positioning cam gear 58 reversely rotates, and the positioning base 57 lowers as shown in FIGS. 52A and 52B.

Next, a more detailed description will be given of a mounting structure of the lifter 5 on the picker 3.

Figure 56:
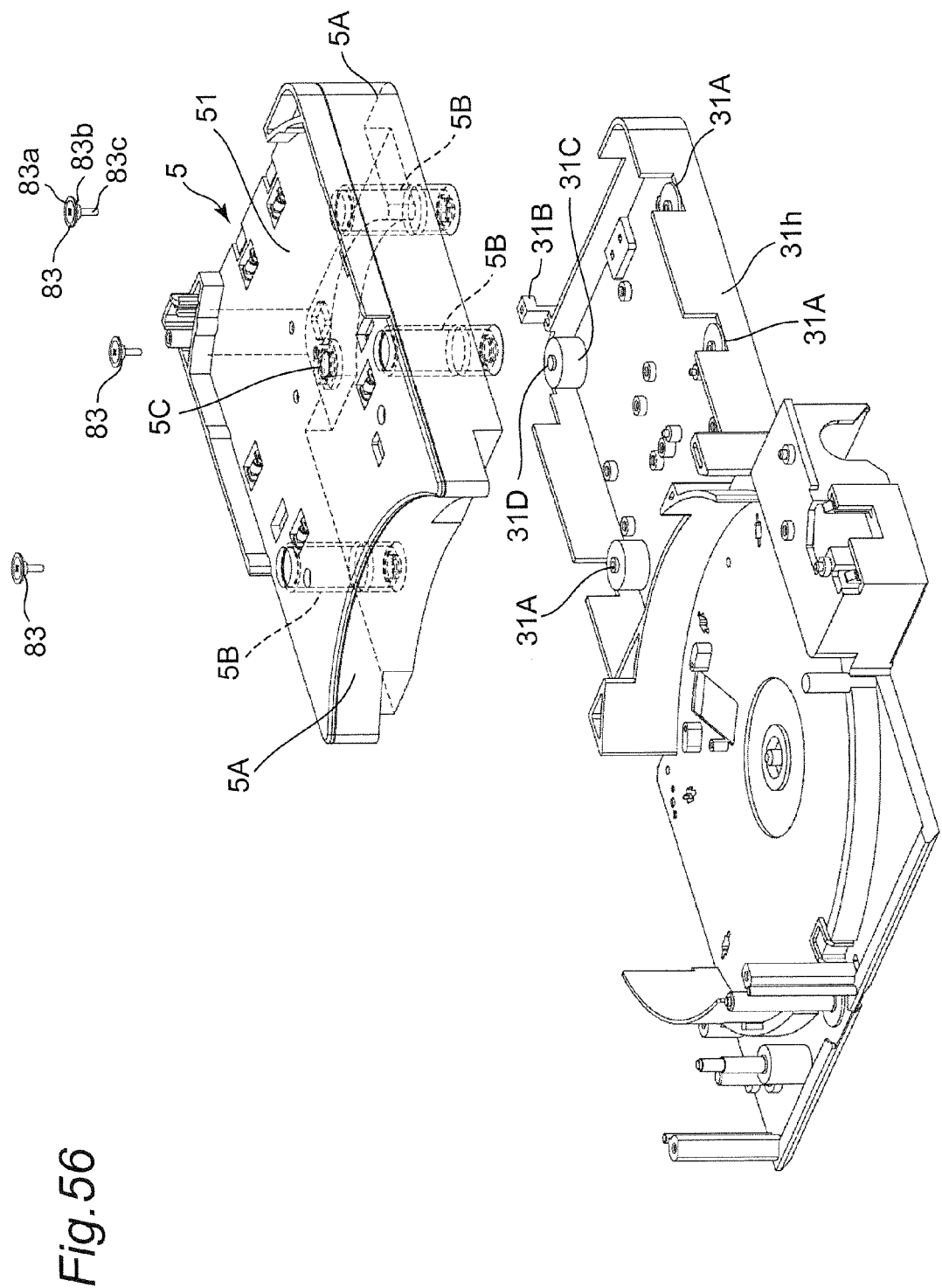
FIG. 56 is an exploded perspective view showing a mounting structure of the lifter on the picker.
Figure 57:
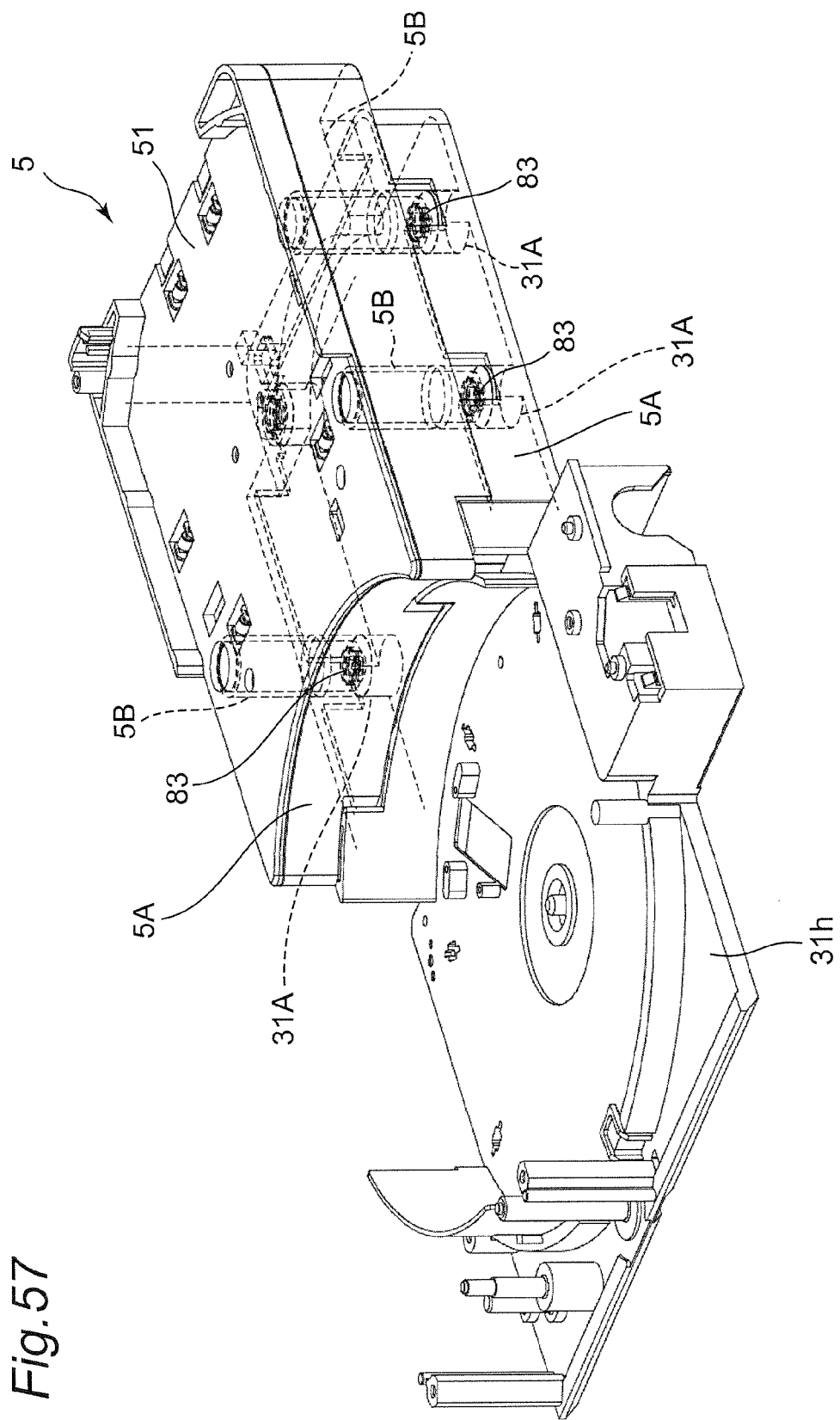
FIG. 57 is an assembled perspective view showing the mounting structure of the lifter on the picker.
Figure 58:
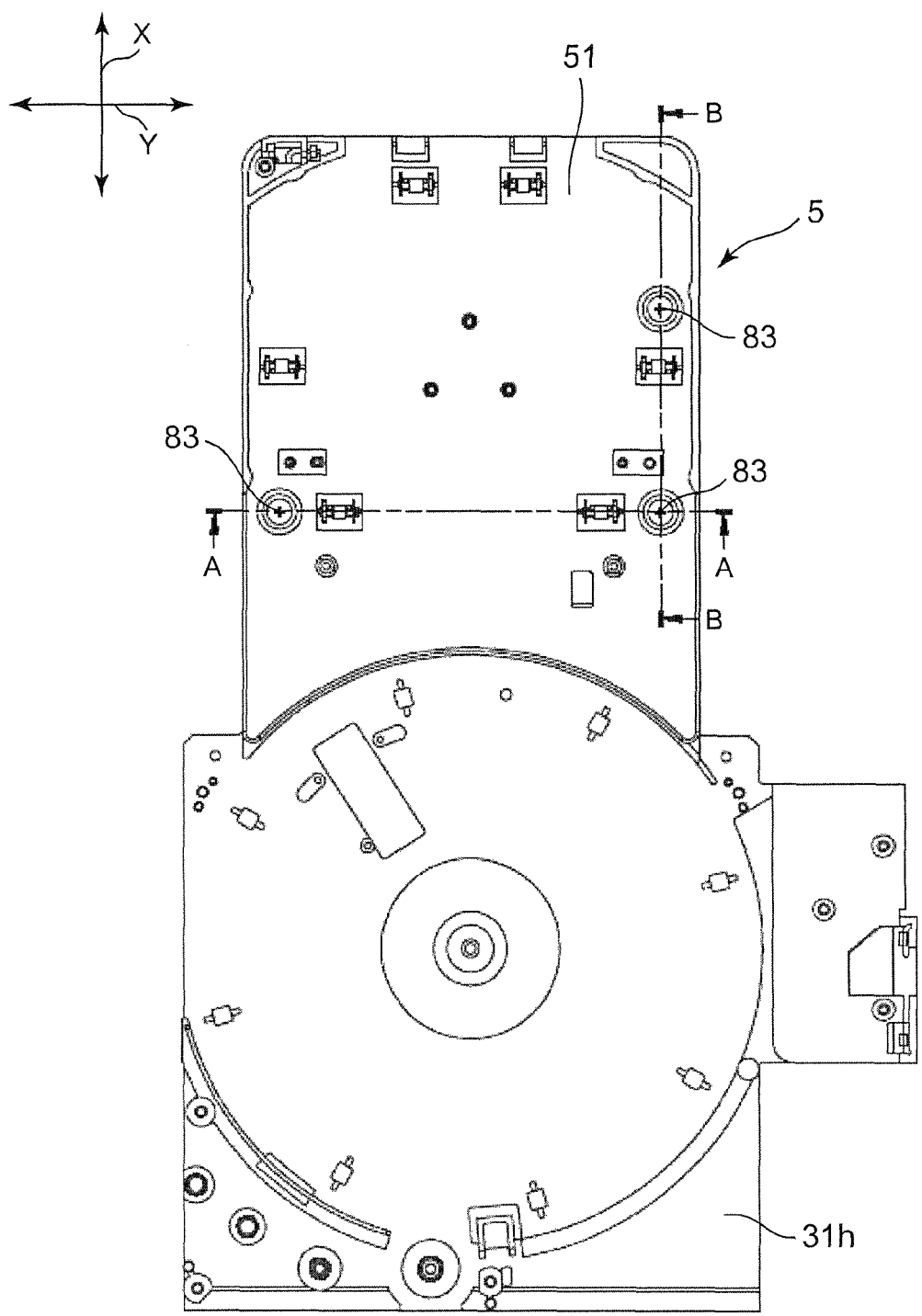
FIG. 58 is a plan view showing the mounting structure of the lifter on the picker.
Figure 59:
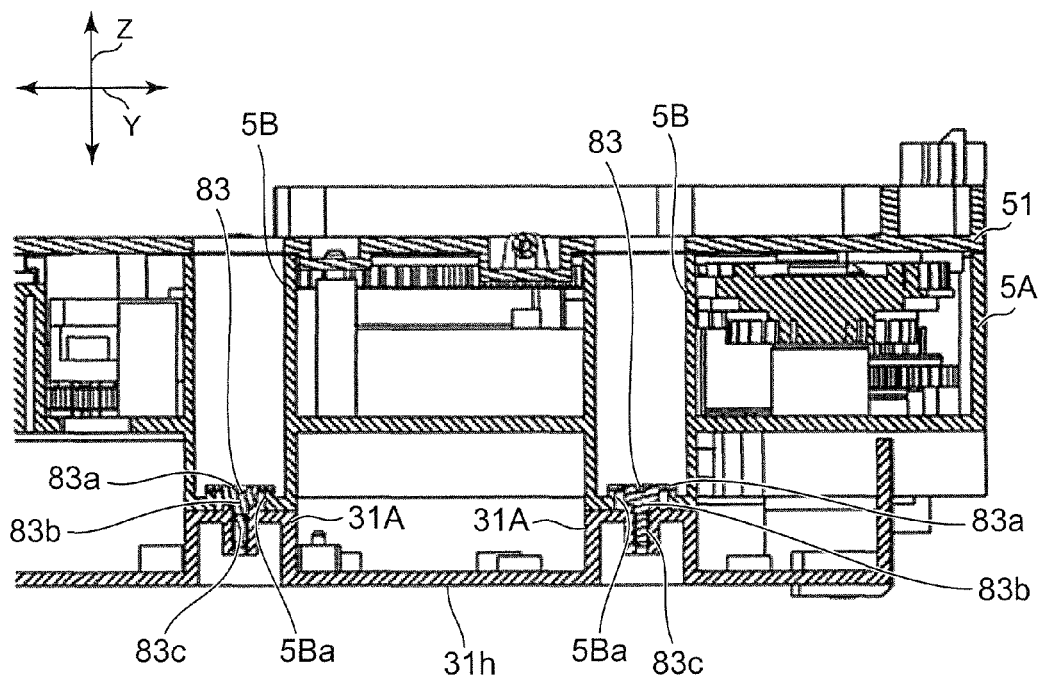
FIG. 59 is a cross sectional view taken along line A-A in FIG. 58.

FIG. 56 is an exploded perspective view showing the mounting structure of the lifter 5 on the picker 3, FIG. 57 is an assembled perspective view thereof, and FIG. 58 is a plan view thereof. FIG. 59 is a cross sectional view taken along line A-A in FIG. 58, and FIG. 60 is a cross sectional view taken along line B-B in FIG. 58.

As shown in FIG. 56, the lifter 5 is provided, for example, at three different positions with mounting recess portions 5B. A picker base 31*h* is provided with mounting projection portions 31A at positions corresponding to the mounting recess portions 5B.

Figure 60:
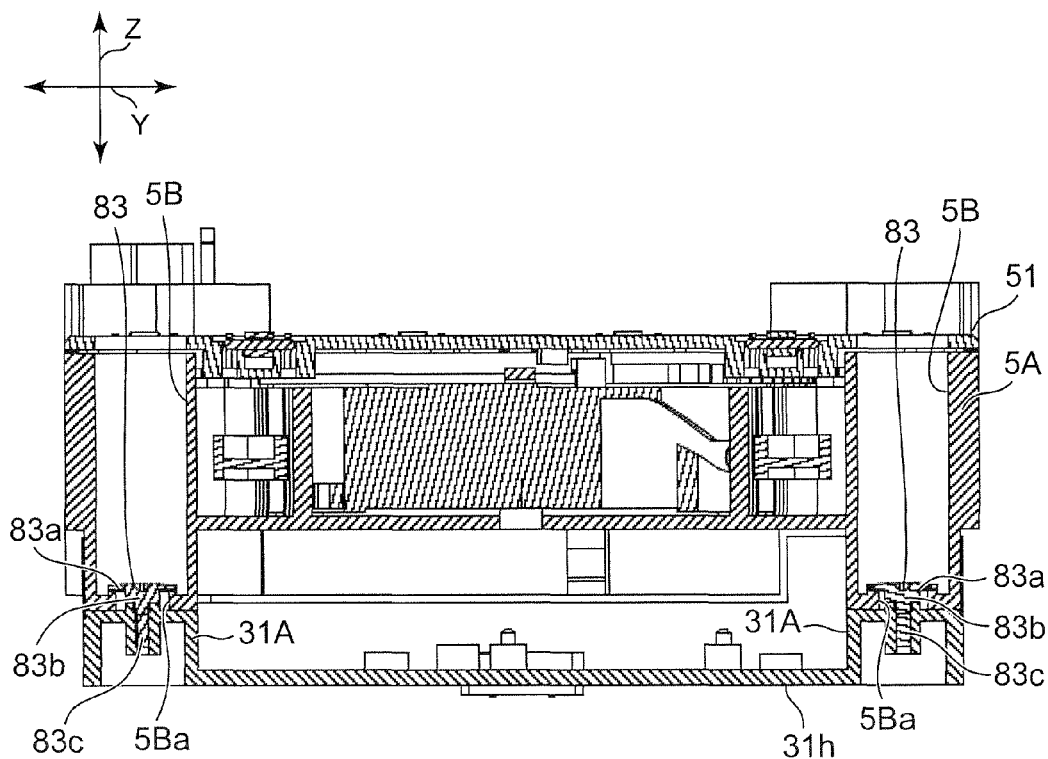
FIG. 60 is a cross sectional view taken along line B-B in FIG. 58.

As shown in FIGS. 59 and 60, the lifter 5 is mounted on the picker base 31*h* by screwing stepped screws 83 into the upper portions of the mounting projection portions 31A through the bottoms of the mounting recess portions 5B in a state where bottoms of the mounting recess portions 5B are in contact with upper portions of the mounting projection portions 31A.

Each of the stepped screws 83 includes a head portion 83*a*, a shaft portion 83*b* and a screw portion 83*c*. As shown in FIGS. 59 and 60, the head portion 83*a* of the stepped screw 83 is fixed by the shaft portion 83*b* at a constant height in a state where the lifter 5 is mounted on the picker base 31*h*. Therefore, the head portion 83*a* substantially comes into contact with an upper surface of the bottom of the mounting recess portion 5B, and the head portion 83*a* is fixed such that only upward shifting of the lifter 5 is restricted and the lifter 5 can shift in the horizontal direction. The shaft portion 83*b* of the stepped screw 83 is located in a through hole 5Ba provided in a bottom of the mounting recess portion 5B. A diameter of the through hole 5Ba is greater than that of the shaft portion 83*b*. The screw portion 83*c* of the stepped screw 83 is screwed into an upper portion of the mounting projection portion 31A.

Since there is a clearance (so-called play) between the shaft portion 83*b* of the stepped screw 83 and the through hole 5Ba, the lifter 5 is flexibly mounted such that the lifter 5 can shift relative to the picker base 31*h* in the horizontal direction. In other words, the lifter 5 is supported by the picker base 31*h* in a floating manner.

Next, a more detailed description will be given of an operation of the lifter 5 to deliver a plurality of discs 100 in the magazine tray 21 to the carrier 6.

Figure 61:
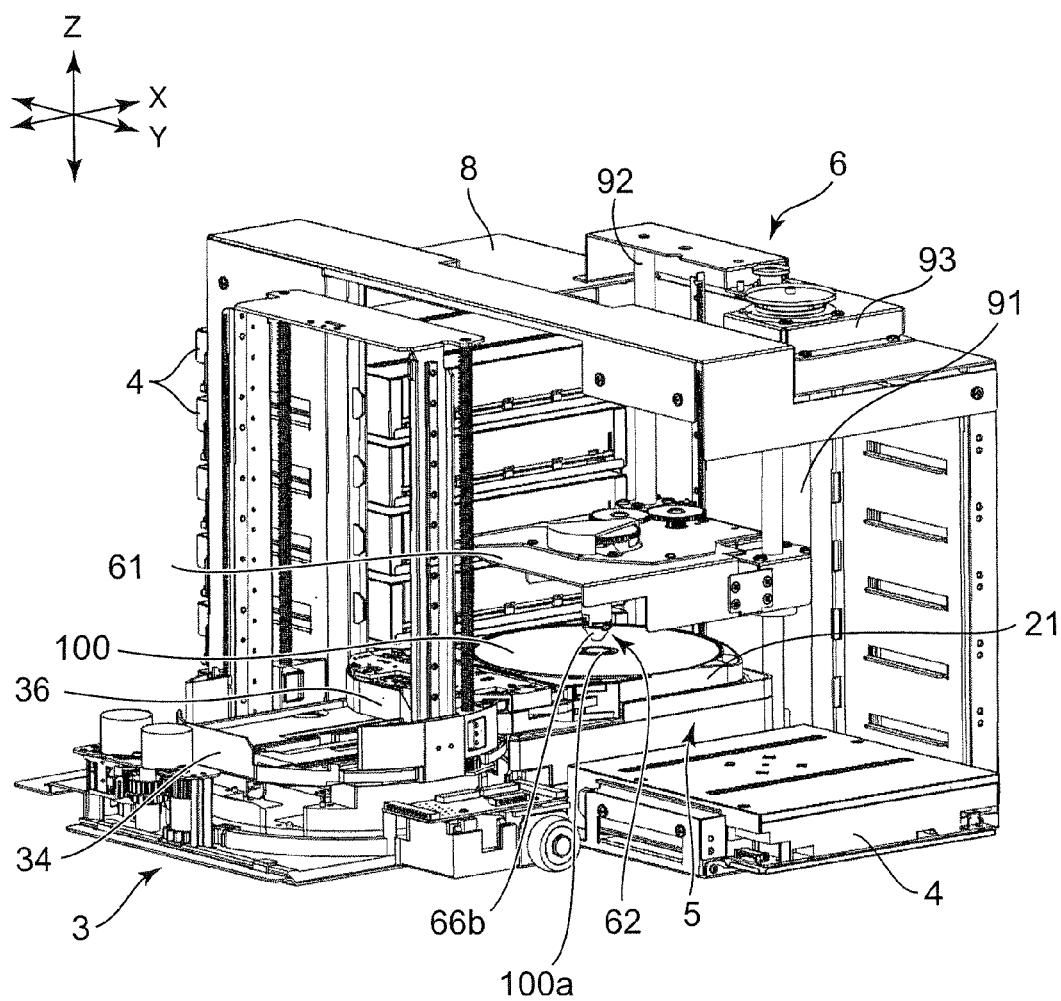
FIG. 61 is a perspective view showing an operation of the lifter included in the disc device shown in FIG. 1 to deliver a plurality of discs in the magazine tray to a disc chuck unit.

Here, the description is started from a state where the magazine tray 21 is placed at a prescribed position at the top of the lifter 5 as shown in FIG. 61. Assume that the magazine tray 21 is deviated from the position directly below the shift base 61.

If the magazine tray 21 is placed at the prescribed position at the top of the lifter 5, the positioning base 57 is raised as shown in FIGS. 53A and 54A, and the two positioning pins 57c pass through the holes 51b of the magazine guide tray 51 and engage with the holes 21g of the magazine tray 21. Thus, the magazine tray 21 is fixed at the prescribed position at the top of the lifter 5, and the horizontal shifting of the magazine tray 21 is restricted.

Next, the shift base 61 is lowered to the position near the magazine tray 21. Thus, the spindle head 66b which is a tip portion of the disc chuck unit 62 shifts toward a center hole 100a of a topmost disc 100 in the magazine tray 21. At this time, since the magazine tray 21 is deviated from the position directly below the shift base 61, a tapered portion of the spindle head 66b comes into contact with a peripheral portion of the center hole 100a of the topmost disc 100, and a pressing force is applied to the topmost disc 100 in the horizontal direction.

The pressing force is transmitted also to the lifter 5 through the magazine tray 21 in which the topmost disc 100 is stored. As described above, since the lifter 5 is flexibly mounted such that the lifter 5 can shift relative to the picker base 31h in the horizontal direction, and the lifter 5 shifts integrally with the magazine tray 21 in the horizontal direction by the pressing force. Thus, a position of the center hole 100a and a position of the spindle head 66b are adjusted so that the spindle head 66b can pass through the center hole 100a of the topmost disc 100.

Figure 62:
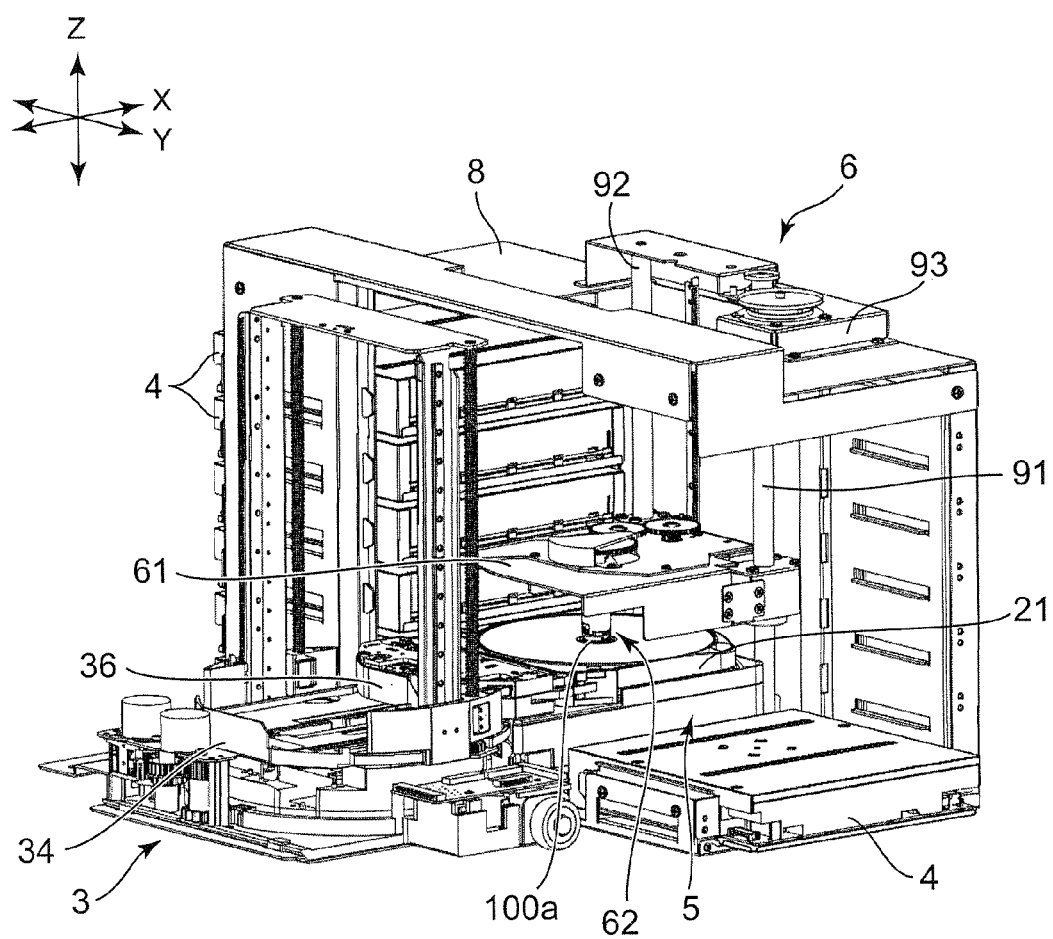
FIG. 62 is a perspective view showing an operation subsequent to FIG. 61.

If the shift base 61 is further lowered in this state, the spindle head 66b engages with the engaging portion 23a (see FIG. 2B) of the core rod 23 provided on the magazine tray 21, whereby the disc chuck unit 62 and the core rod 23 become coaxial to each other. FIG. 62 shows a state where the disc chuck unit 62 and the core rod 23 become coaxial to each other.

Figure 63:
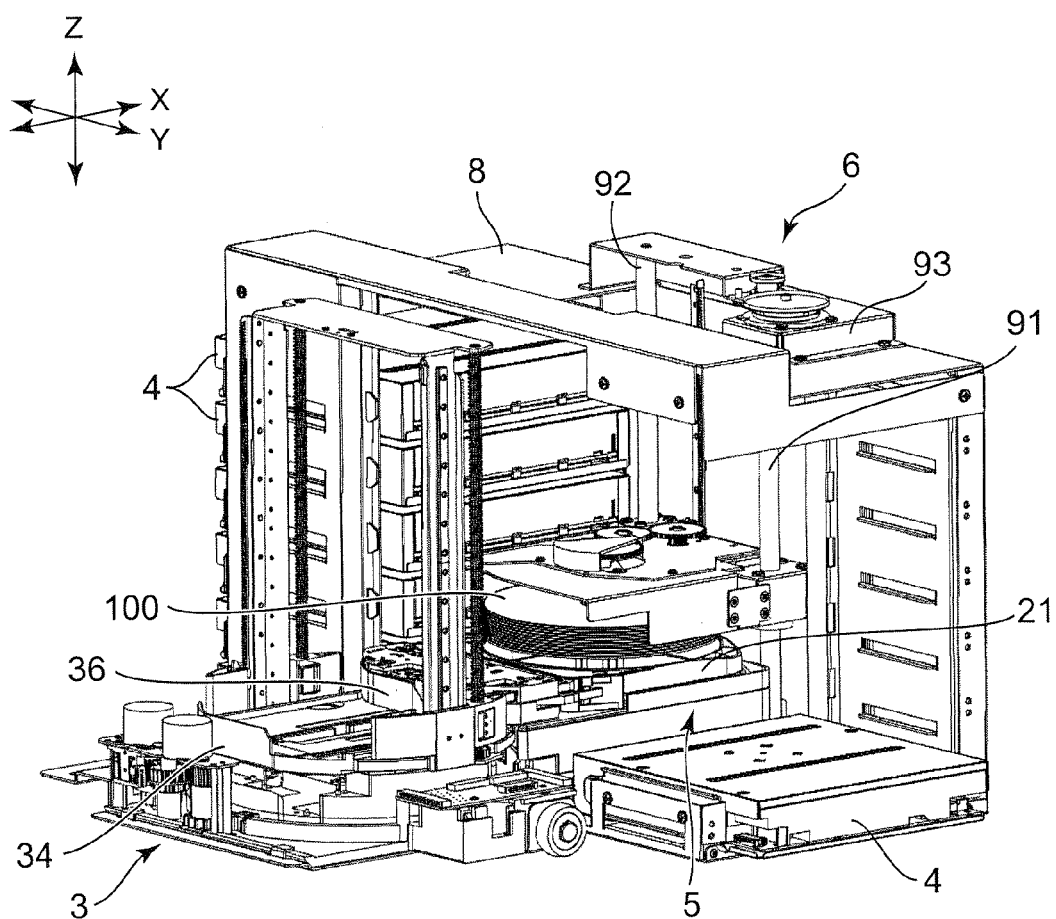
FIG. 63 is a perspective view showing an operation subsequent to FIG. 62.

In the state shown in FIG. 62, if the lifter motor 56 is further driven, the up-and-down plate 52 rises as shown in FIGS. 54A and 54B. Thus, the up-and-down pin 52a enters inside the magazine tray 21 through the holes 51a and 21e, to push out a plurality of discs 100 from the magazine tray 21 as shown in FIG. 63. If the plurality of discs 100 are raised to positions shown in FIG. 42, hooks 64A to 65B of the disc chuck unit 62 shift from stored positions (see FIG. 41A) to holding positions (see FIG. 41B). Thus, the plurality of discs 100 are retained by the disc chuck unit 62.

Figure 64:
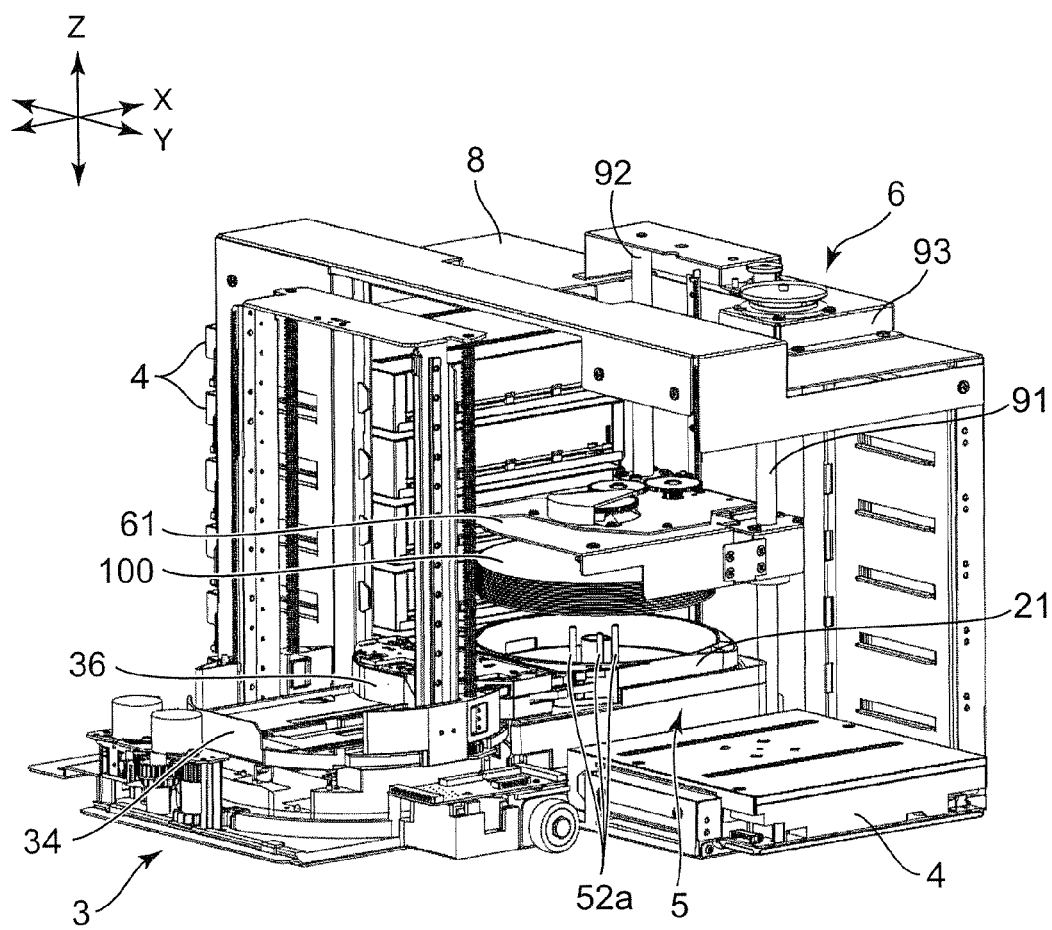
FIG. 64 is a perspective view showing an operation subsequent to FIG. 63.

Thereafter, the shift base 61 rises as being guided by the ball screw 91 and the guide shaft 92. Thus, as shown in FIG. 64, the engagement between a tip portion of the disc chuck unit 62 and the engaging portion 23a (see FIG. 2B) of the core rod 23 is released, and the operation of the lifter 5 to deliver the plurality of discs 100 in the magazine tray 21 to the carrier 6 is completed.

According to the disc device of the embodiment, the lifter 5 is flexibly mounted such that the lifter 5 can shift relative to the picker 3 in the horizontal direction. Therefore, the lifter 5 can shift integrally with the disc when the magazine tray 21 is deviated from the position directly below the shift base 61 and the disc chuck unit 62 comes into contact with a disc in the magazine tray 21 and presses the disc in the horizontal direction. Thus, it is possible to adjust the position of the magazine tray 21 such that the magazine tray 21 is located directly below the shift base 61, and a plurality of discs 100 in the magazine tray 21 can appropriately be delivered to the disc chuck unit 62.

The present disclosure is not limited to the embodiment and the present disclosure can be carried out in various ways. For example, although the lifter 5 is mounted on the picker base 31h by the stepped screw 83 in the embodiment, the present disclosure is not limited to this. As shown in FIGS. 56 and 57 for example, it is possible to employ such a structure that a hook 31B provided on the picker base 31h restricts upward shifting of the lifter base 5A, and the lifter 5 is flexibly mounted in the horizontal direction by a shaft 31D provided on a mounting projection portion 31C of the picker base 31h and a through hole 5C having a diameter greater than that of the shaft 31D provided on the lifter 5. If the lifter 5 can flexibly be mounted such that the lifter 5 can relatively shift in the horizontal direction, the lifter 5 is not especially limited.

In the embodiment, the tapered portion of the spindle head 66b comes into contact with the peripheral portion of the center hole 100a of the topmost disc 100, and the lifter 5 and the magazine tray 21 shift integrally with each other in the horizontal direction by applying the pressing force to the topmost disc 100 in the horizontal direction, but the present disclosure is not limited to this. For example, it is possible to employ such a structure that the engaging portion 23a (see FIG. 2B) of the core rod 23 provided on the magazine tray 21 engages with the spindle head 66b, thereby applying a pressing force directly to the magazine tray 21 in the horizontal direction, and the lifter 5 and the magazine tray 21 shift integrally with each other in the horizontal direction.

When a deviating distance between the spindle head 66b and the position directly below the shift base 61 is long, if the spindle head 66b presses the topmost disc 100 in the horizontal direction, a load applied to the spindle head 66b is increased. If the spindle head 66b and the topmost disc 100 come into contact with each other, there is concern that both of them become worn. Hence, for example, the disc device further provides a positioning mechanism which previously positions the magazine tray 21 such that the magazine tray 21 is located substantially directly below the carrier 6 before a tip portion of the spindle head 66b comes into contact with the peripheral portion of the center hole 100a of the topmost disc 100. Thus, it is possible to suppress a load applied to the spindle head 66b, and to restrain the spindle head 66b and the topmost disc 100 from becoming worn.

Figure 65:
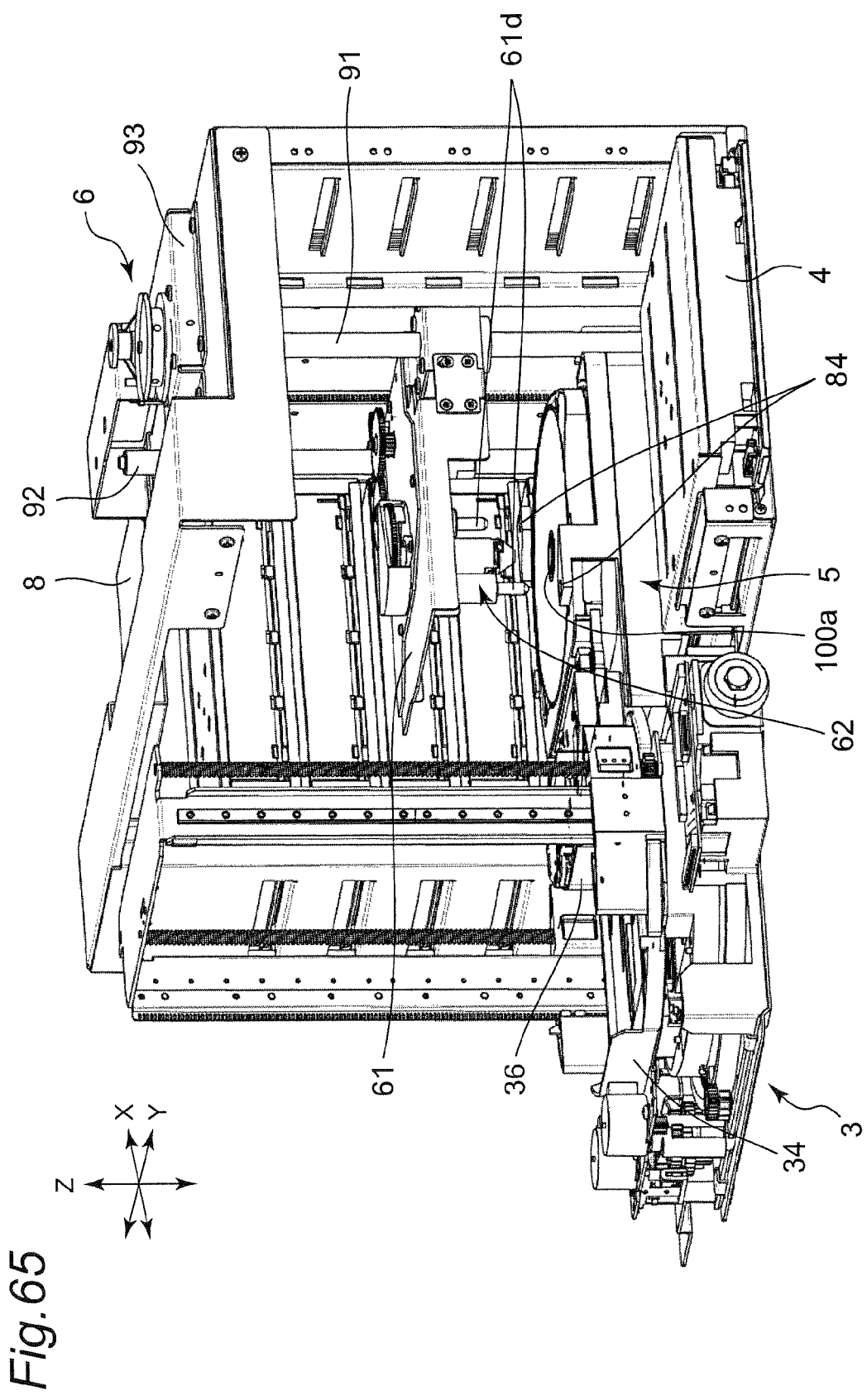
FIG. 65 is a partial enlarged perspective view showing a first modification of the disc device according to the embodiment of the present disclosure.

Such a positioning mechanism can include two positioning pins 61d and 61d provided on the shift base 61 of the carrier 6 and two positioning holes 84 and 84 provided in the lifter as shown in FIG. 65 for example. According to this structure, if the two positioning pins 61d and 61d are inserted into the two positioning holes 84 and 84 before the tip portion of the spindle head 66b comes into contact with the peripheral portion of the center hole 100a of the topmost disc 100, it is possible to previously position the magazine tray 21 such that the magazine tray 21 is located substantially directly below the carrier 6.

Figure 66:
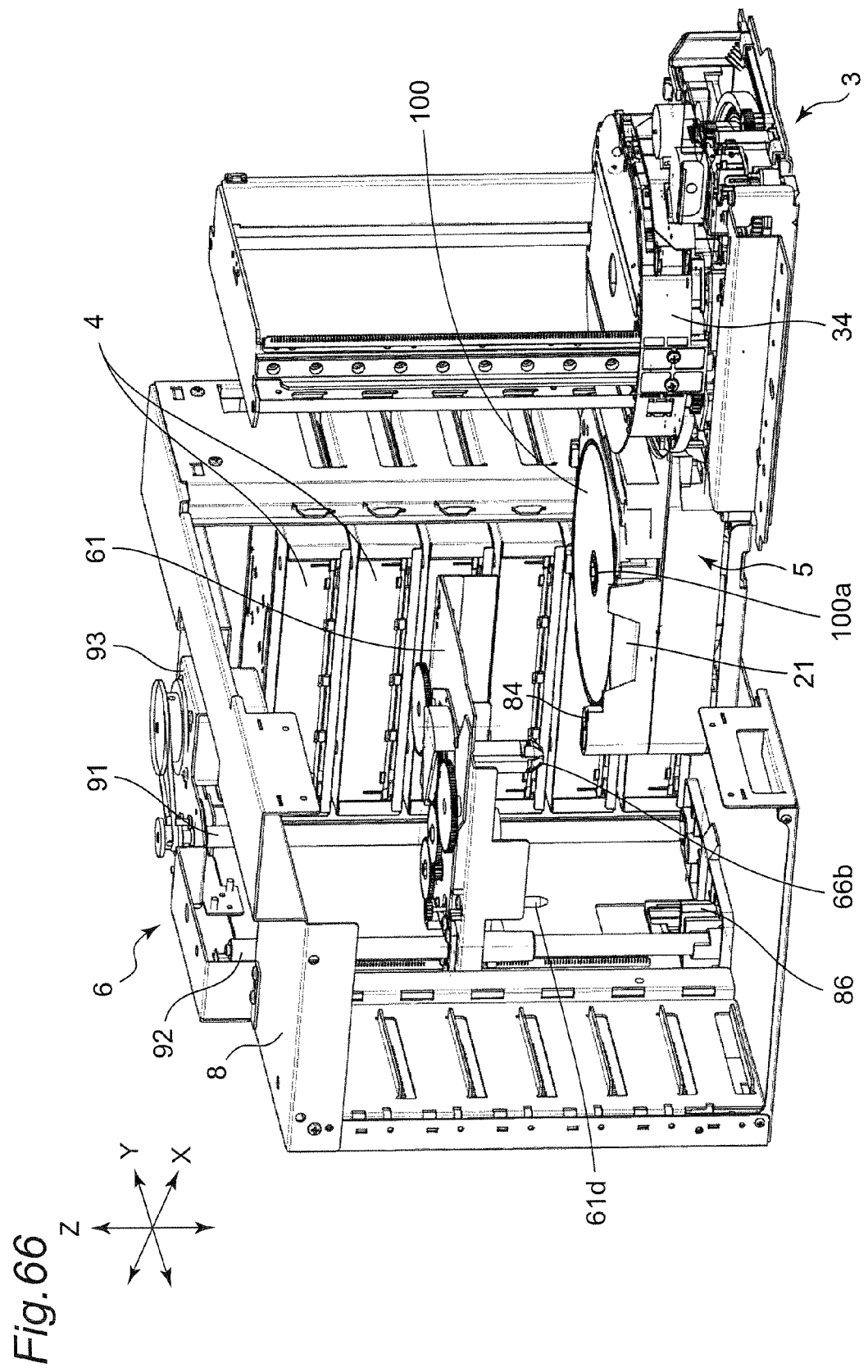
FIG. 66 is a partial enlarged perspective view showing a second modification of the disc device according to the embodiment of the present disclosure.
Figure 67:
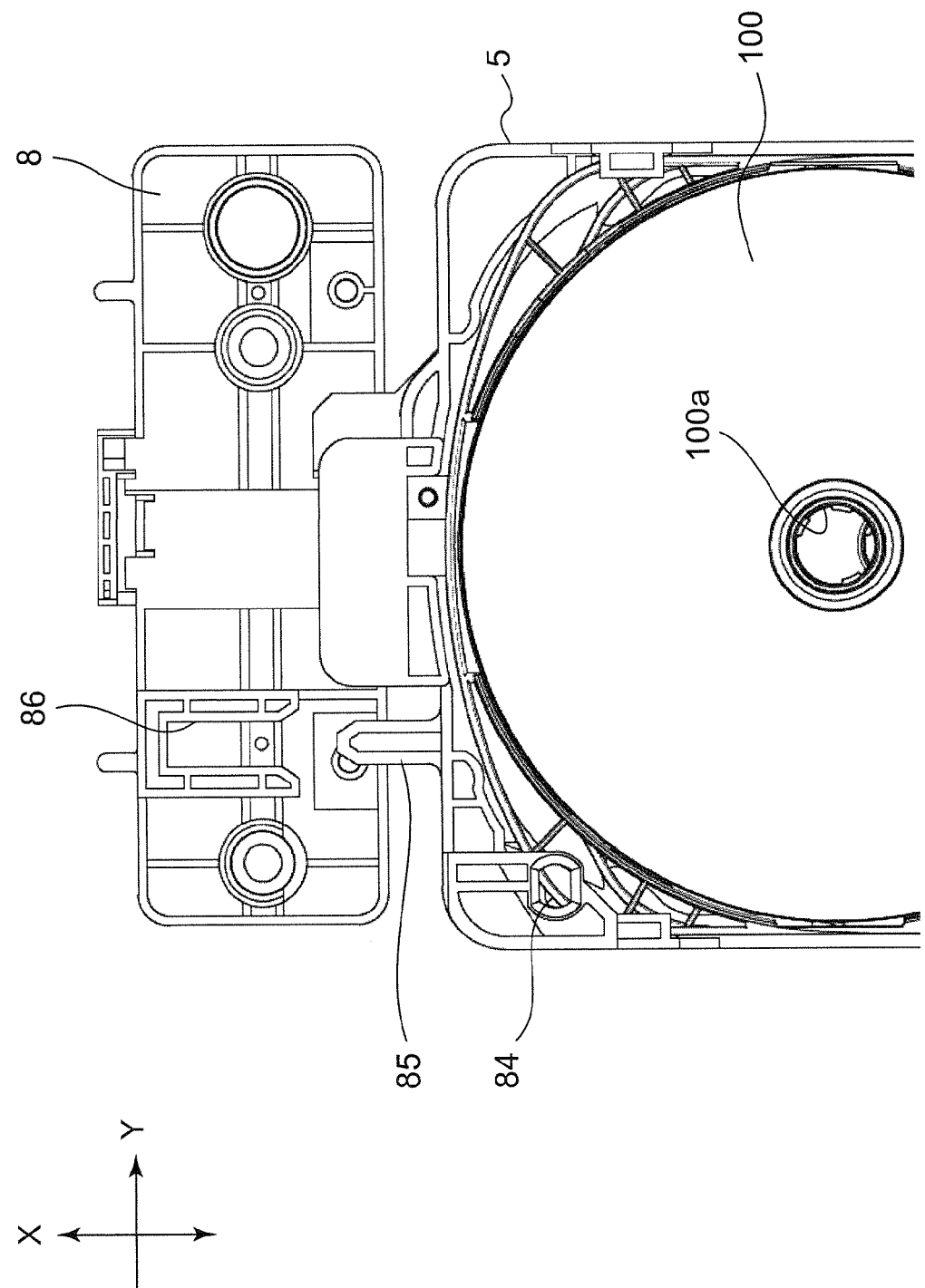
FIG. 67 is a plan view showing a state before a positioning projection portion is inserted into a positioning recess portion in the disc device shown in FIG. 66.
Figure 68:
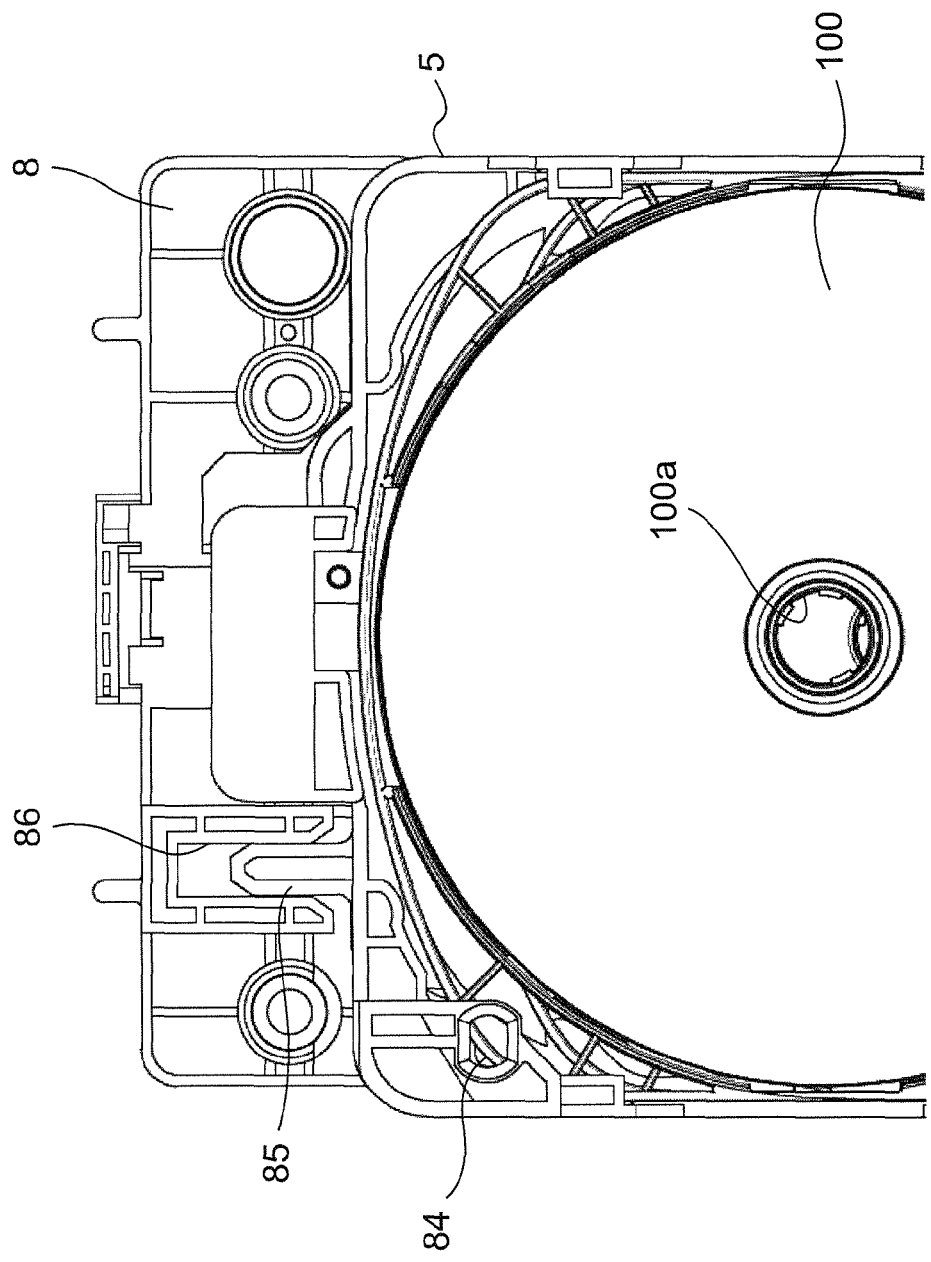
FIG. 68 is a plan view showing a state where the positioning projection portion is inserted into the positioning recess portion in the disc device shown in FIG. 66.
Figure 69:
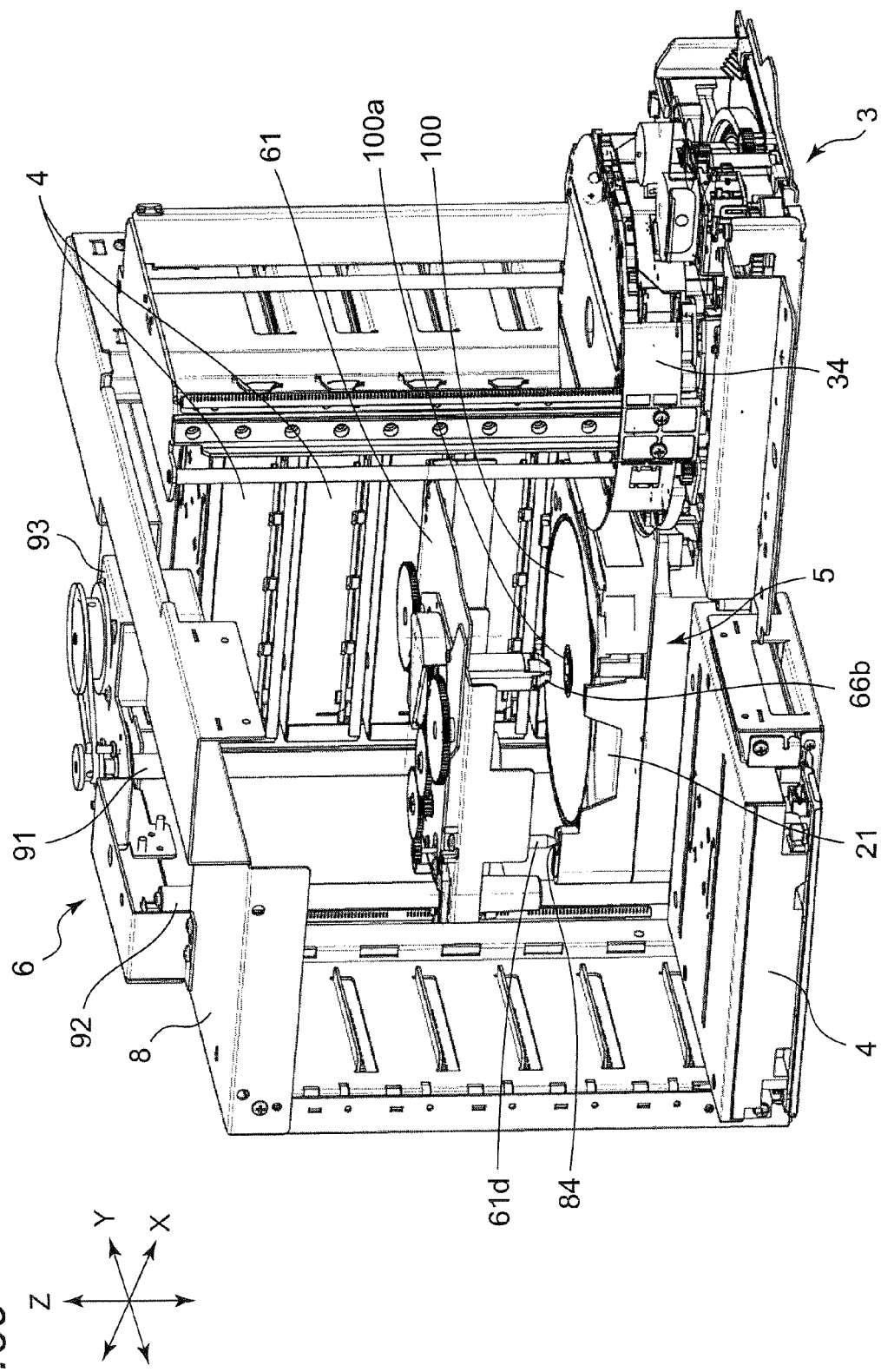
FIG. 69 is a partial enlarged perspective view showing a state before the positioning pin is inserted into a positioning hole in the disc device shown in FIG. 66.
Figure 70:
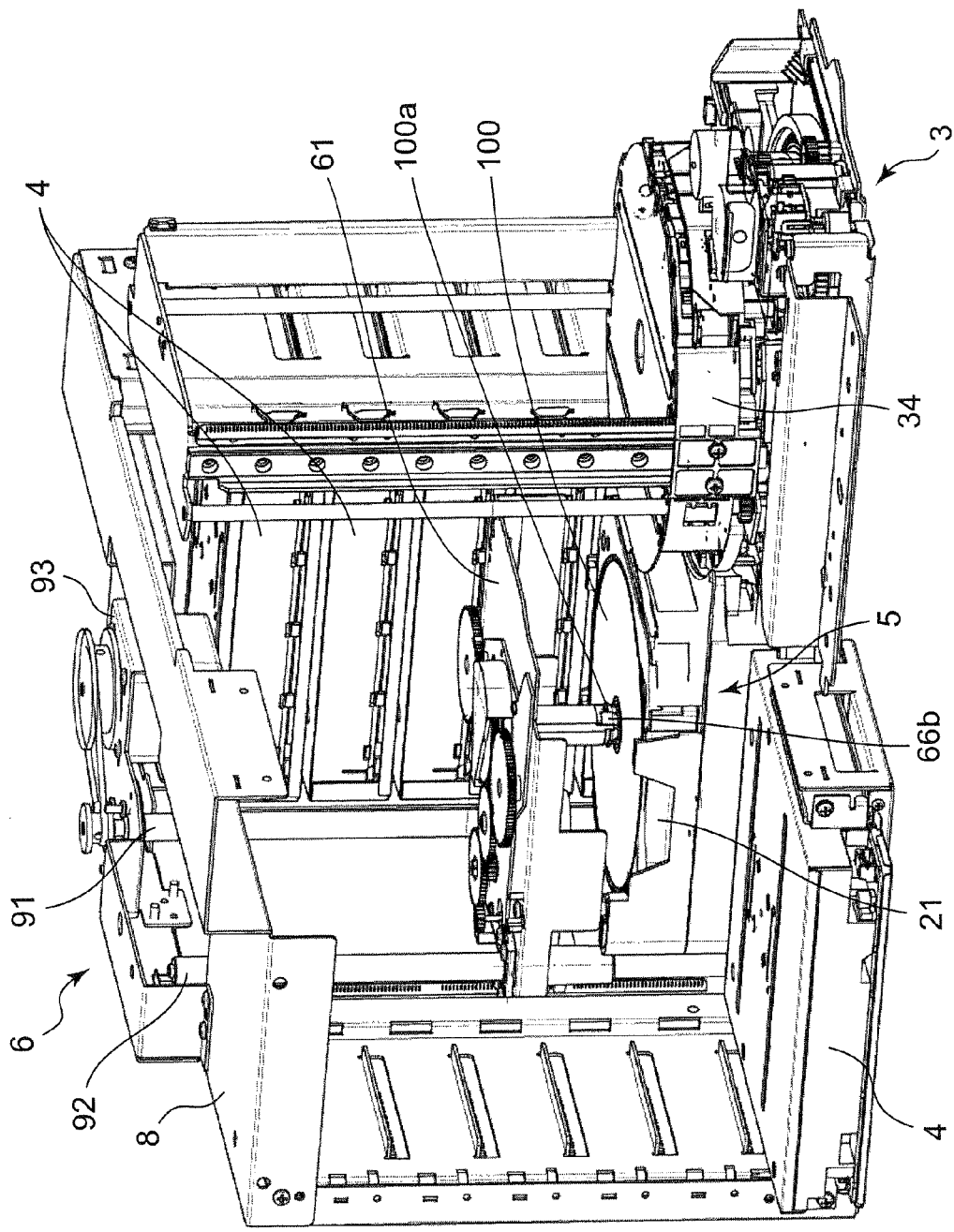
FIG. 70 is a partial enlarged perspective view showing a state where the positioning pin is inserted into the positioning hole in the disc device shown in FIG. 66.

Alternatively, the positioning mechanism may include a positioning pin 61d provided on the shift base 61 of the carrier 6, a positioning hole 84 provided in the lifter 5, a positioning projection portion 85 provided on the lifter 5, and a positioning recess portion 86 provided in the housing 8 as shown in FIGS. 66 and 67. According to this structure, if the positioning projection portion 85 is inserted into the positioning recess portion 86 as shown in FIG. 68, a positioning operation in the Y direction can be carried out. Thereafter, if the positioning pin 61d is inserted into the positioning hole 84 before the tip portion of the spindle head 66b comes into contact with the peripheral portion of the center hole 100a of the topmost disc 100 as shown in FIGS. 69 and 70, a positioning operation in the X direction can be carried out. Thus, it is possible to previously carry out a positioning operation such that the magazine tray 21 is located substantially directly below the carrier 6.

Here, the expression that "the magazine tray 21 is located directly below the carrier 6" means a position where the spindle head 66b can be inserted into the center hole 100a of the topmost disc 100 without coming into contact with the peripheral portion of the center hole 100a. The expression that "the magazine tray 21 is located substantially directly below the carrier 6" means a position where the spindle head 66b can be inserted into the center hole 100a of the topmost disc 100, or a position where although the tapered portion of the spindle head 66b comes into contact with the peripheral portion of the center hole 100a of the topmost disc 100, its contact amount is small. For example, tip portions of the positioning pin 61d, the positioning hole 84, the positioning projection portion 85, and the positioning recess portion 86 are tapered so that it becomes easy to position.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

According to the disc device of the present disclosure, since it is possible to appropriately deliver a plurality of discs in the magazine tray to the carrier, the present disclosure is especially useful for a disc device which supplies a plurality of discs to a plurality of disc drives.

The disclosure of Japanese Patent Application No. 2012-141151 filed on Jun. 22, 2012 including specification, drawing and claims are incorporated herein by reference in its entirety.

What is claimed is:

1. A disc device comprising:
a picker configured to convey, in a horizontal direction, a magazine tray in which a plurality of discs are stored;
a lifter configured to push out the plurality of discs from the magazine tray; and
a carrier configured to shift in a vertical direction, configured to retain in a stacked manner the plurality of discs pushed out by the lifter, and configured to supply the discs to a plurality of disc drives, respectively, wherein
the lifter is flexibly supported on the picker such that the lifter shifts relative to the picker in the horizontal direction, and the lifter shifts integrally with the magazine tray in the horizontal direction.

2. The disc device according to claim 1, wherein
the carrier includes a disc chuck unit to be inserted into center holes of the plurality of discs and to retain the plurality of discs, and
a tip portion of the disc chuck unit is configured to contact a peripheral portion of the center hole of a topmost disc of the discs to apply a pressing force to the topmost disc in the horizontal direction when the magazine tray conveyed by the picker is deviated from a position directly below the carrier.

3. The disc device according to claim 2, further comprising:

a positioning mechanism configured to position the magazine tray such that the magazine tray is located substantially directly below the carrier before the tip portion of the disc chuck unit comes into contact with the peripheral portion.

4. The disc device according to claim 1, wherein
the lifter and the picker are mounted to each other by a stepped screw.

5. The disc device according to claim 4, wherein the lifter, the picker, and the stepped screw are configured and arranged such that:
a tip portion of the stepped screw penetrates the lifter and is fixed to the picker,
a head portion of the stepped screw comes into contact with an upper side surface of the lifter to restrict upward shifting of the lifter, and
a clearance for permitting horizontal shifting of the lifter exists between a shaft portion of the stepped screw and the lifter.

6. The disc device according to claim 1, wherein
the lifter has a plurality of mounting recess portions,
the picker has a plurality of mounting projection portions, each of the mounting projection portions corresponding to a respective one of the mounting recess portions, and
the lifter is fastened to the picker such that a bottom portion of each of the mounting recess portions contacts an upper portion of a respective one of the mounting projection portions while allowing the lifter to move in the horizontal direction relative to the picker.

7. The disc device according to claim 1, wherein
the bottom portion of each of the mounting recess portions has a through hole formed therein,
a respective screw extends through the through hole of each of the mounting recess portions and into the respective one of the mounting recess portions so as to fasten the lifter to the picker, and
a diameter of the through hole of each of the mounting recess portions is greater than a diameter of a shaft portion of the respective screw so as to provide a clearance between the shaft portion of the respective screw and the bottom portion of each of the mounting recess portions to allow the lifter to move in the horizontal direction relative to the picker.

8. The disc device according to claim 1, wherein
a bottom portion of the lifter has a plurality of through holes formed therein,
a respective one of a plurality of screws extends through each of the through holes of the lifter and into an upper portion of the picker so as to fasten the lifter to the picker, and
a diameter of each of the through holes is greater than a diameter of a shaft portion of the respective one of the plurality of screws so as to provide a clearance between the shaft portion of the screw and the bottom portion of the lifter to allow the lifter to move in the horizontal direction relative to the picker.

* * * * *